(12) United States Patent
Koike

(10) Patent No.: US 12,011,771 B2
(45) Date of Patent: Jun. 18, 2024

(54) METHOD AND APPARATUS FOR IN SITU EXTENSION OF WIND TURBINE BLADES

(71) Applicant: Bento Massahiko Koike, Sao Paulo (BR)

(72) Inventor: Bento Massahiko Koike, Sao Paulo (BR)

(*) Notice: Subject to any disclaimer, the term of this patent is extended or adjusted under 35 U.S.C. 154(b) by 7 days.

(21) Appl. No.: 17/559,020

(22) Filed: Dec. 22, 2021

(65) Prior Publication Data

US 2022/0193797 A1 Jun. 23, 2022

Related U.S. Application Data

(60) Provisional application No. 63/129,838, filed on Dec. 23, 2020.

(51) Int. Cl.
| | |
|---|---|
| *B23C 1/20* | (2006.01) |
| *B23C 3/18* | (2006.01) |
| *B23C 5/14* | (2006.01) |
| *B23Q 3/18* | (2006.01) |
| *B23Q 9/00* | (2006.01) |
| *B23Q 9/02* | (2006.01) |
| *B23P 6/00* | (2006.01) |
| *F03D 80/50* | (2016.01) |

(52) U.S. Cl.
CPC .................. *B23C 3/18* (2013.01); *B23C 1/20* (2013.01); *B23Q 9/0014* (2013.01); *B23Q 9/0028* (2013.01); *B23Q 9/02* (2013.01); *B23C 2215/44* (2013.01); *B23C 2220/40* (2013.01); *B23C 2255/08* (2013.01); *B23C 2255/12* (2013.01); *B23C 2270/022* (2013.01); *B23C 2270/027* (2013.01); *Y10T 409/306384* (2015.01); *Y10T 409/30672* (2015.01); *Y10T 409/308176* (2015.01)

(58) Field of Classification Search
CPC ........ Y10T 409/306384; B23Q 9/0028; B23Q 9/00–9/02; B23C 1/20; B23C 3/18
USPC .................. 409/175–182; 451/344, 354, 358
See application file for complete search history.

(56) References Cited

U.S. PATENT DOCUMENTS

| | | | | |
|---|---|---|---|---|
| 1,887,424 | A * | 11/1932 | Perazzoli | E01B 31/13 409/178 |
| 4,022,106 | A * | 5/1977 | Kile | B23C 1/20 409/235 |
| 5,106,243 | A * | 4/1992 | Hunt | B23C 1/20 144/24.05 |
| 6,302,625 | B1 * | 10/2001 | Carey | B23C 3/12 29/889.1 |
| 2014/0260849 | A1 * | 9/2014 | Johnson | F03D 3/0436 83/743 |

FOREIGN PATENT DOCUMENTS

EP 2700811 A1 * 2/2014

* cited by examiner

*Primary Examiner* — Erica E Cadugan
(74) *Attorney, Agent, or Firm* — Z IP Law PLLC

(57) ABSTRACT

A method and apparatus for the refurbishment and repowering of wind turbines through the extension of existing installed blades so that they can catch more wind energy and therefore enable an increase in the overall average power output of the wind turbine.

20 Claims, 26 Drawing Sheets

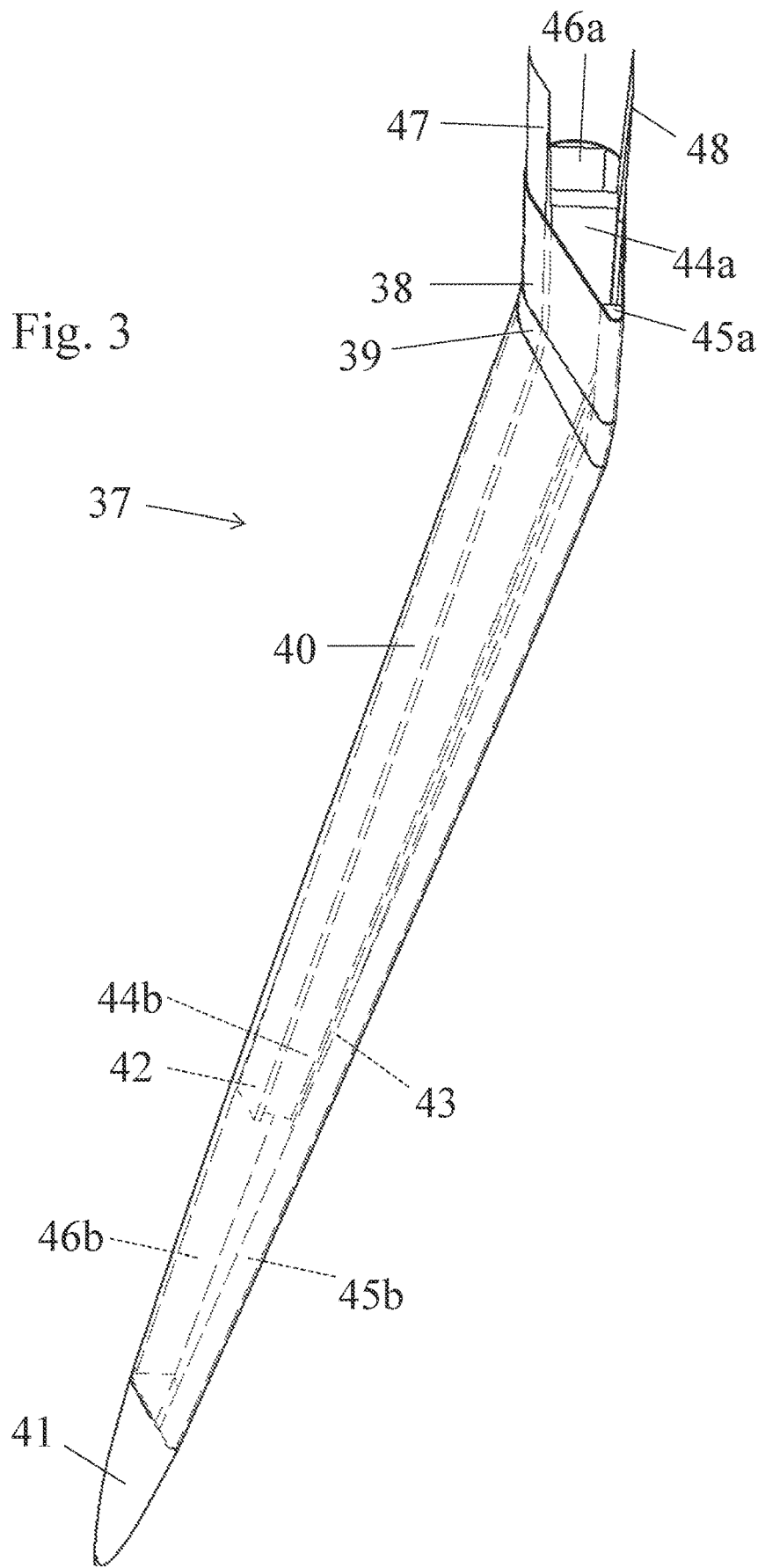

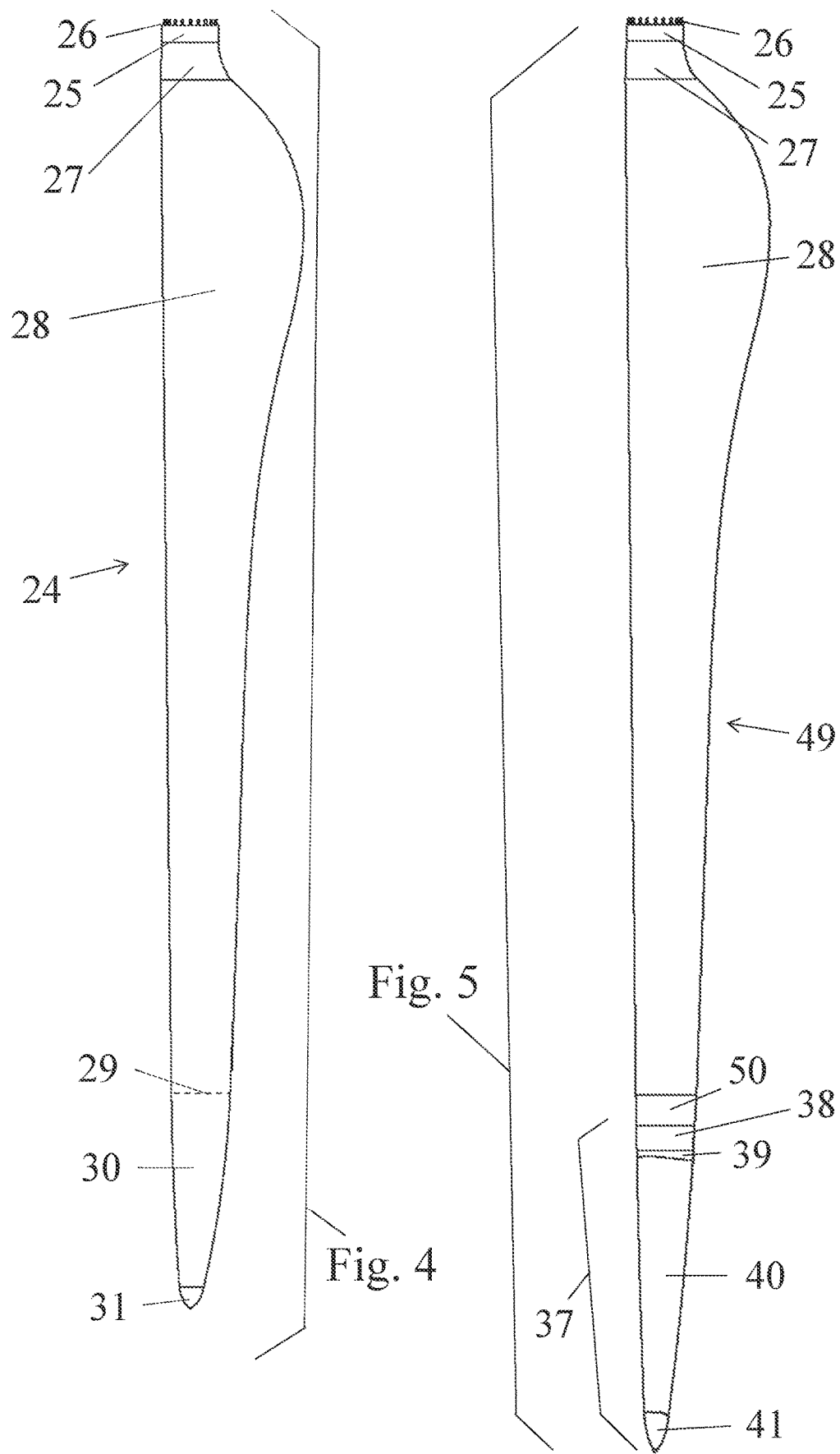

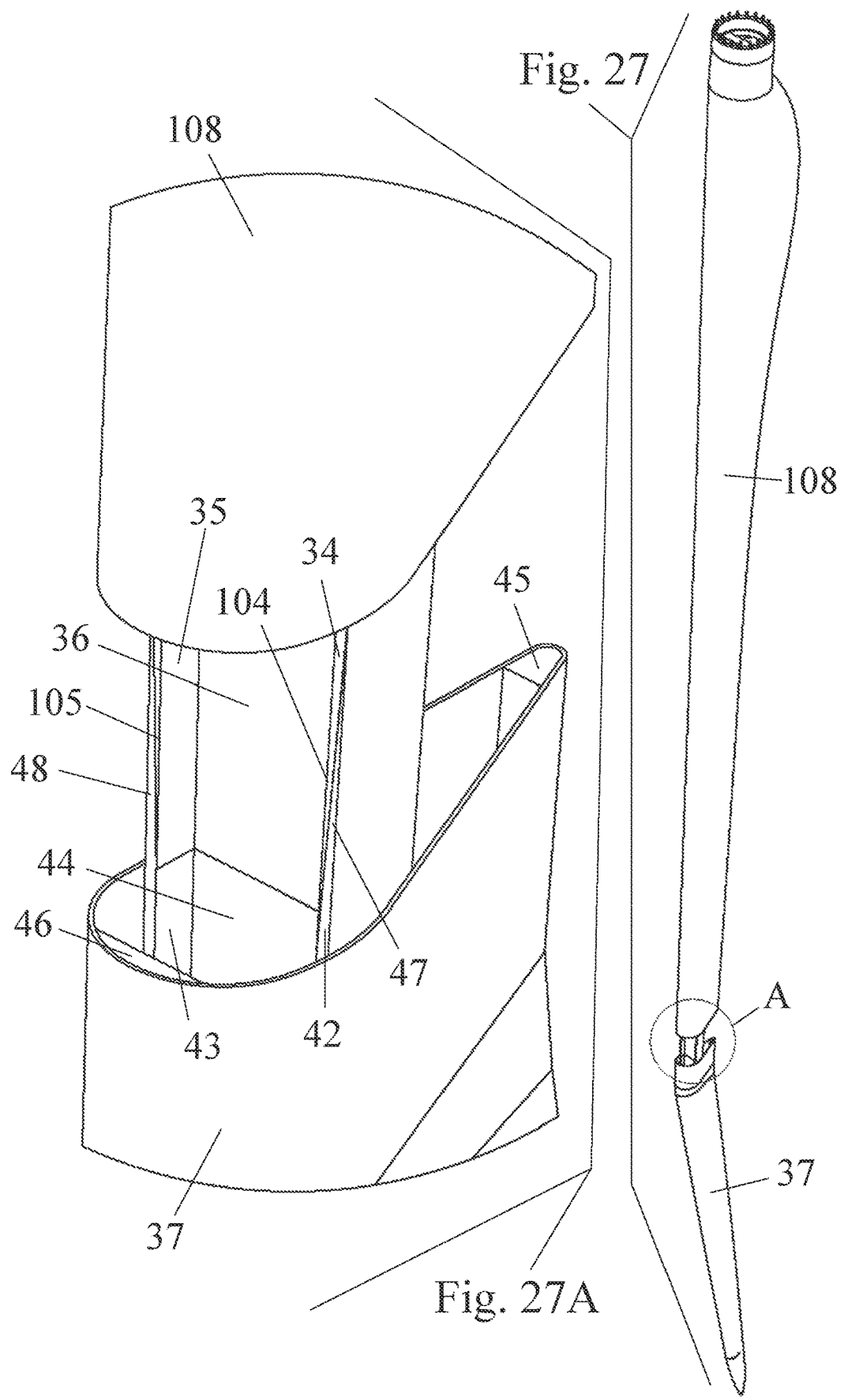

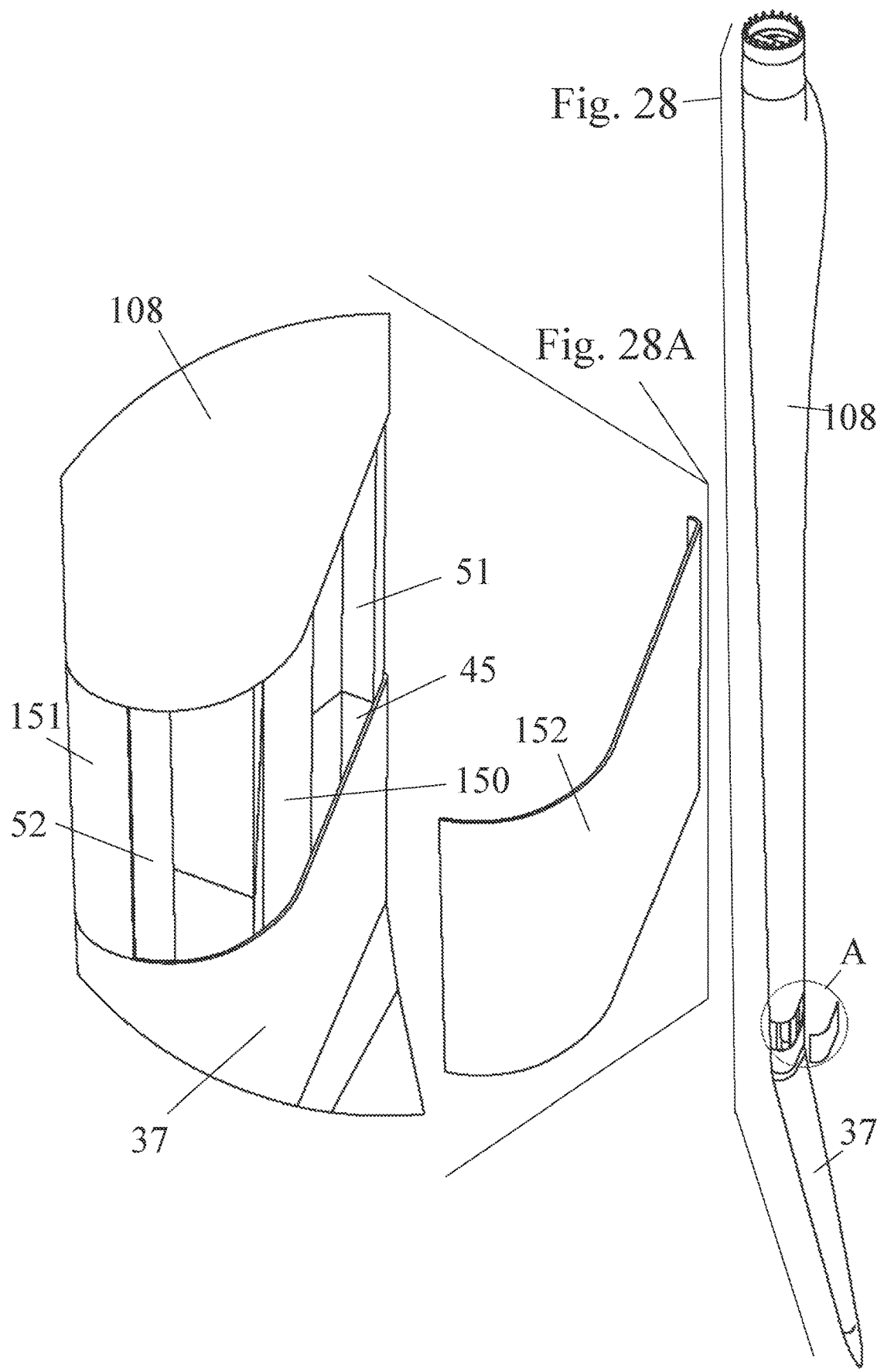

METHOD AND APPARATUS FOR IN SITU EXTENSION OF WIND TURBINE BLADES

FIELD OF THE INVENTION

The present invention is related to a method and apparatus for the refurbishment and repowering of wind turbines through the extension of existing installed blades so that they can catch more wind energy and therefore enable an increase in the overall average power output of the wind turbine.

BACKGROUND

Wind turbines have been extensively used over the last decades for electricity generation as they offer the advantages of a renewable clean source of electricity. Since the beginning of the trend for their utilization, wind turbines have gone through major technology updates resulting in ever increasing performance.

Due to the high cost of the installation and access difficulties that many installations sites pose, it is not easy to refurbish already installed turbines to take advantage of the latest upgrades in the technology. Very often, the best option is to leave older models running as originally installed until they reach the end of their operational life.

However, in some cases when a wind turbine is installed at a particularly attractive site that has a higher energy generation potential than the installed turbine is able to tap into it may become financially compelling to upgrade using an extension that attaches to the end of each turbine blade or in some cases replace the turbine. The owner will typically evaluate the return on the investment for these options in deciding whether to perform an upgrade, replace the entire turbine or do nothing and continue with lower than optimal power generation. However currently the cost of either the option to upgrade or replace the turbine is in most cases prohibitive when considering the loss of revenue due to the wind turbine being out of operation for days or even weeks during the refurbishment.

The replacement of the set of wind turbine blades is the option that offers a greater increase in power production. However, this option will very likely require upgrades to the gearbox, bearings and axles to support the additional loads caused by differences in weight and aerodynamic design. A crane and other heavy equipment are needed to uninstall the old turbine blades, the old gearbox, the bearings and other components. The new turbine blades must then be lifted and installed with the appropriate components and be balanced and tested. The long work hours needed to complete the refurbishment require that the wind turbine be shut down for a long period of time. The combined cost of the parts, rental of heavy lifting equipment, the number of crews required, and the loss in revenue due to the extended time of shutdown tend to make this option economically unfeasible. However, because there will over a long period of time be a payback from the increase in energy production the overall financial gain over the remaining lifespan of the turbine may be worthwhile. Although, in most cases the extended time for payback will exceed a reasonable return on investment.

The other option is a solution for blade extension that relies on installing a short extension blade that is designed to attach to the tip of each of the existing blades, in such a way to smoothly encompass the tip of the existing blade. This alternative is much cheaper than the replacement of the entire blades, does not require the heavy lifting equipment and is quicker to install. The problem however is that the weight of each blade with an extension will inevitably increase, reducing safety margins and increasing wear of the gears, bearings and other components. Due to structural limitations there is a maximum to the weight that can be added to each turbine blade resulting in a limit to the size and therefore the amount of increase in power production is modest. Although the return on the investment may be shorter than the complete refurbishment option, the overall financial gain over the remaining lifespan of the turbine may not be very attractive, especially if as result of the increase in weight maintenance costs also increase.

There is therefore a big gap between the realization of improved power production and the barriers to achieving that objective. A solution that provides and improves upon the best benefits of both options, namely simple installation, no increase or minimal increase in blade weight, no need to replace other components and good increase in power production would provide a reduction of necessary investment, much lower time periods for payback and thereby an increase in the financial benefit of the upgrade that will make the upgrading of installed wind turbines economically feasible.

SUMMARY OF THE INVENTION

Technical Problem

Wind Turbine blades are very specialized pieces of equipment. They are very heavily engineered to be as lightweight and as strong as possible to withstand the strong loads that they are exposed to, particularly in strong wind situations. The standard choice is composite materials, usually resin with glass fiber, that are relatively cheap and offer good strength. Carbon fiber offers better strength and weight reduction, but it is more expensive and because carbon fiber is conductive, a lightning protection layer must be added to the blade resulting in additional complexity and costs.

The internal structure of the blade is typically based on an I-beam that runs through the length of the blade until a point near the tip.

Whereas it is possible to perform some level of maintenance in installed blades and fix small holes, flaking and other common problems that occur from time to time, a major retrofit that involves cutting a portion of the blade and replacing it by another piece poses some serious challenges.

The parts must be perfectly aligned and smoothly joined to avoid aerodynamic problems that would result in performance penalties. Also, the structure must be very precisely joined within small tolerances. The several layers and different materials need to be very carefully assembled, glued and cured to avoid imperfections in the structure that would lead to defects that produce concentration of tension and can cause catastrophic failure.

Technical Solution

An object and advantage of the invention is the precise location of the surfaces that need to be cut and tapered.

Another object and advantage of the invention is the precise milling of the surfaces that need to be joined to allow a perfect bond.

Another object and advantage of the invention is the proper sequence for processing steps to avoid premature warping of the blade being processed and allow optimal aerodynamic features.

Another object and advantage of the invention is the tooling and the working procedures to allow for very precise milling that minimizes the weakening of the surfaces due to the removal of too much material.

Another object and advantage of the invention is the tooling and working procedures to allow a very precise positioning, alignment and immobilization of the parts during curing to allow perfect smoothness of the end product.

Advantageous Effects of the Invention

The present invention comprises a lightweight aerodynamically designed tip that may be of a composite material such as carbon fiber.

The present invention also comprises a specially designed rail-guided milling tool that includes a cutting wheel with a camber mated to one of either the upper or the lower surface of the wind turbine blade.

The rail-guided milling tool allows for the work to be performed at the precise location that needs to be milled and cut in the field with the wind turbine blade in its installed position.

Two rail-guided milling tools may be installed with one on the upper surface and one on the lower surface of the wind turbine blade.

The actual milling using the rail-guided milling tool is within very precise tolerances.

The rail guides of the present invention allow the precise positioning of the milling tools along the upper and lower surfaces of the wind turbine blade that provides for the exact same location to be milled on each surface of each of the blades of the wind turbine providing the repeatability needed to avoid imbalance of the turbine and vibrations that could result from even minor differences between the blades in length and weight.

The present system of rails and guides of the present invention allow for material to be progressively removed at a slow rate to avoid cracks and at the same time ensure the exact profile is reached.

The present invention comprises a method that allows for the blade being worked on to retain its strength and shape during the milling operation to avoid imprecisions that would ensue using even well designed cutting tools if the blade warps during the milling process.

The present invention comprises an alignment frame that allows for the previously prepared light weight carbon fiber tip to be perfectly aligned and held in place at the precise location on each blade to allow for perfect bonding and balance between the blades.

The present invention allows a simple and effective enlargement of a wind turbine set of blades to be carried out in situ, with the blades installed, and therefore requires a reduced number of workers, and without the need of heavy lifting equipment or expensive materials. The increase in power production, combined with reduced costs ensure best economic results for the wind turbine owner and a more competitive product within the energy generation market.

BRIEF DESCRIPTION OF DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 3 is an isometric view of an embodiment of an extension blade of the present invention showing its internal structure;

FIG. 4 is a top view of an originally installed blade;

FIG. 5 is a top view of an embodiment of an extended blade of the present invention;

Detail

Detail FIG. 13A is an isometric view of an embodiment of a tool positioning fixture showing its main features;

Detail FIG. 14A is an isometric view of the originally installed blade tip showing the placement of an embodiment of the lower camber rail-guided milling tool of the present invention using the tool positioning fixture of the present invention;

Detail FIG. 15A is an isometric view of the originally installed blade tip showing the placement of an embodiment of the upper camber rail-guided milling tool of the present invention using the tool positioning fixture of the present invention;

Detail FIG. 16A is an isometric view of the upper camber sparcap and the lower camber sparcap inside the originally installed blade showing the completion of the milling process of the present invention;

Detail FIG. 17A is an isometric view of the originally installed cut blade of FIG. 17 showing the results of the milling and cutting jobs;

Detail FIG. 18A is an isometric view of the originally installed cut blade and the positioning of an embodiment of the extension blade of the present invention using the alignment fixture of the present invention;

Detail FIG. 19A is an isometric view of an embodiment of the extension blade of the present invention joined to the originally installed cut blade showing the disassembled alignment fixture of the present invention;

Detail FIG. 24A is an isometric view of the alternative embodiment of the align fixture mounted on the originally installed cut blade and the extension blade.

FIG. 27 is an isometric view of an embodiment of the extension blade of the present invention joined to the originally installed cut blade with the alignment fixture removed;

Detail FIG. 27A is an isometric view of an embodiment of the extension blade of the present invention joined to the originally installed cut blade showing the details of the bonded structures;

FIG. 28 is an isometric view of an embodiment of the extension blade of the present invention joined to the originally installed cut blade showing an embodiment of the placement of the lower camber cover of the present invention and the upper camber cover of the present invention; and FIG. 28A is an isometric view of an embodiment of the extension blade joined to the originally installed cut blade showing the bonding of the lower camber cover of the present invention and the upper camber cover of the present invention.

DETAILED DESCRIPTION OF EMBODIMENTS

The present invention is composed of a number of fixtures and working tools that are used according to a procedure and in a predefined sequence to allow the in situ upgrade of wind turbines fitted with originally installed blades. The originally installed blades are worked out in sequence, one after another while in its installed position by means of the precise milling of the blade structure, removal of a portion of the tip and the installation of an extension blade.

While references may be made to upper, lower, vertical and horizontal, these terms are used merely to describe relationships and not to limit the operation or use of the present invention to any one orientation.

First Embodiment

Figure 1:
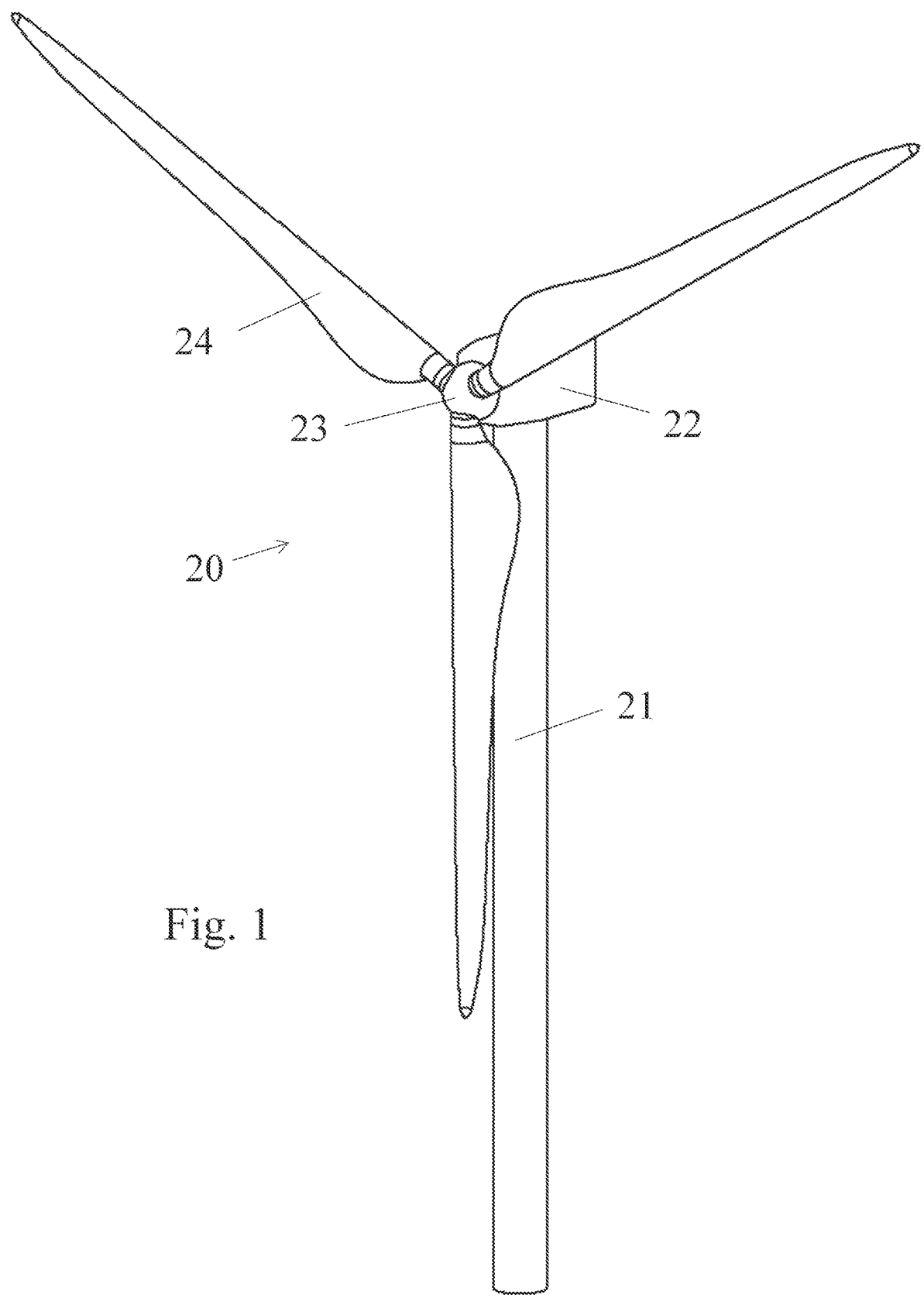
FIG. 1 is an isometric view of a wind turbine fitted with originally installed blades.

FIG. 1 shows a wind turbine 20 composed of a tower 21 that supports a nacelle 22. A hub 23 provides a means to fixate a set of three originally installed blades 24 that are responsible to catch the wind energy and transfer it to the hub 23 and the generator axle (not shown) to produce electricity. The hub 23 holds the mechanism that allows the originally installed blades 24 to pivot and catch the incoming wind at varying attack angles to optimize rotational speed to produce as much energy as possible for the wind speed and weather conditions and protects the originally installed blades 24 from wind gusts and storms.

Figure 2:
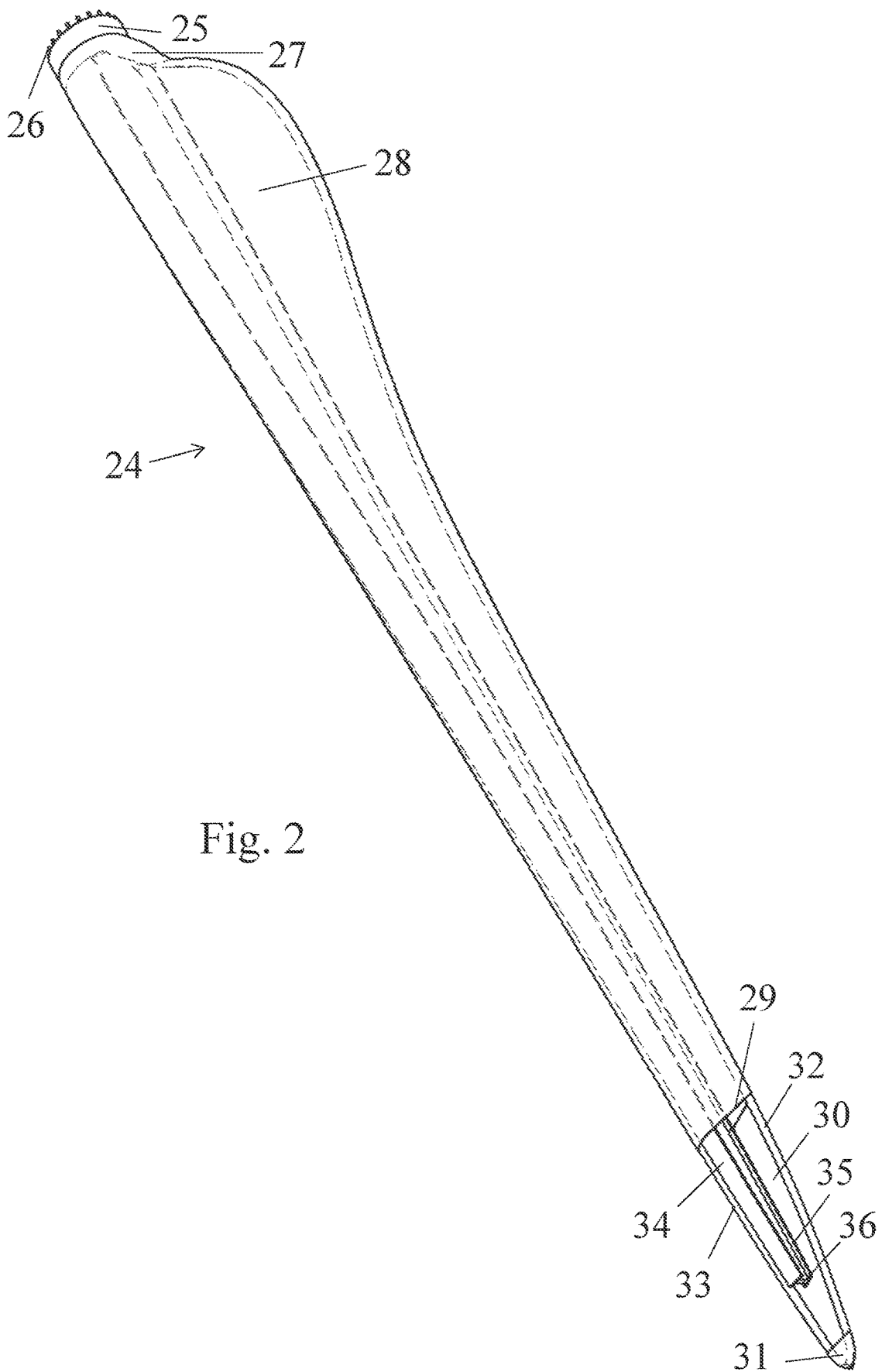
FIG. 2 is an isometric view of an originally installed blade showing its internal structure.

FIG. 2 shows the originally installed blade 24 that is composed of a root cylinder 25 that has several studs 26 configured to allow the proper fixation of the originally installed blade 24 to the hub 23. The originally installed blade 24 is also composed of a transition sector 27, an originally installed blade body 28, an originally installed blade cut portion 30, and an originally installed blade tip 31.

An originally installed blade section point 29 separates the originally installed blade body 28 and the originally installed blade cut portion 30.

There is no clear separation between the originally installed blade body 28 and the originally installed blade cut portion 30 that are essentially the same body that constitutes the bulk of the originally installed blade 24. The distinction is made to facilitate the description and understanding of the upgrade process, that alters and removes structures in the originally installed blade cut portion 30 and keeps the originally installed blade body 28 unchanged.

Between the originally installed blade section point 29 and the originally installed blade tip 31, the outer skin of the originally installed blade cut portion 30 has been removed in this illustration to allow a better view of the key internal components that are altered during the upgrade process. Dashed lines are used to indicate where these components extend into the unaltered portion of the originally installed blade 24 prior to the originally installed blade section point 29.

A trailing edge bonding strip 32 that runs throughout the trailing edge of the originally installed blade 24 provides the structural integrity of the trailing edge of the originally installed blade 24. A leading edge bonding strip 33 that runs throughout the leading edge of the originally installed blade 24 provides the structural integrity of the leading edge of the originally installed blade 24.

An upper camber sparcap 34 and a lower camber sparcap 35 separated by a beam core 36 form the shape of an I-beam that runs throughout almost the entire length of the originally installed blade 24 from the root cylinder 25 almost to the originally installed blade tip 31. The upper camber sparcap 34 and the lower camber sparcap 35 separated by the beam core 36 provide most of the structural integrity of the originally installed blade 24, prevent warping and torsion, and stop at a short distance from the originally installed blade tip 31 to save weight where the rest of the structure is strong enough to resist the loads.

FIG. 3 shows an embodiment of an extension blade 37 of the present invention that is manufactured, prior to the installation process of upgrading the originally installed blade 24.

In this embodiment, the extension blade 37 is constructed using light composite materials, mainly carbon fiber with epoxy resin and other suitable materials that provide strength with light weight. The shape of the extension blade 37 is designed for the individual wind turbine model with an upper surface camber and a lower surface camber and aerodynamic profile that matches the specific originally installed blade 24 used. The extension blade 37 is composed of four sectors that perform different functions: an extension blade straight sector 38, an extension blade turn sector 39, an extension blade main sector 40, and an extension blade tip 41.

The extension blade straight sector 38 is a relatively short sector that serves the purpose of facilitating the alignment of the extension blade 37 with the originally installed blade 24.

The extension blade turn sector 39 has a curved profile that turns outward to increase the clearance between the installed extension blade 37 and the tower 21 to avoid a potential collision of the extension blade main sector 40 or the extension blade tip 41 with the tower 21 during a storm or a wind gust.

The extension blade main sector 40 is where most of the aerodynamic force that turns the extension blade 37 with the originally installed blade 24 is produced and the extension blade tip 41 provides a low turbulence termination of the structure.

An extension blade upper camber sparcap 42 and an extension blade lower camber sparcap 43 separated by an extension blade beam core 44a, 44b form the shape of an I-beam that runs throughout the extension blade 37 stopping short of the extension blade tip 41. The extension blade upper camber sparcap 42 and the extension blade lower camber sparcap 43 separated by the extension blade beam core 44a, 44b provide the structural integrity to the extension blade 37 allowing the extension blade 37 to retain its intended shape, including the outward turn at the extension blade turn sector 39 resisting deformation and fatigue.

An extension blade trailing edge bonding strip 45a, 45b provides the structural integrity of the trailing edge and an extension blade leading edge bonding strip 46a, 46b provides the structural integrity of the leading edge of the of the extension blade 37.

The extension blade upper camber sparcap 42 terminates in an extension blade upper camber sparcap tapering 47 that provides a smooth transition and an adequate surface to bond the extension blade 37 into the originally installed blade 24.

The extension blade lower camber sparcap 43 terminates in an extension blade lower camber sparcap tapering 48 that provides a smooth transition and an adequate surface to bond the extension blade 37 into the originally installed blade 24.

FIG. 4 shows one originally installed blade 24 that is composed of the root cylinder 25 that has several studs 26 to allow the proper fixation of the originally installed blade 24 to the hub 23. The originally installed blade 24 is also composed of the transition sector 27 the originally installed blade body 28, and the originally installed blade tip 31.

The originally installed blade section point 29 indicated by a dashed line separates the originally installed blade body 28 and the originally installed blade cut portion 30.

There is no clear separation between the originally installed blade body 28 and the originally installed blade cut portion 30 that are essentially the same body that constitutes the bulk of the originally installed blade 24. The distinction is made to facilitate the description and understanding of the upgrade process, that alters and removes structures in the originally installed blade cut portion 30 and keeps the originally installed blade body 28 unchanged.

FIG. 5 shows an embodiment of one extended blade 49 of the present invention that has one portion that is not altered and remains identical to the originally installed blade of FIG. 4 composed of the root cylinder 25 with several studs 26, the transition sector 27, and the originally installed blade body 28.

The different portion of the extended blade 49 is composed of the extension blade 37 plus an extension blade joint sector 50 that are added during the upgrade process.

The extension blade 37 has four sectors: the extension blade straight sector 38, the extension blade turn sector 39, the extension blade main sector 40, and the extension blade tip 41. The extension blade straight sector 38 has a profile that provides a smooth straight continuation of the extension blade joint sector 50. The extension blade turn sector 39 has a curved profile that turns outward to increase the clearance to the tower 21 to avoid a potential collision of the extension blade main sector 40 or the extension blade tip 41 with the tower 21 during a storm or a wind gust.

The extension blade joint sector 50 is the sector where the actual upgrade work takes place and contains altered components from the originally installed blade 24 that are joined to components from the extension blade 37.

Figure 6:
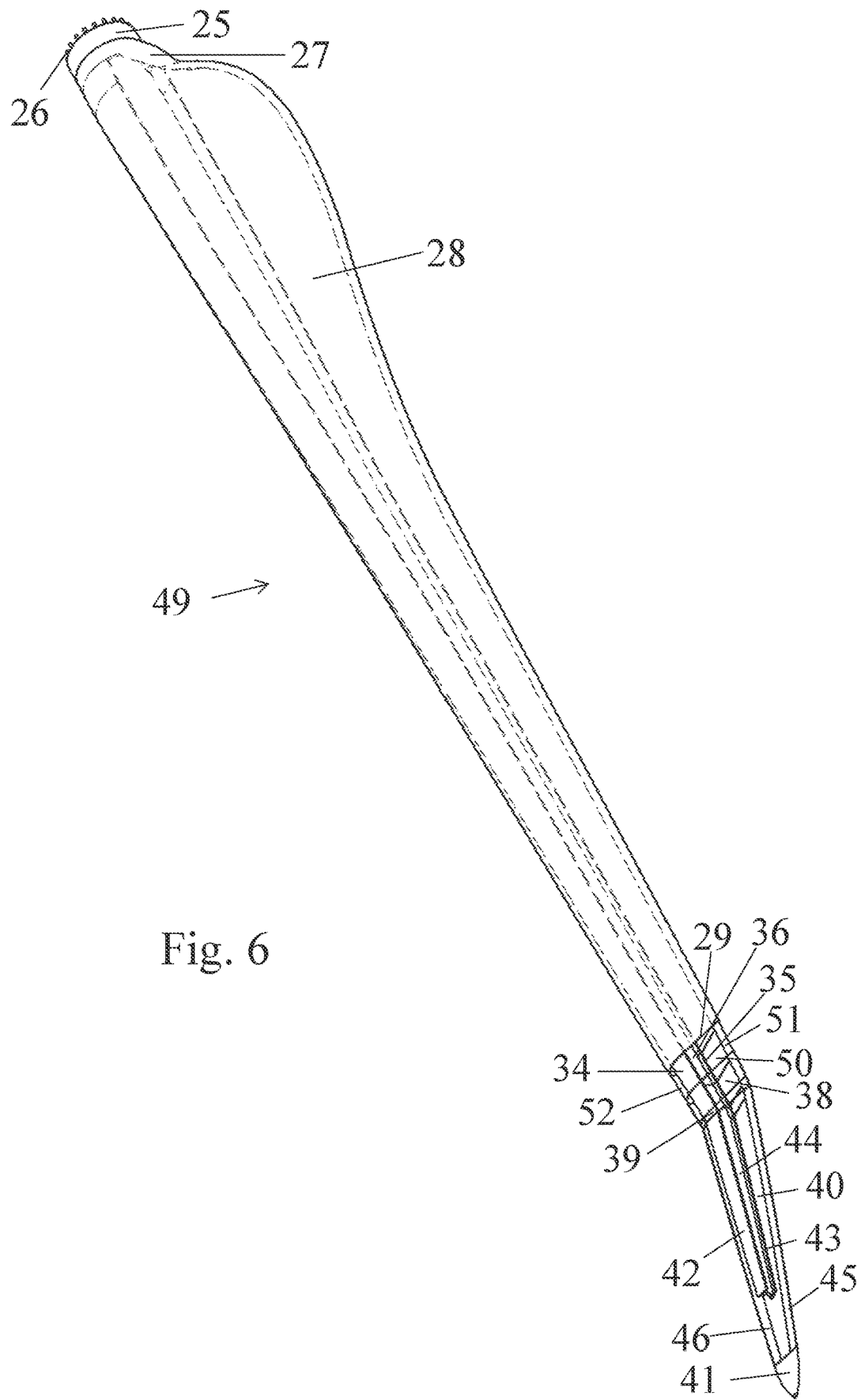
FIG. 6 is an isometric view of the embodiment of the extended blade of FIG. 5 showing an embodiment of its internal structure.

FIG. 6 shows an embodiment of the extended blade 49 installed on the originally installed blade 24. The originally installed blade 24 up to the originally installed blade section point 29 is composed of the root cylinder 25 with several studs 26, the transition sector 27, and the originally installed blade body 28 that remain unchanged, identical to the originally installed blade 24 as shown in FIG. 2.

Between the originally installed blade section point 29 and the extension blade tip 41, the outer skin of the extended blade 49 has been removed in this illustration to allow a better view of the key internal components. Dashed lines are used to indicate where these components extend into the unaltered portion of the extended blade 49 prior to the originally installed blade section point 29.

A joint sector trailing edge bonding strip 51 provides the structural integrity of the trailing edge and a joint sector leading edge bonding strip 52 provides the structural integrity of the leading edge of the of the extension blade joint sector 50. At the originally installed blade section point 29, only the outer skin of the originally installed blade body 28 is cut. The upper camber sparcap 34, the lower camber sparcap 35 and the beam core 36 are not cut at the originally installed blade section point 29, but instead extend into the extension blade joint sector 50. To allow a strong bond, the upper camber sparcap 34 and the lower camber sparcap 35 are altered within the extension blade joint sector 50 as explained in subsequent figures.

The extension blade upper camber sparcap 42 and the extension blade lower camber sparcap 43 separated by the extension blade beam core 44 form the shape of an I-beam that runs throughout the extension blade straight sector 38, the extension blade turn sector 39, and the extension blade main sector 40 and stops short of the extension blade tip 41.

The extension blade trailing edge bonding strip 45 provides the structural integrity of the trailing edge, and the extension blade leading edge bonding strip 46 provides the structural integrity of the leading edge for the extension blade straight sector 38, the extension blade turn sector 39, and the extension blade main sector 40 until the extension blade tip 41.

Figures 7, 7A:
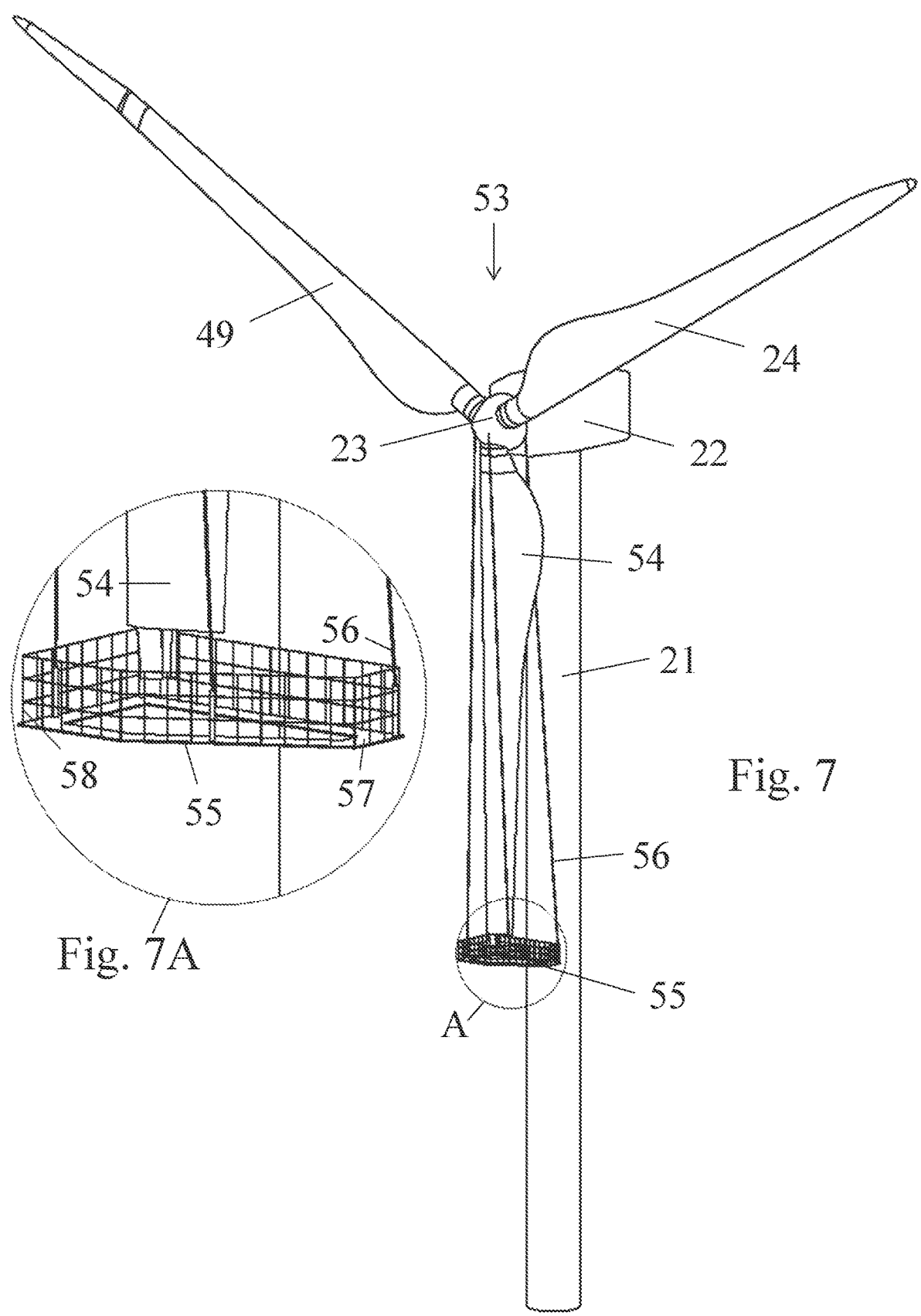
FIG. 7 is an isometric view of an wind turbine under upgrade showing a work platform.
FIG. 7A is an isometric view of the work platform.

FIG. 7 shows a wind turbine under upgrade 53 showing an intermediate step of the upgrade process where the wind turbine under upgrade 53 has a blade under work 54 currently being altered, one extended blade 49 already completed, and one originally installed blade 24 still in its original condition waiting for its turn to be altered.

The work is performed in one blade under work 54 at a time using a work platform 55 that is attached to the structure using a set of steel cables 56. The blade under work 54 is kept in the vertical position parallel to the tower 21 and the work platform 55 allows full access to all surfaces of the blade under work 54 that need to be altered. Appropriate measures are taken inside the nacelle 22 to lock the hub 23 to prevent any rotation and keep the blades in a fixed position until the completion of the current upgrade on the blade under work 54. Once the upgrade of the blade under work 54 is completed, the hub 23 is allowed to turn 120 degrees to reach the next blade until all originally installed blades 24 have been upgraded with the extended blades 49 of the present invention.

Detail FIG. 7A shows the point of the blade under work 54 being altered in greater magnification to allow a better view of the work platform 55 that is composed of a platform floor 57 that encircles the blade under work 54 to allow full access to all surfaces of the blade under work 54. The work platform 55 has a safety rail 58 with multiple anchoring points to attach safety lines offering additional protection for the working crew. The work platform 55 is attached to appropriate load points in the structure by steel cables 56.

Figure 8:
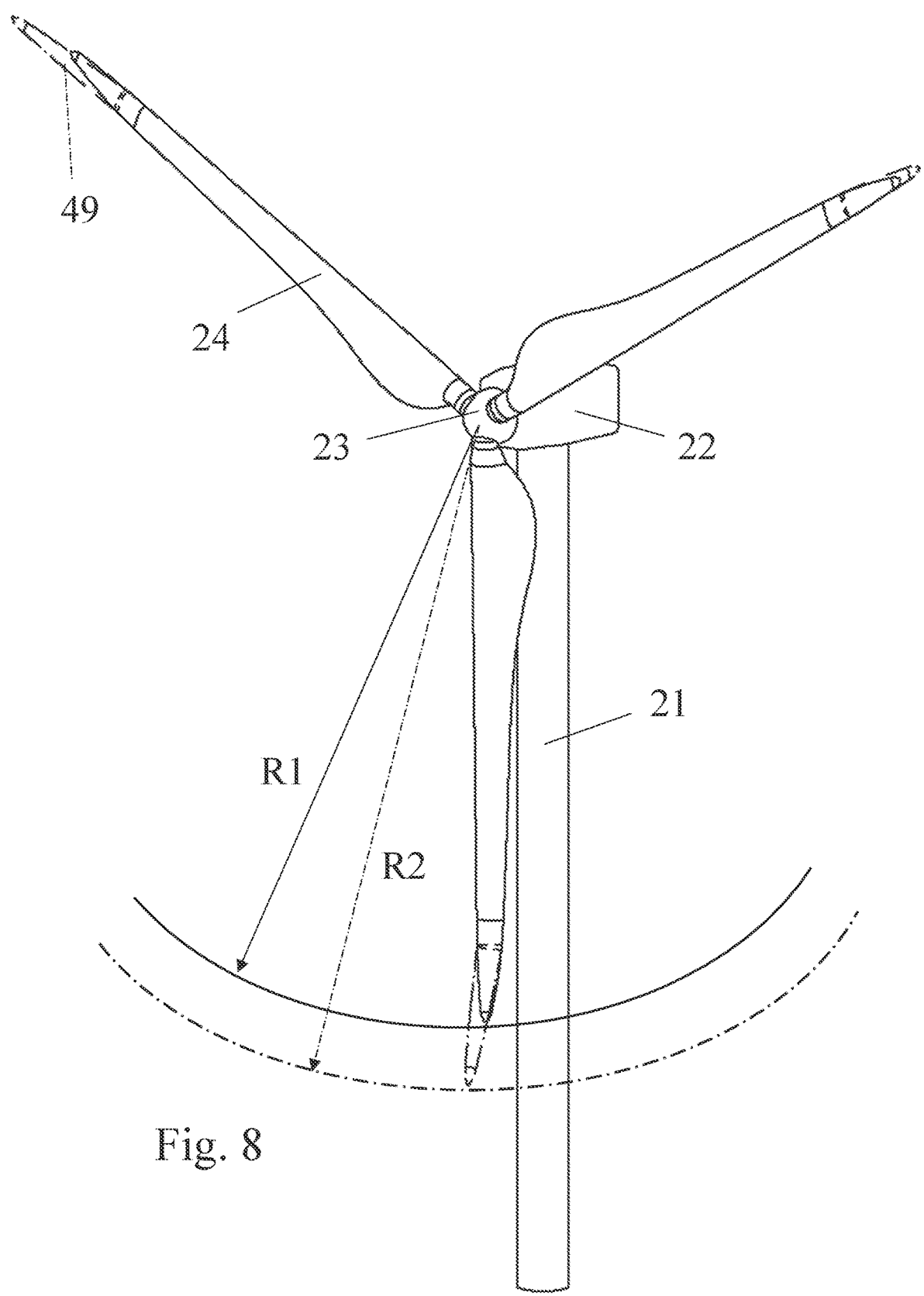
FIG. 8 is an isometric overlaid view of a wind turbine fitted with originally installed blades and an embodiment of a wind turbine under upgrade fitted with an embodiment of the extended blades of the present invention to show the increase in the diameter of the rotor and increase in cross section.

FIG. 8 shows an overlaid view of the wind turbine before and after the upgrade. The original wind turbine is equipped with three originally installed blades 24 connected to the hub 23 and supported by the tower 21 and the nacelle 22. After the upgrade, all three originally installed blades 24 have been modified to include the extended blades 49 that are longer than the originally installed blades 24. The difference is indicated by comparing the R1 radius achieved by the originally installed blades 24 with the R2 radius achieved by the extended blades 49. Based on the weight and durability of the carbon fiber or other composite material of the extended blade 49, the increase in radius from R1 to R2 may be as much as 15 percent which means an average increase in power generation of up to 20 percent.

Figure 9:
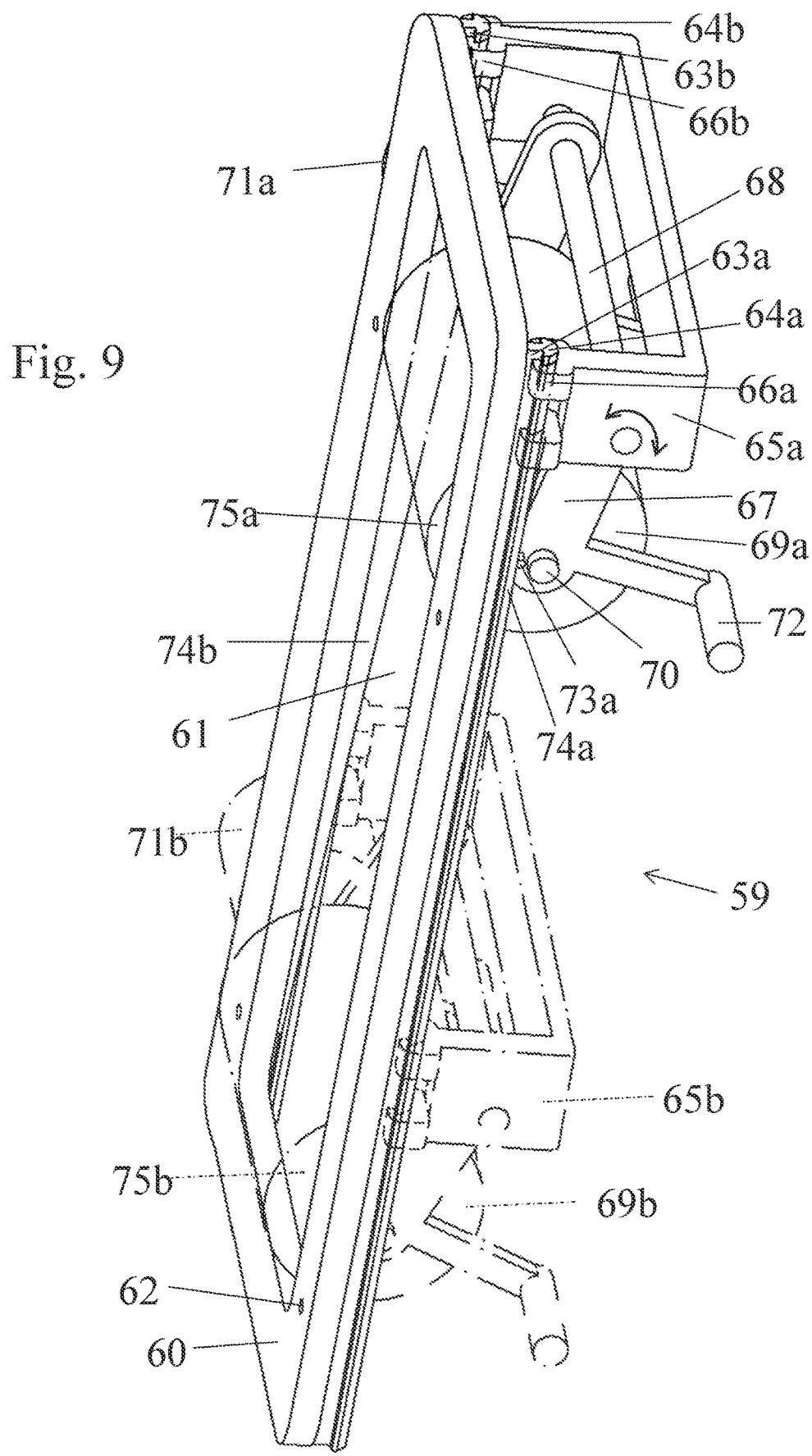
FIG. 9 is an isometric overlaid view of an embodiment of a lower camber rail-guided milling tool of the present invention.

FIG. 9 shows an embodiment of a lower camber rail-guided milling tool 59 that is used to alter the structures in the lower camber portion of the originally installed blade 24. The lower camber rail-guided milling tool 59 is composed of a lower frame 60 that has the matching shape of the lower camber of the originally installed blade 24 at the point it is installed to ensure a perfect fit along the lower camber surface of the originally installed blade 24. The lower frame 60 encircles a lower working area 61 where the milling is performed.

The lower frame 60 contains a set of fixation holes 62 that are used to fixate the lower camber rail-guided milling tool 59 to the originally installed blade cut portion 30. This produces no damage as the originally installed blade cut portion 30 is later on in the upgrade process removed and no holes are left in the remaining surface.

The lower frame 60 provides the support for a pair of rails 63a, 63b. Each rail 63a, 63b has at the top a rail head 64a, 64b that is wider than the rail 63a, 63b. A sliding table 65 with a set of matching sliding table rail grooves 66a, 66b runs along the rails 63a, 63b in such a way that the sliding table rail grooves 66a, 66b encompass the rail heads 64a, 64b allowing the sliding table 65 to move only in the linear direction of the rails 63a, 63b.

A working arm 67 is connected to the sliding table 65 through a pivoting rod 68. A lower camber cutting wheel 69a spins on a revolving rod 70 that is powered by a power source 71 that can be pneumatic or electric.

A handle 72 allows an operator to move the working arm 67 up or down pivoting around the pivoting rod 68 as indicated by the curved double arrow and along the direction of the rails 63a, 63b. Once the lower camber rail-guided milling tool 59 is installed, the handles 72 allow the operator to apply force to press the lower camber cutting wheel 69a against the surface of the originally installed blade 24 to produce the intended alterations of milling the originally installed blade 24 to progressively remove material and form the milled surface in the intended tapering profile.

A stop pin 73a extending from the working arm 67 is configured to limit the pivoting movement of the working arm 67 so that the lower camber cutting wheel 69a can only mill the material to a certain depth. As the working arm 67 is rotated in the direction towards the surface of the originally installed blade 24, the lower camber cutting wheel 69a is pressed to the surface removing material from the surface until the stop pin 73a strikes a position along the lower cutting guide rail 74a stopping the rotation of the lower camber cutting wheel 69a. The working arm 67 is then rotated in the opposite direction moving the sliding table 65a along the lower cutting guide rail 74a, 74b to a next position. The working arm 67 is then turned again to press the lower camber cutting wheel 69a to the surface and remove additional material until the stop pin 73a strikes the lower cutting guide rail 74a. The process is repeated as the sliding table 65 moves along the lower cutting guide rail 74a, 74b to progressively remove material in steps using multiple passes to reduce heating and mechanical stress. The lower cutting guide rail 74a 74b may be located at both sides of the lower working area 61.

An overlaid version of the sliding table 65b and its associated components at the end of the excursion along the rails 63a, 63b is drawn in dashed dot lines to better show the progression of the maximum depth achieved by the lower camber cutting wheel 69a as the sliding table 65a, 65b moves from top 65a to bottom 65b.

As the lower cutting guide rail 74a, 74b get progressively lower as the sliding table 65a moves from the top to the bottom, the lower camber cutting wheel 69a is allowed to cut increasingly deeper into the outer skin and internal structures of the originally installed blade 24 according to a precise and defined tapering pattern given by the camber of the lower camber cutting wheel 69a along the lower cutting guide rail 74a, 74b as indicated by a drill depth 75a, 75b that increases from top 75a to bottom 75b.

The working arm 67 is configured to press the lower camber cutting wheel 69a to the surface to progressively remove the material in steps using multiple passes to reduce heating and mechanical stress. As the lower camber cutting wheel 69a continues removing material through the pressure applied to the working arm 67, the stop pin 73a eventually hits the lower cutting guide rail 74a, 74b preventing the cutting action to continue beyond the intended tapering profile thereby forming the surface of the originally installed blade 24 in the shape of the camber of the lower camber cutting wheel 69a. Eventually, the stop pin 73a stays in contact with the lower cutting guide rail 74a, 74b at all positions and the lower camber cutting wheel 69a reaches a position along the rail where no further milling of the material occurs and the process is complete.

Figure 10:
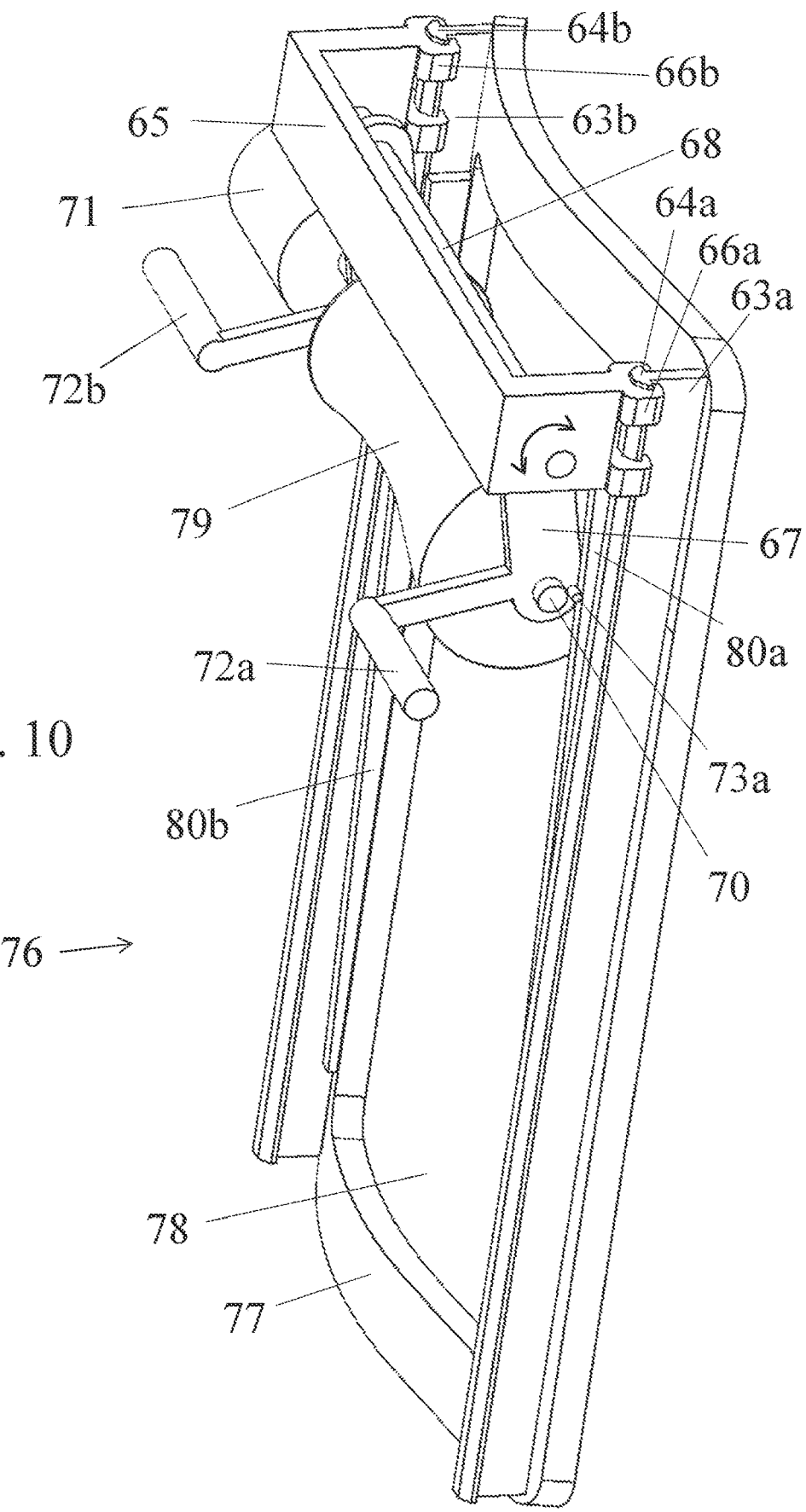
FIG. 10 is an isometric view of an embodiment of an upper camber rail-guided milling tool of the present invention.

FIG. 10 shows an embodiment of an upper camber rail-guided milling tool 76 that is used to alter the structures in the upper camber portion of the originally installed blade 24. The upper camber rail-guided milling tool 76 is composed of an upper frame 77 that has the matching shape of the upper camber of the originally installed blade 24 at the point it is installed to ensure a perfect fit along the upper camber surface of the originally installed blade 24. The upper frame 77 encircles an upper working area 78 where the milling is performed and provides the support for the rails 63a, 63b.

The rail heads 64a, 64b located at the top of each rail 63a, 63b are wider than the rails 63a, 63b allowing the sliding table 65 with the matching sliding table rail grooves 66a, 66b to run along the rails 63a, 63b. As the sliding table rail grooves 66a, 66b encompass the rail heads 64a, 64b, the sliding table 65 is allowed to move only in the linear direction of the rails 63a, 63b.

The working arm 67 is connected to the sliding table 65 through the pivoting rod 68. An upper camber cutting wheel 79 spins on the revolving rod 70 that is powered by the power source 71 that can be pneumatic or electric.

The handles 72a, 72b are configured to rotate the working arm 67 to move the upper camber cutting wheel 79 towards a surface or rotate in the opposite direction around the pivoting rod 68 as indicated by the curved double arrow and to move the sliding table 65 along the direction of the rails 63a, 63b. Once the upper camber rail-guided milling tool 76 is installed, the handles 72a, 72b are configured to apply sufficient force to press the upper camber cutting wheel 79 against the surface of the originally installed blade to produce the intended alterations of cutting the originally installed blade 24 in the intended tapering profile.

The stop pin 73a extending from the working arm 67 is configured to limit the pivoting movement of the working arm 67 so that the upper camber cutting wheel 79 can only mill the material to a certain depth at each position along the upper cutting guide rails 80a, 80b.

The upper cutting guide rails 80a, 80b may be located at both sides of the upper working area 78 and may be positioned at an angle with respect to the axis of the upper frame 77 so that the upper cutting guide rails 80a, 80b get progressively closer to the upper frame 77 so that as the sliding table 65 moves from the top to the bottom, the upper camber cutting wheel 79 is allowed to cut increasingly deeper into the outer skin and internal structures of the originally installed blade according to a precise and defined tapering pattern given by the angle of the upper cutting guide rails 80a, 80b with respect to the axis of the upper frame 77.

The working arm 67 is configured to press the upper camber cutting wheel 79 to progressively remove the material in steps using multiple passes as the sliding table 65 and the upper camber cutting wheel 79 are moved to a next position. In each position, the upper camber cutting wheel 79 is pressed to the surface until the stop pin 73a strikes the upper cutting guide rails 80a, 80b limiting the removal of material from the surface to a specific depth. The progressive steps reduce heating and mechanical stress to prevent warping of the originally installed blade 24. As the upper camber cutting wheel 79 continues removing material, the striking of the stop pin 73a to the upper cutting guide rail 80a prevents milling of the surface beyond the intended tapering profile thereby forming the originally installed blade 24 in the shape of the camber of the upper camber cutting wheel 79. Eventually, due to the angle of the upper cutting guide rail 80a, 80b with respect to the axis of the upper frame 77, the upper camber cutting wheel 79 reaches a position along the upper cutting guide rail 80a, 80b where at all positions no further milling occurs and the process is complete.

Figure 11:
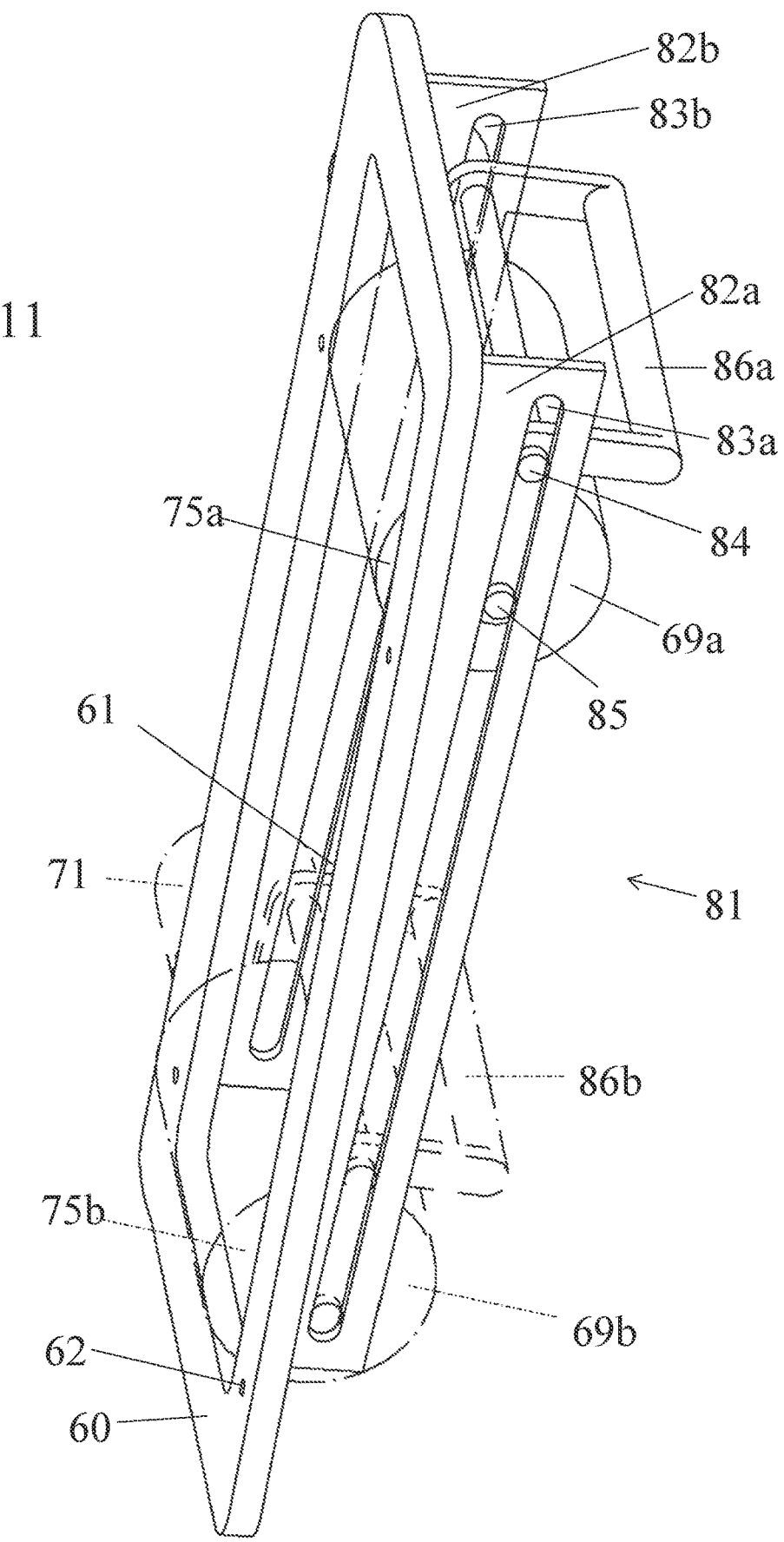
FIG. 11 is an isometric overlaid view of an alternative embodiment of the lower camber rail-guided milling tool of the present invention.
Figure 12:
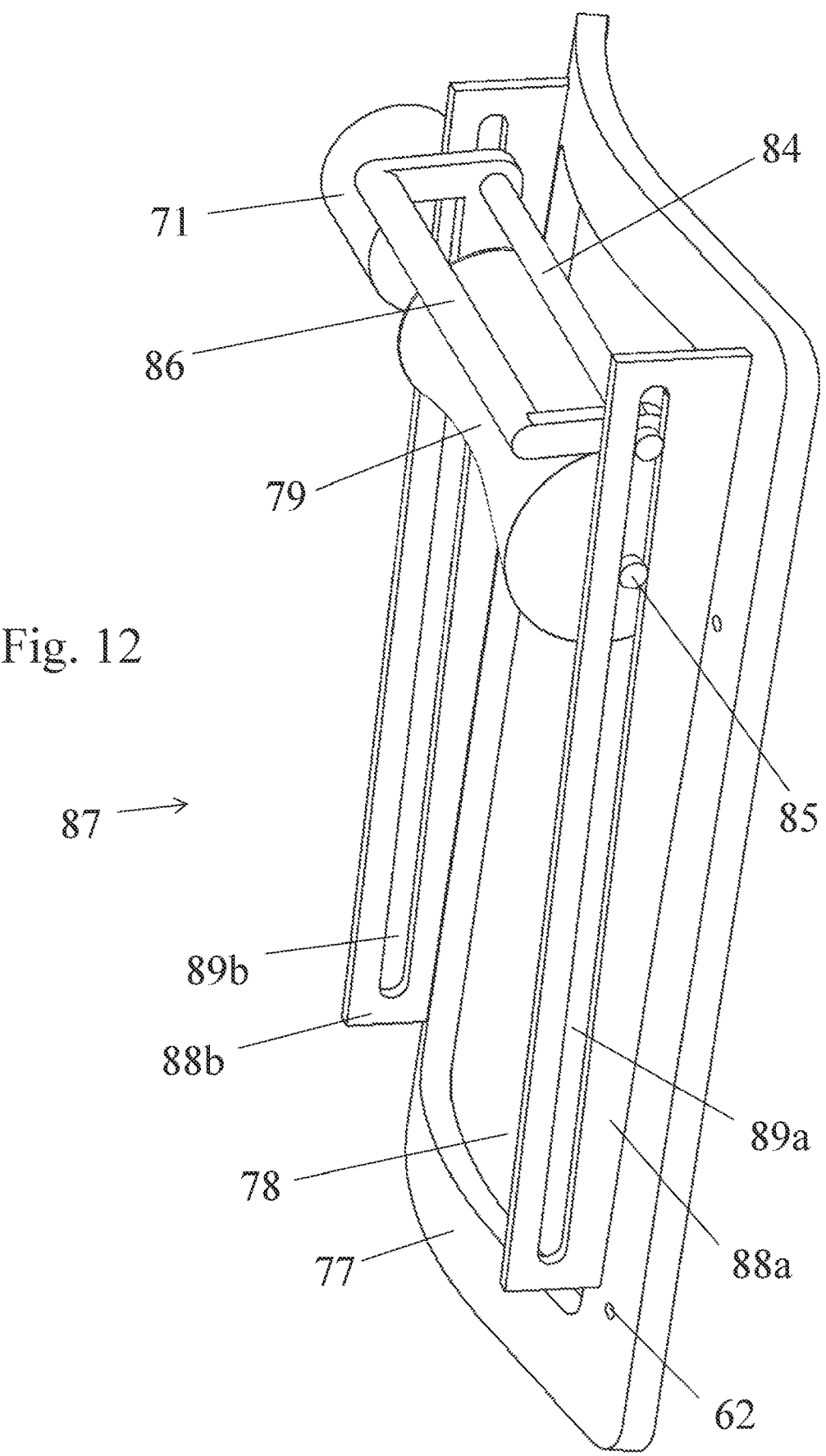
FIG. 12 is an isometric view of an alternative embodiment of the upper camber rail-guided milling tool of the present invention.
Figure 13:
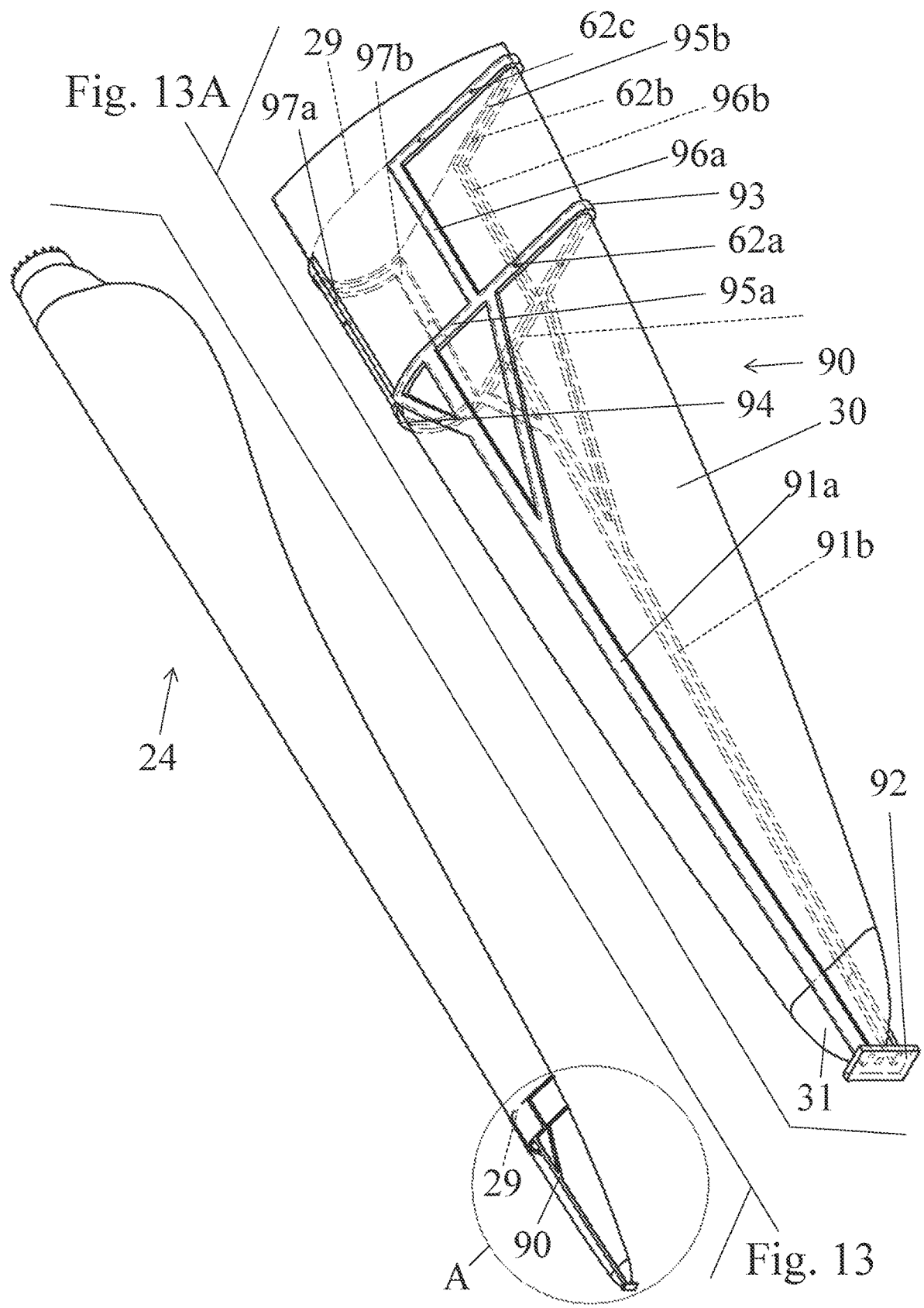
FIG. 13 is an isometric view of an embodiment of a tool positioning fixture placed at the tip of an originally installed blade.

FIG. 11 is described in the second embodiment section.
FIG. 12 is described in the second embodiment section.
FIG. 13 shows a tool positioning fixture 90 installed at the tip of the originally installed blade 24. The tool positioning fixture 90 is used to precisely determine the location that needs to be milled as the first step of the upgrade process of the originally installed blade 24. Once the milling is complete, the tool positioning fixture 90 is used as reference to assist in cutting the outer skin of the originally installed blade 24 along the originally installed blade section point 29.

Detail FIG. 13A shows the tool positioning fixture 90 installed at the tip of the originally installed blade in the originally installed blade cut portion 30 in greater magnification to shows its features. The tool positioning fixture 90 allows the precise determination of the milling position by means of the determination of distances to fixed references in the originally installed blade cut portion 30. A pair of tip distancing bars 91a, 91b located at both sides of the originally installed blade cut portion 30 and a tip reference plate 92 provides a reference to the originally installed blade tip 31. A trailing edge reference 93 provides a reference to the trailing edge of the originally installed blade cut portion 30 and a leading edge reference 94 provides a reference to the leading edge of the originally installed blade cut portion 30. This arrangement guarantees the precise positioning of the tool positioning fixture 90 and as a result the precise positioning of a base alignment bar 95a, 95b (i.e., a first base alignment bar and a second base alignment bar), a trailing edge alignment bar 96a, 96b, and a leading edge alignment bar 97a, 97b, that serve as a frame for the positioning of the lower camber rail-guided milling tool 59 and the upper camber rail-guided milling tool 76 on both sides of the originally installed blade cut portion 30.

The tool positioning fixture 90 is attached to the originally installed blade cut portion 30 using the fixation holes 62. This produces no damage as the originally installed blade cut portion 30 is later on in the upgrade process removed and no holes are left in the remaining surface. To that effect, the tool positioning fixture 90 is used as reference to assist in cutting the outer skin of the originally installed blade 24 along the originally installed blade section point 29.

Figure 14:
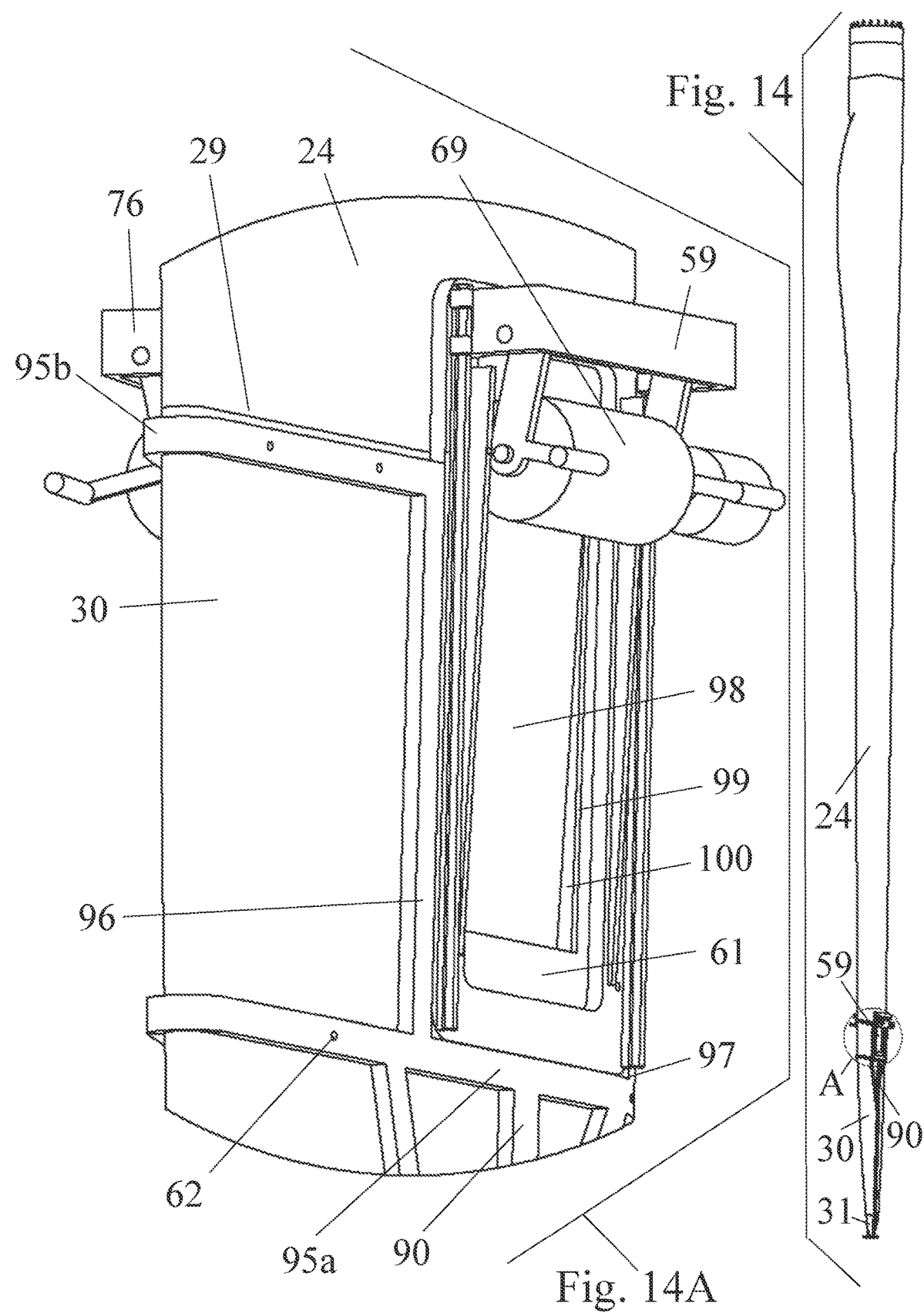
FIG. 14 is an isometric view of the originally installed blade showing the placement of an embodiment of the lower camber rail-guided milling tool of the present invention using the tool positioning fixture of the present invention.

FIG. 14 shows the originally installed blade 24 with the tool positioning fixture 90 installed at the originally installed blade tip 31 providing the precise positioning for the lower camber rail-guided milling tool 59.

Detail FIG. 14A shows the lower camber rail-guided milling tool 59 and the upper camber rail-guided milling tool 76 on their installation positions provided by the tool positioning fixture 90 in greater magnification. The lower camber rail-guided milling tool 59 fits perfectly in the frame provided by the base alignment bars 95a and 95b, the trailing edge alignment bar 96, and the leading edge alignment bar 97 on the lower camber of the originally installed blade 24. The upper camber rail-guided milling tool 76 is indicated in detail FIG. 14A only as reference for better understanding of the role of the tool positioning fixture 90. See FIG. 15 and detail FIG. 15A.

The tool positioning fixture 90 is kept firmly in place with the use of the fixation holes 62 that are all placed in the originally installed blade cut portion 30. Once the alterations are completed, the lower camber rail-guided milling tool 59 is removed and the originally installed blade cut portion 30 is removed by cutting along the originally installed blade section point 29 using the tool positioning fixture 90 as reference to assist the working crews to cut the outer skin of the originally installed blade 24 see FIG. 13 and detail FIG. 13A.

Detail FIG. 14A also shows a lower camber alteration 98 produced by the lower camber cutting wheel 69 inside the lower working area 61 consisting of a lower camber outer skin cut 99 that removes the outer skin of the originally installed blade 24 and a lower camber sparcap cut 100 that produces a progressive tapering in the lower camber sparcap that are the results of the milling action on the lower camber surface of the originally installed blade 24.

Figure 15:
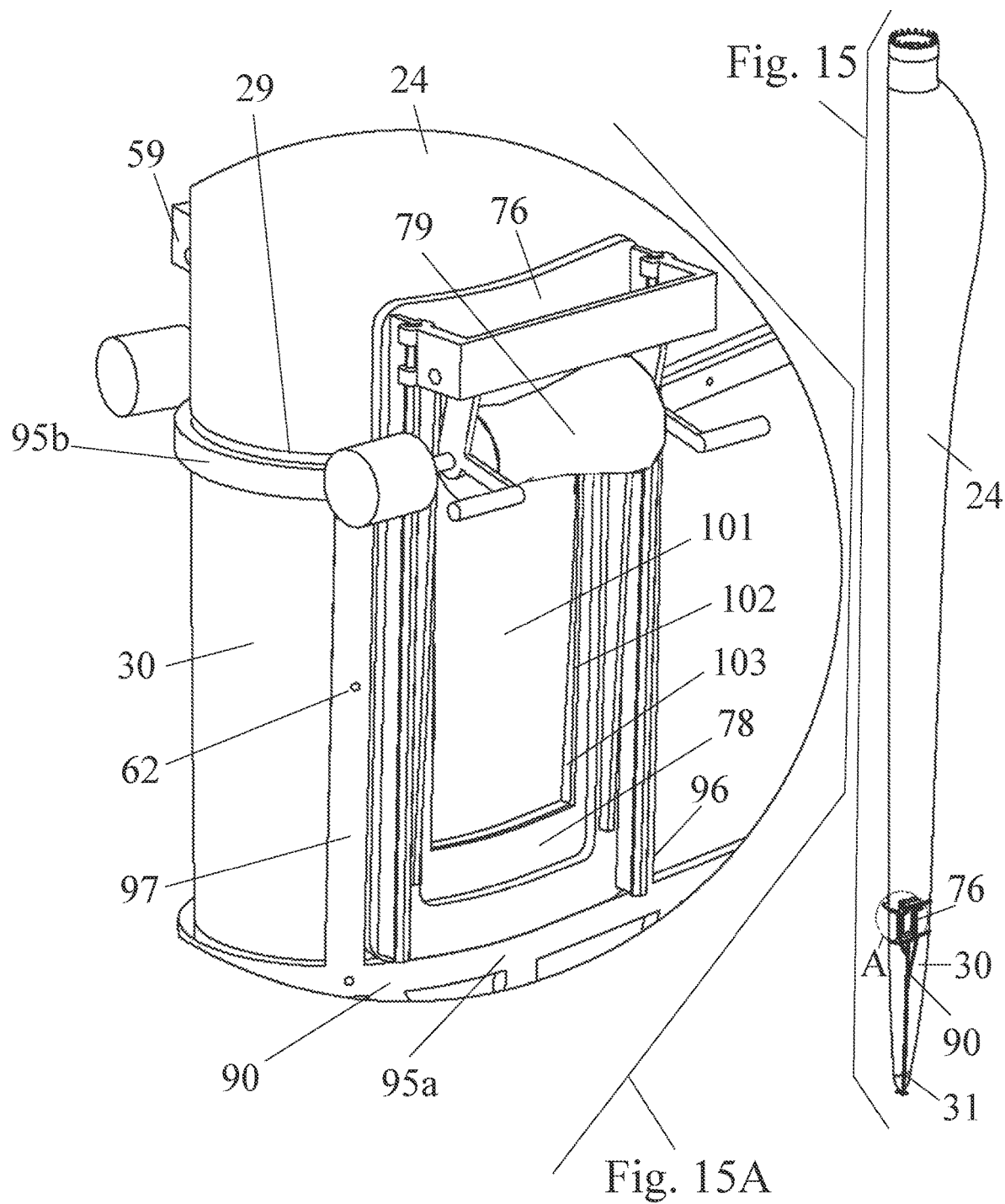
FIG. 15 is an isometric view of the originally installed blade showing the placement of an embodiment of the upper camber rail-guided milling tool of the present invention using the tool positioning fixture of the present invention.

FIG. 15 shows the originally installed blade 24 with the tool positioning fixture 90 installed at the originally installed blade tip 31 providing the precise positioning for the upper camber rail-guided milling tool 76.

Detail FIG. 15A shows the upper camber rail-guided milling tool 76 and the lower camber rail-guided milling tool 59 on their installation positions provided by the tool positioning fixture 90 in greater magnification. The upper camber rail-guided milling tool 76 fits perfectly in the frame provided by the base alignment bars 95a and 95b, the trailing edge alignment bar 96, and the leading edge alignment bar 97 on the upper camber of the originally installed blade 24. The lower camber rail-guided milling tool 59 is indicated in detail FIG. 15A only as reference for better understanding of the role of the tool positioning fixture 90. See FIG. 14 and detail FIG. 14A.

The tool positioning fixture 90 is kept firmly in place with the use of the fixation holes 62 that are all placed in the originally installed blade cut portion 30. Once the alterations are completed, the upper camber rail-guided milling tool 76 is removed and the originally installed blade cut portion 30 is removed by cutting along the originally installed blade section point 29 using the tool positioning fixture 90 as reference to assist in cutting the outer skin of the originally installed blade 24 see FIG. 13 and detail FIG. 13A.

Detail FIG. 15A also shows an upper camber alteration 101 produced by the upper camber cutting wheel 79 inside the upper working area 78 consisting of an upper camber outer skin cut 102 that removes the outer skin of the originally installed blade 24 and an upper camber sparcap cut 103 that produces a progressive tapering in the upper camber sparcap that are the results of the milling action on the upper camber surface of the originally installed blade 24.

Figure 16:
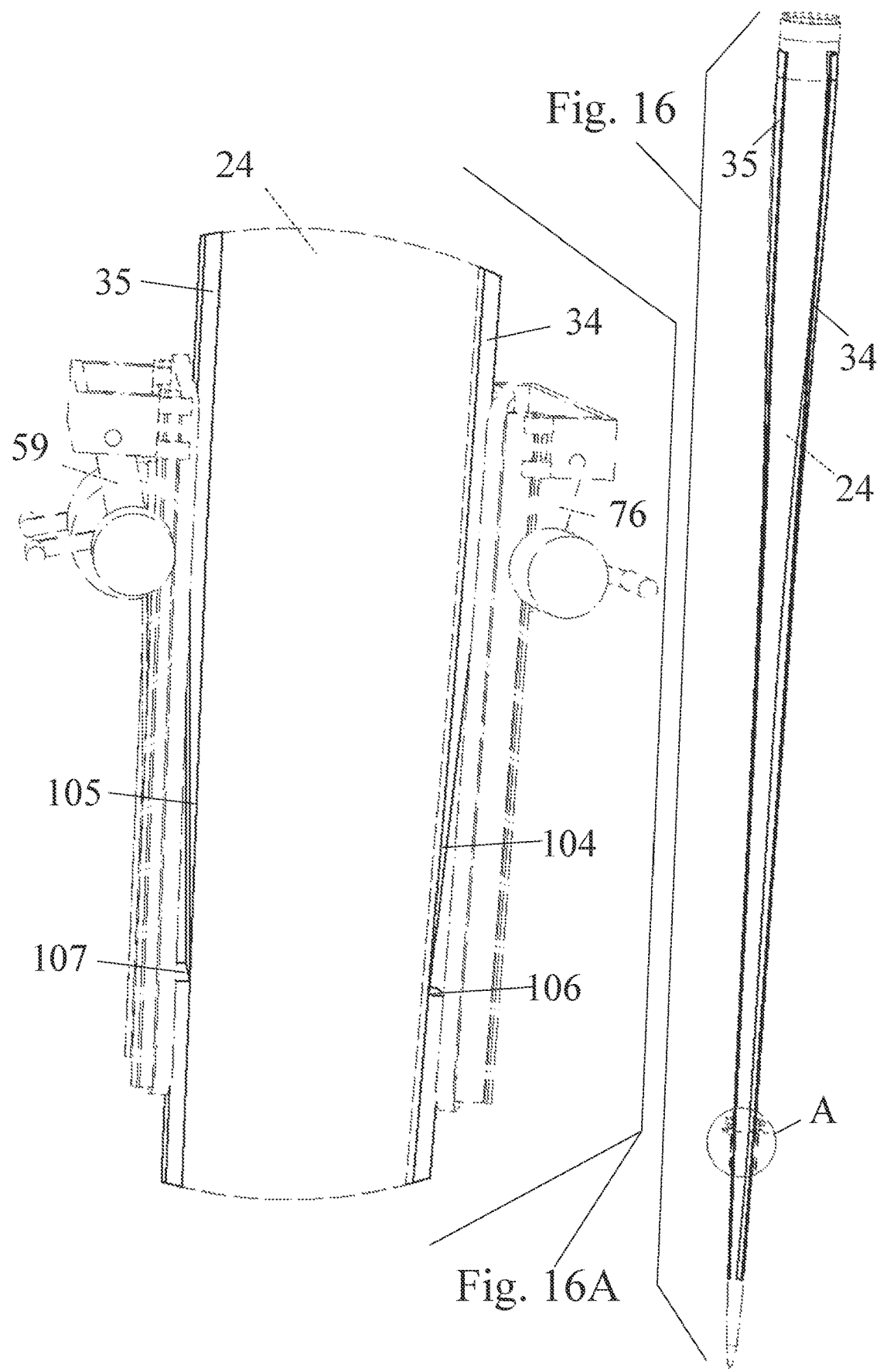
FIG. 16 is an isometric view of the upper camber sparcap and the lower camber sparcap inside the originally installed blade.

FIG. 16 shows the upper camber sparcap 34 and the lower camber sparcap 35 inside the originally installed blade 24 to better illustrate the end result of the alterations described in FIG. 15, detail FIG. 15A, FIG. 14, and detail FIG. 14A.

Detail FIG. 16A shows the upper camber sparcap 34 and the lower camber sparcap 35 inside the originally installed blade 24 as well as the upper camber rail-guided milling tool 76 and the lower camber rail-guided milling tool 59 in greater magnification.

As a result of the milling, a tapered upper camber sparcap 104 is produced on the upper camber sparcap 34 terminating at an upper camber sparcap milling end point 106 where the upper camber sparcap 34 is subsequently cut. A tapered lower camber sparcap 105 is produced on the lower camber sparcap 35 terminating at a lower camber sparcap milling end point 107 where the lower camber sparcap 35 is subsequently cut.

Figure 17:
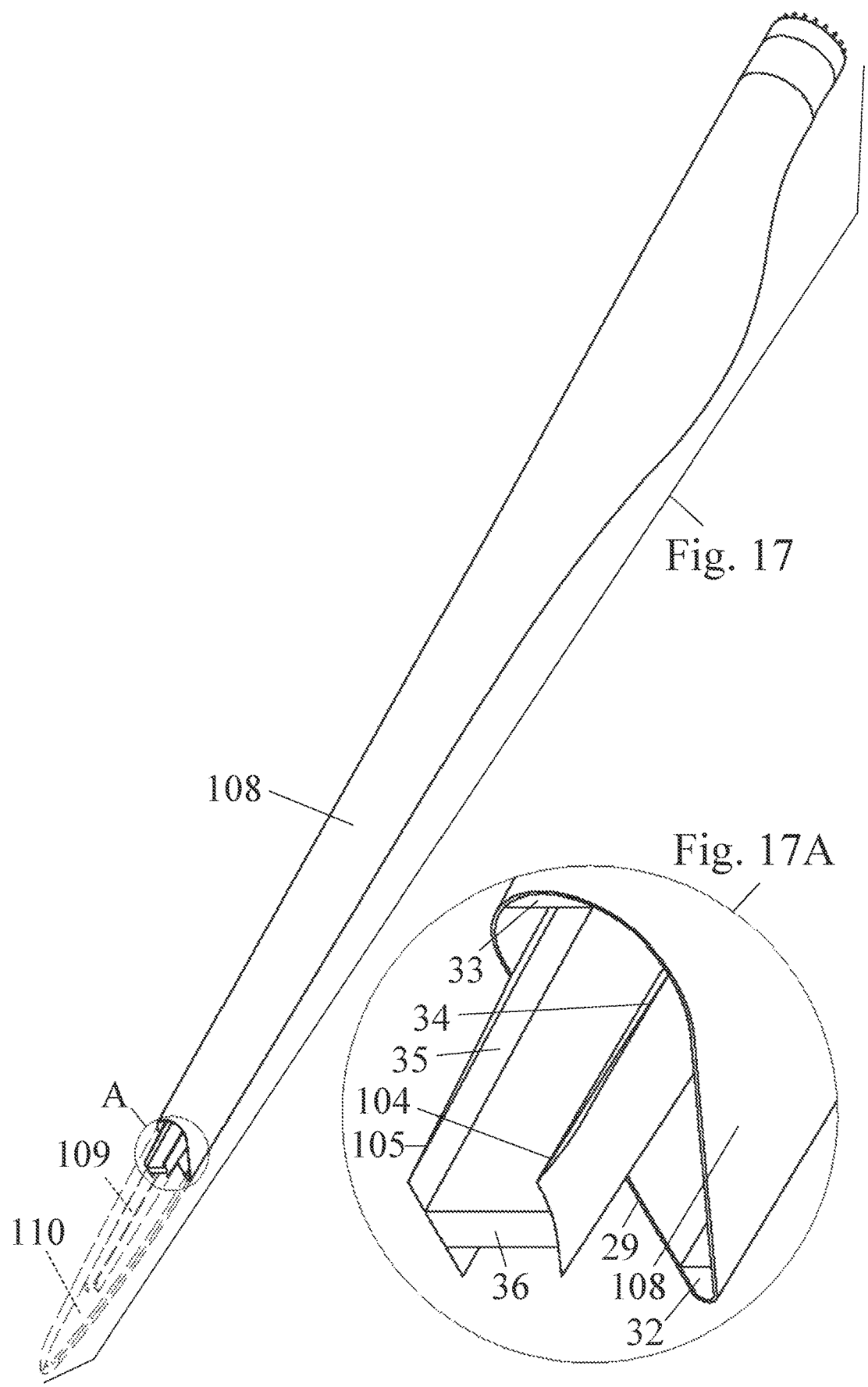
FIG. 17 is an isometric view of an embodiment of the originally installed cut blade by the milling process of the present invention with dotted lines showing an outline of the discarded tip.

FIG. 17 shows an originally installed cut blade 108 resulting from the process of milling and cutting of the originally installed blade that removes a discarded sparcap 109 and a discarded tip 110.

Detail FIG. 17A shows the area of the originally installed cut blade 108 that was altered in greater magnification to better illustrate the alterations produced using the upper camber rail-guided milling tool 76 and the lower camber rail-guided milling tool 59 of the present invention to form the surface of the tapered upper camber sparcap 104 in the shape of the camber of the upper camber cutting wheel 79 and to form the surface of the tapered lower camber sparcap 105 in the shape of the camber of the lower camber cutting wheel 69.

The outer skin of the originally installed blade 24 as well as the trailing edge bonding strip 32 and the leading edge bonding strip 33 are cut at the originally installed blade section point 29. The upper camber sparcap 34, the lower camber sparcap 35 and the beam core 36 are cut at the end point of the milling of the upper camber sparcap 34 and the lower camber sparcap 35 leaving the tapered upper camber sparcap 104 and the tapered lower camber sparcap 105 extending out further than the cut at the originally installed blade section point 29 as seen on detail FIG. 17A.

Figure 18:
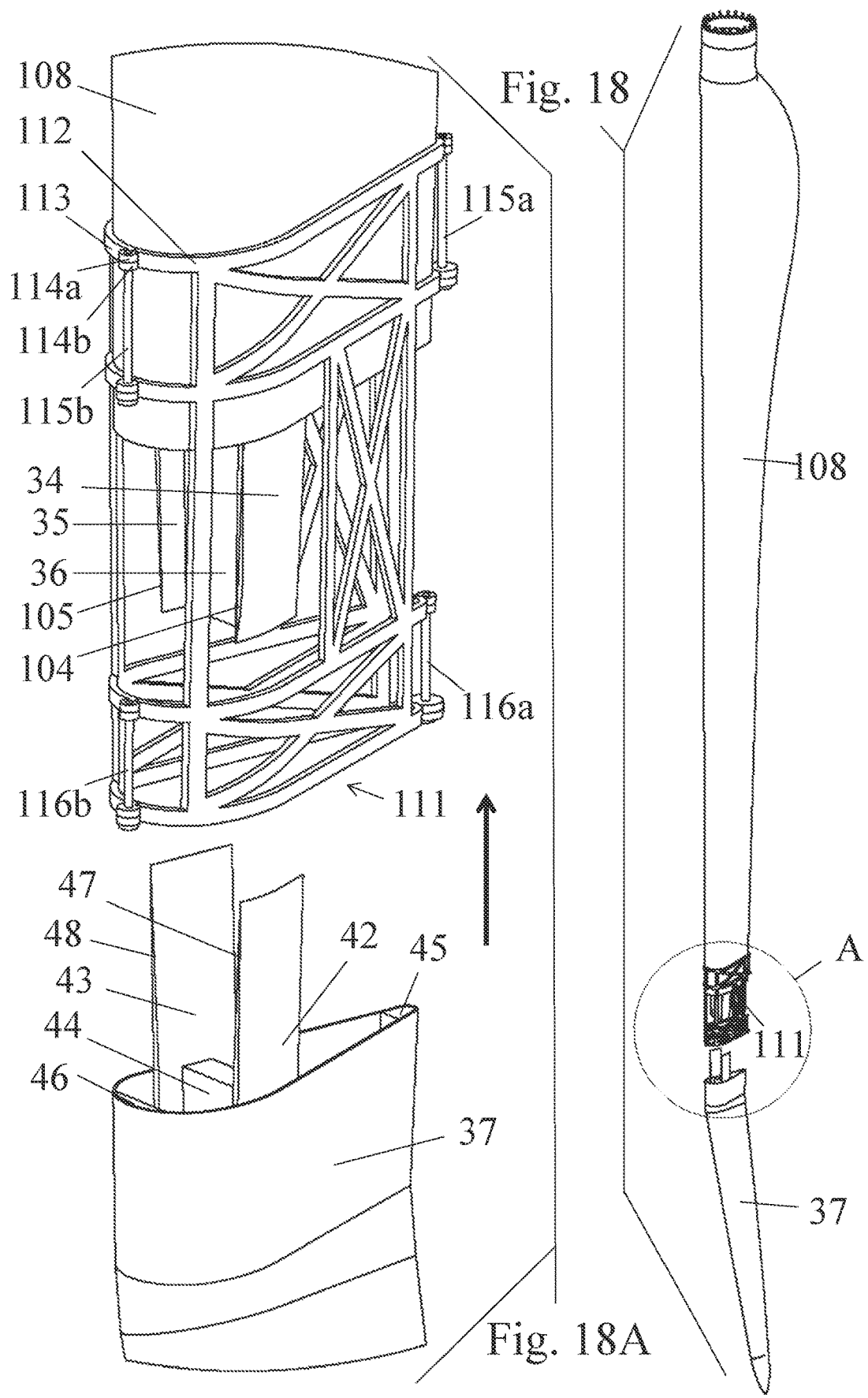
FIG. 18 is an isometric view of the originally installed cut blade and an embodiment of the extension blade of the present invention.

FIG. 18 shows an embodiment of an alignment fixture 111 that is used to join the originally installed cut blade 108 with an embodiment of the extension blade 37.

Detail FIG. 18A shows the embodiment of the alignment fixture 111 shown in FIG. 18 that is composed of an upper camber alignment fixture 112 and a lower camber alignment fixture 113. The upper camber alignment fixture 112 and the lower camber alignment fixture 113 are fitted with a set of joining rings 114a, 114b, etc. that are locked using a pair of front joining pins 115a, 115b in the portion of the alignment fixture 111 that is designed to fit to the originally installed cut blade 108 and a pair of rear joining pins 116a, 116b in the portion of the alignment fixture 111 that is designed to fit to the extension blade 37.

The alignment fixture 111 provides a stable and precise reference to align and hold the originally installed cut blade 108 and the extension blade 37 in place while the bonding resin is applied and hardens.

The upper camber sparcap 34 is bonded to the extension blade upper camber sparcap 42 and the lower camber sparcap 35 is bonded to the extension blade lower camber sparcap 43. The bonding is made stronger because the tapered upper camber sparcap 104 matches the extension blade upper camber sparcap tapering 47 and the tapered lower camber sparcap 105 matches the extension blade lower camber sparcap tapering 48 increasing the surface area of the joint and the smooth tapering reduces the tension on the parts.

The beam core 36 and the extension blade beam core 44 are joined and stay perfectly aligned completing the structural integrity of the joint. The extension blade trailing edge bonding strip 45 and the extension blade leading edge bonding strip 46 are bonded to their counterparts on a subsequent phase of the process.

Figure 19:
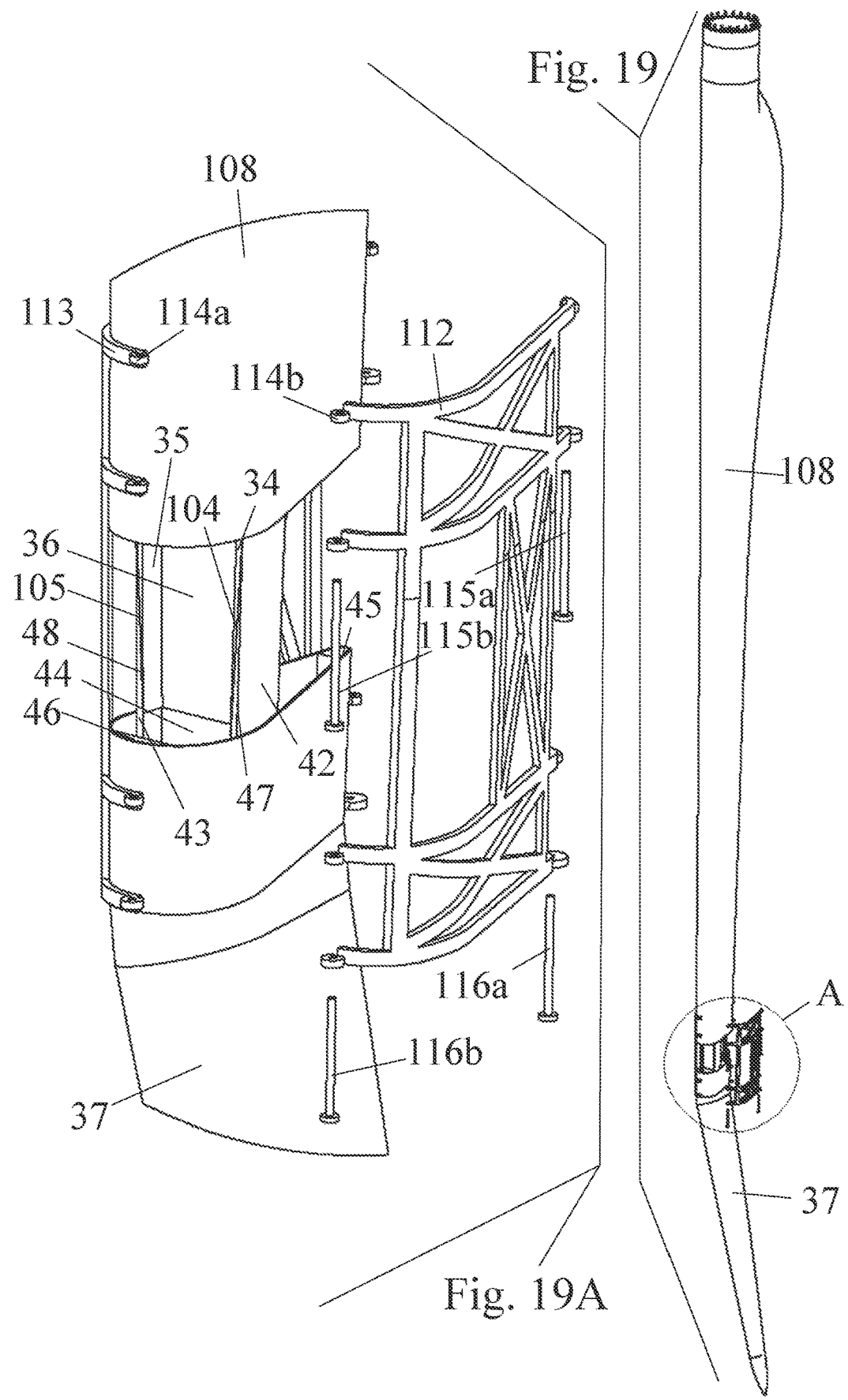
FIG. 19 is an isometric view of an embodiment of the extension blade of the present invention joined to the originally installed cut blade.

FIG. 19 shows the alignment fixture being taken apart to remove it once the bonding of the originally installed cut blade 108 with the extension blade 37 is complete.

Detail FIG. 19A shows the front joining pins 115a, 115b and the rear joining pins 116a, 116b removed from the joining rings 114a, 114b and the upper camber alignment fixture 112 and the lower camber alignment fixture 113 taken apart revealing the originally installed cut blade 108 bonded with the extension blade 37.

The upper camber sparcap 34 is bonded to the extension blade upper camber sparcap 42 and the lower camber sparcap 35 is bonded to the extension blade lower camber sparcap 43. The bonding is made stronger because the tapered upper camber sparcap 104 matches the extension blade upper camber sparcap tapering 47 and the tapered lower camber sparcap 105 matches the extension blade lower camber sparcap tapering 48 increasing the surface area of the joint and the smooth tapering reduces the tension on the parts.

The beam core 36 and the extension blade beam core 44 are joined and stay perfectly aligned completing the structural integrity of the joint. The extension blade trailing edge bonding strip 45 and the extension blade leading edge bonding strip 46 are bonded to their counterparts on a subsequent phase of the process.

Figure 20:
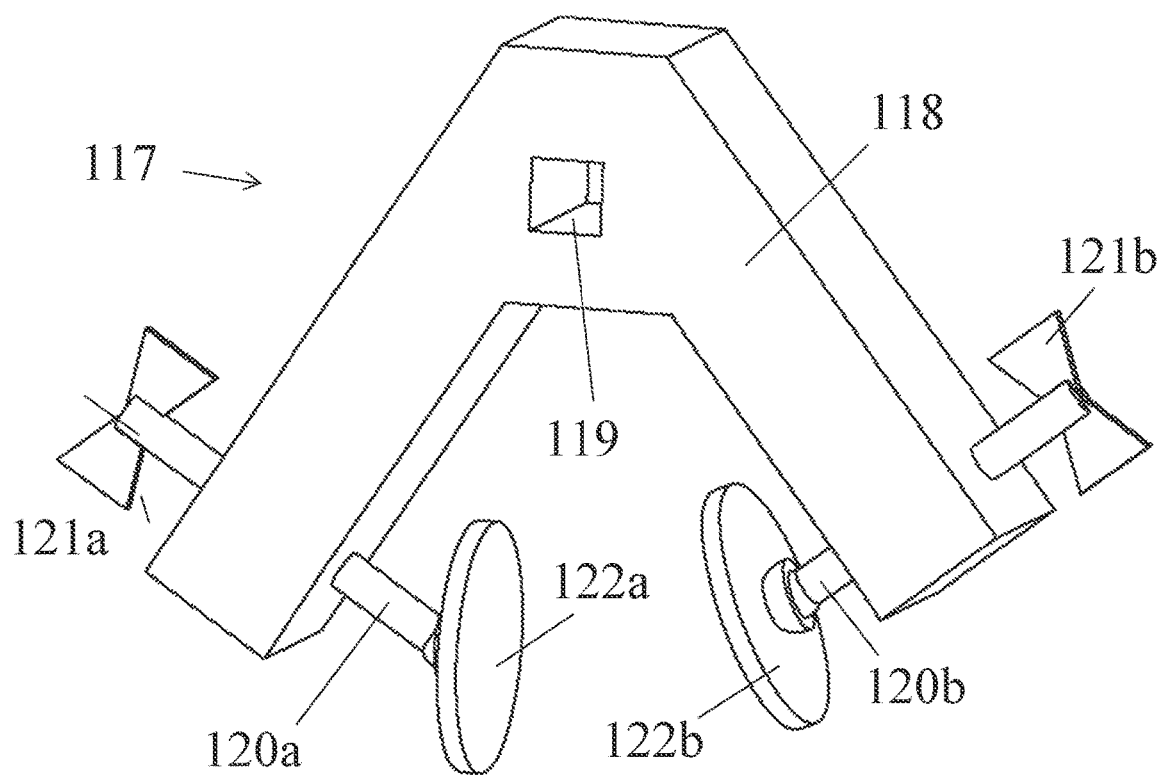
FIG. 20 is an isometric view of an embodiment of the airfoil trailing edge brace.
Figure 21:
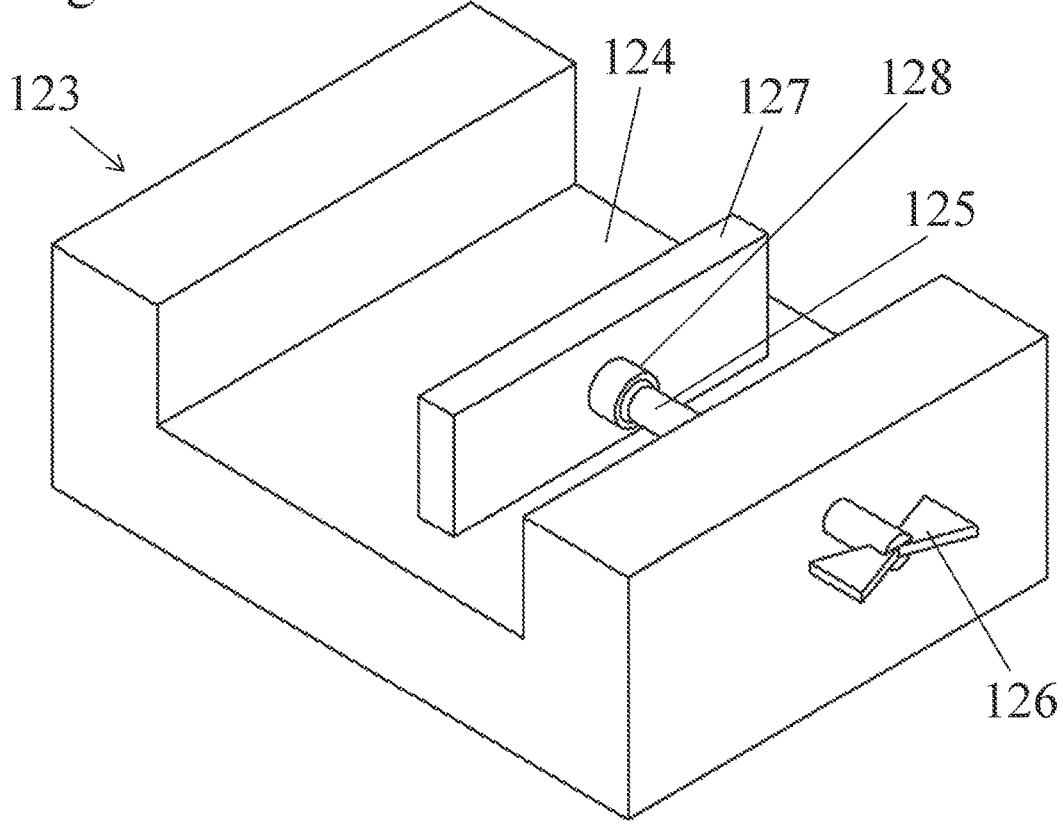
FIG. 21 is an isometric view of an embodiment of the fixture clamp.
Figure 22:
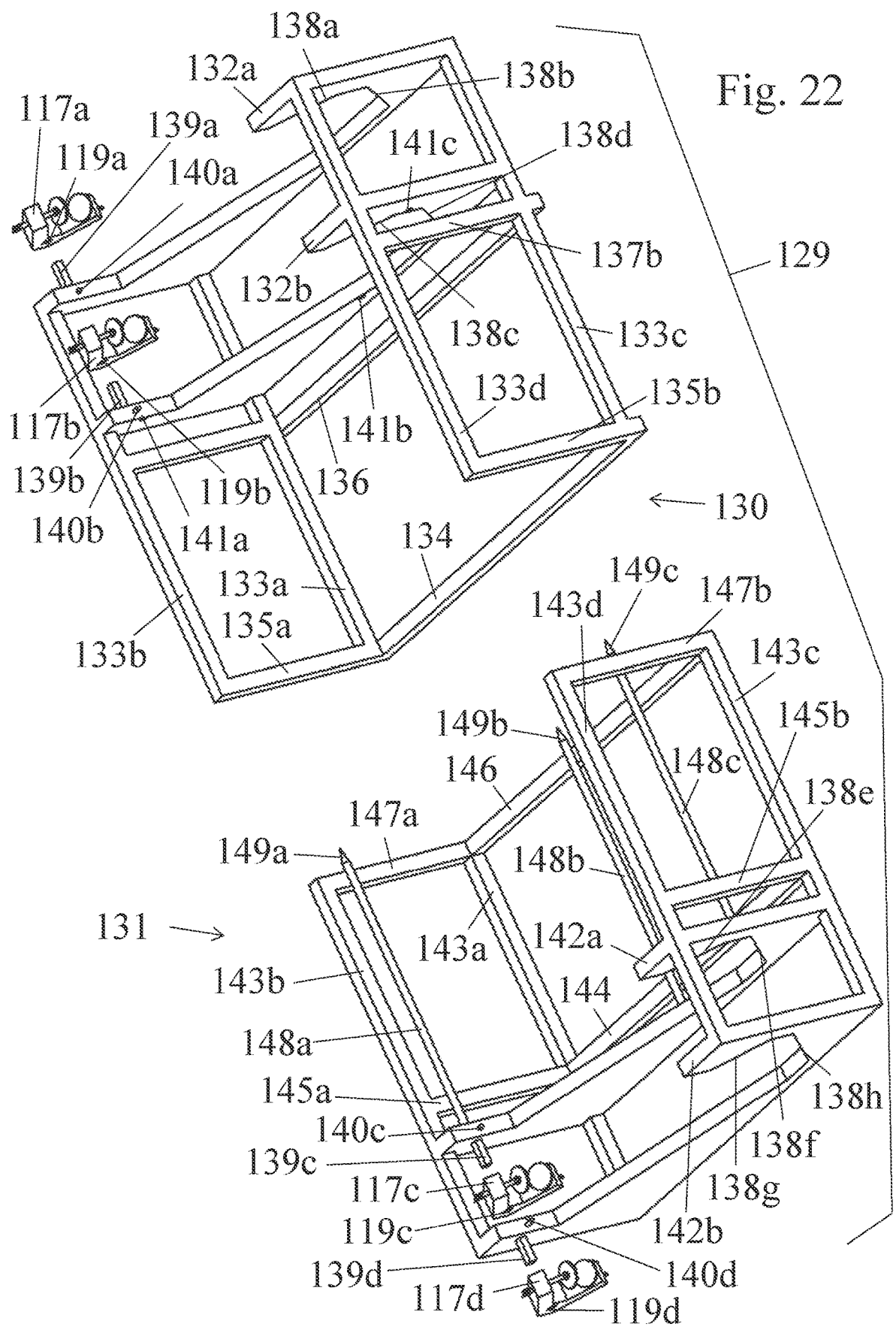
FIG. 22 is an isometric view of the alternative embodiment of the align fixture.
Figure 23:
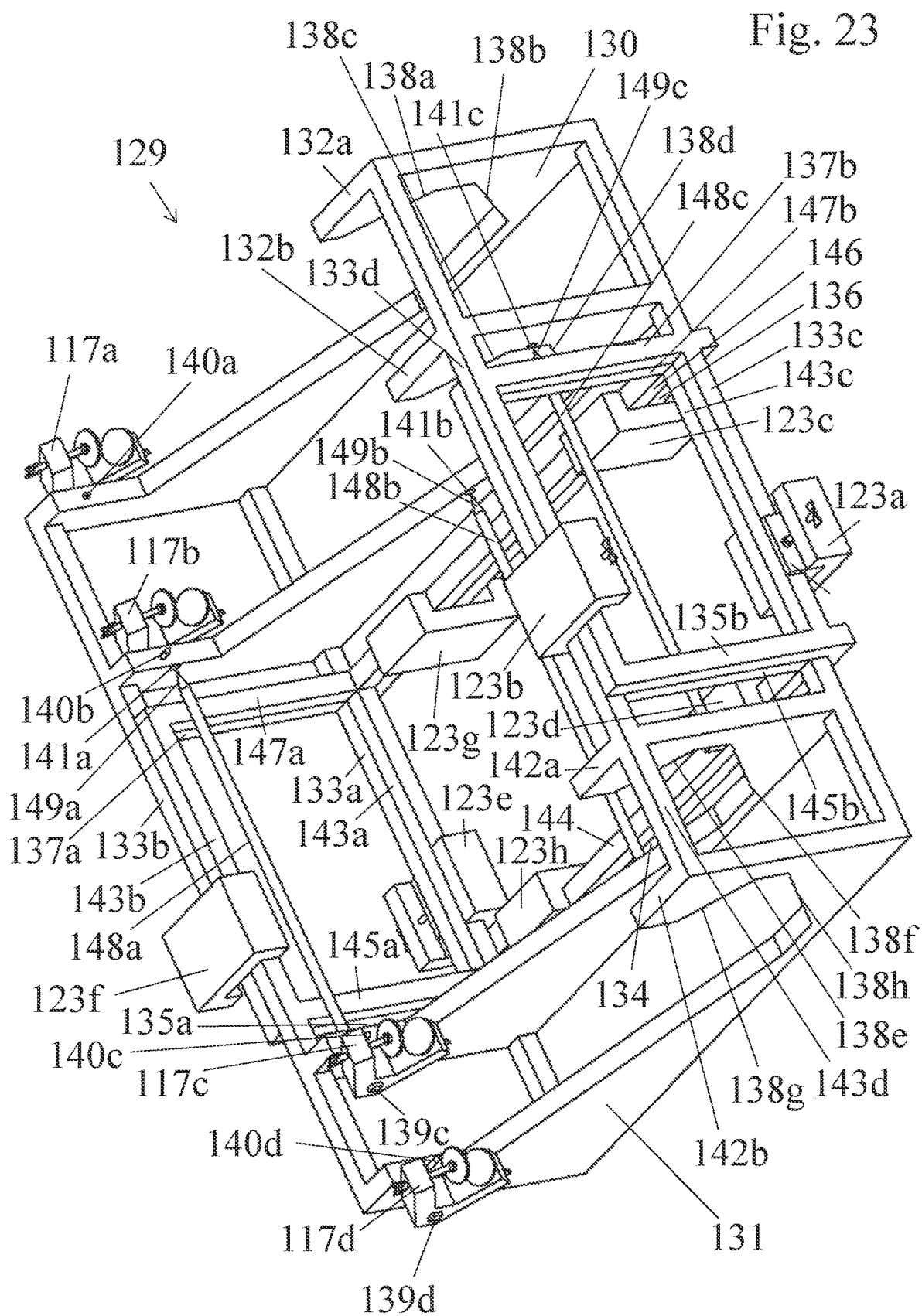
FIG. 23 is an isometric view of the alternative embodiment of the align fixture locked with a set of fixture clamps.
Figure 24:
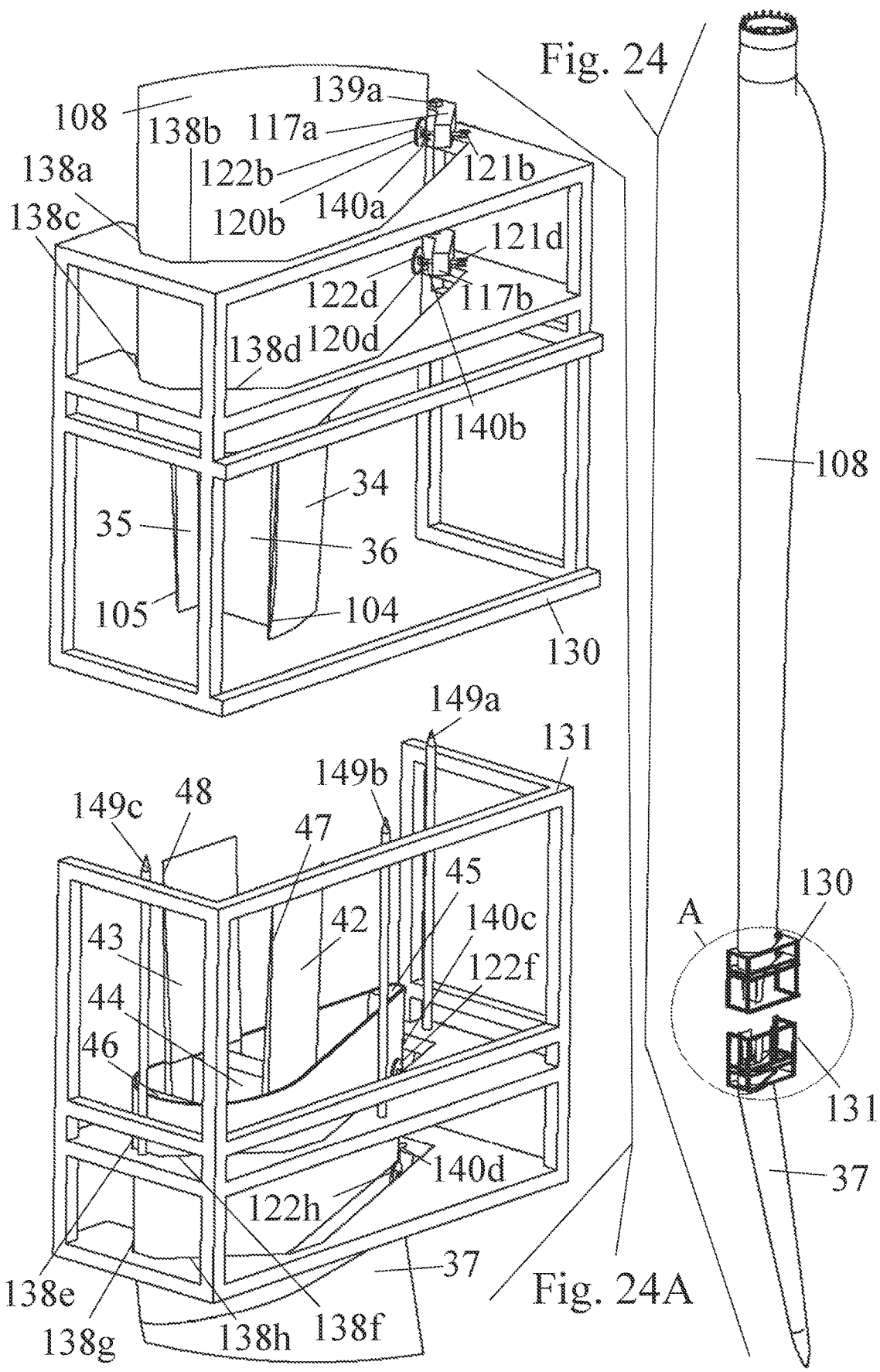
FIG. 24 is an isometric view of an embodiment of the originally installed cut blade and the extension blade with the alternative embodiment of the align fixture.
Figure 25:
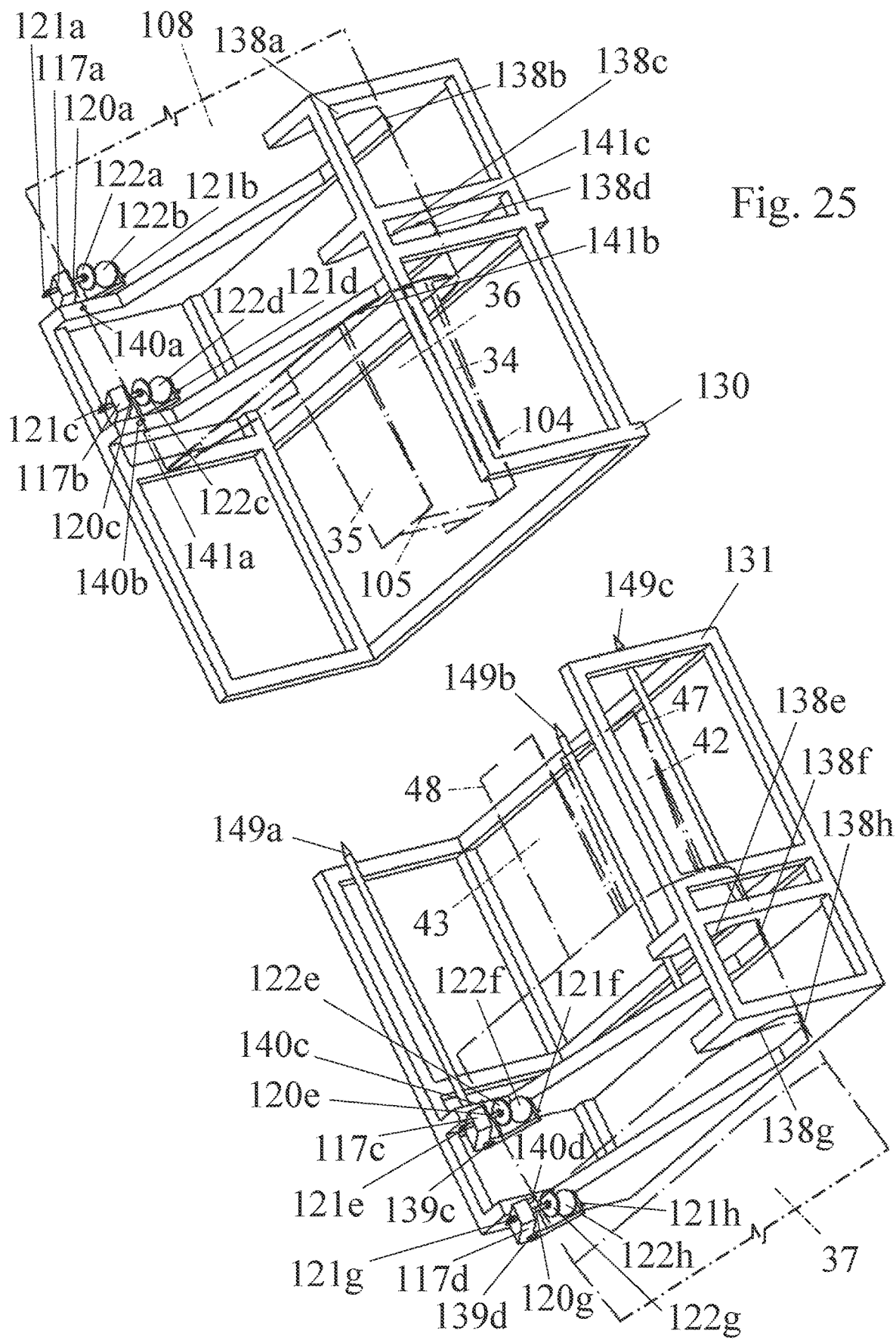
FIG. 25 is an isometric overlaid view of the alternative embodiment of the align fixture mounted on the originally installed cut blade and the extension blade showing the airfoil trailing edge reference bolt used for the alignment.
Figure 26:
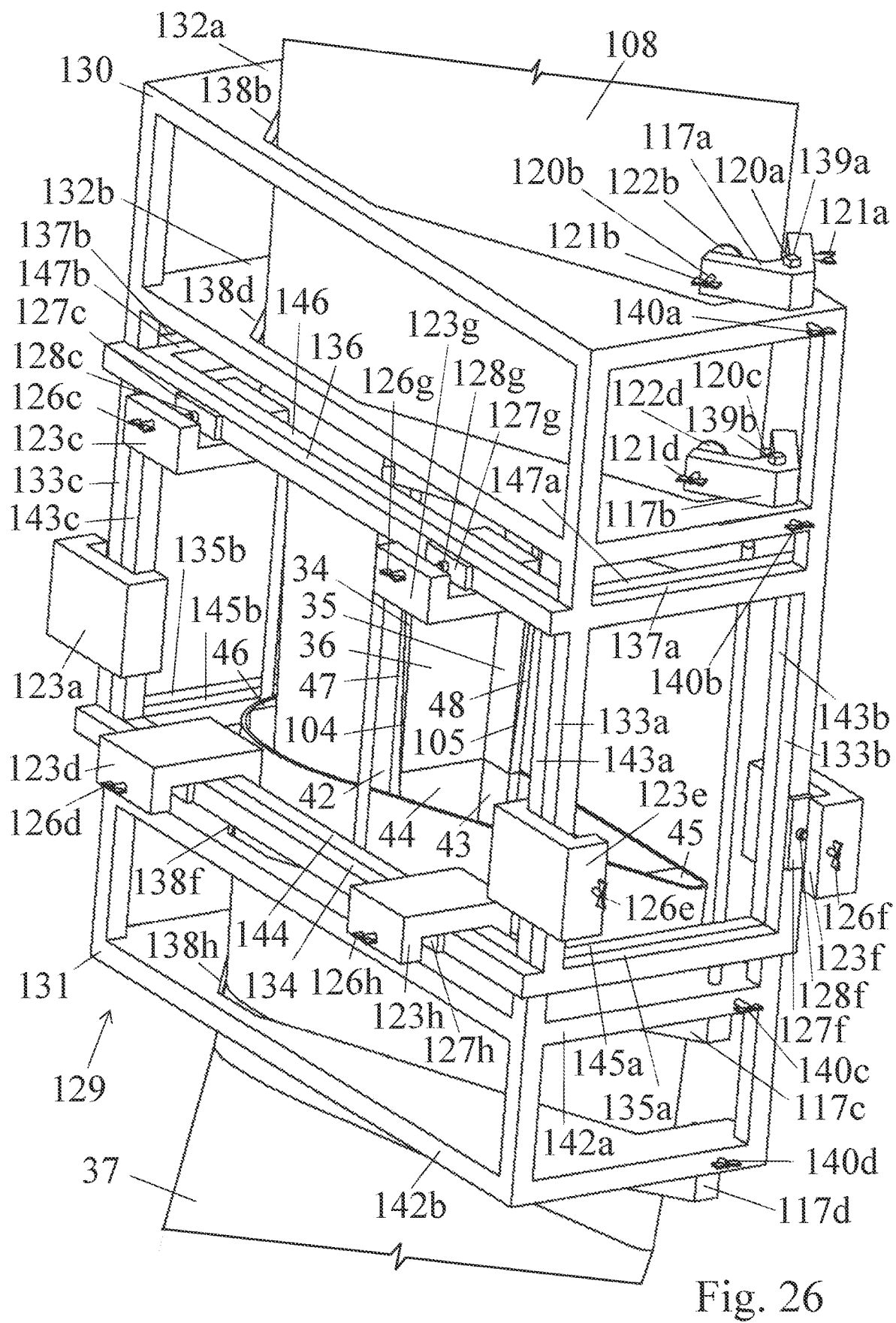
FIG. 26 is an isometric view of the originally installed cut blade bonded to the extension blade kept in place by the alternative embodiment of the align fixture locked with a set of fixture clamps.

FIG. 20 is described in the second embodiment section.
FIG. 21 is described in the second embodiment section.
FIG. 22 is described in the second embodiment section.
FIG. 23 is described in the second embodiment section.
FIG. 24 is described in the second embodiment section.
Detail FIG. 24A is described in the second embodiment section.
FIG. 25 is described in the second embodiment section.
FIG. 26 is described in the second embodiment section.
FIG. 27 shows the originally installed cut blade 108 bonded with the extension blade 37.

Detail FIG. 27A shows the originally installed cut blade 108 bonded with the extension blade 37 in greater magnification to better display the bonded structures without any obstruction caused by the alignment fixture.

The upper camber sparcap 34 is bonded to the extension blade upper camber sparcap 42 and the lower camber sparcap 35 is bonded to the extension blade lower camber sparcap 43. The bonding is made stronger because the tapered upper camber sparcap 104 matches the extension blade upper camber sparcap tapering 47 and the tapered lower camber sparcap 105 matches the extension blade lower camber sparcap tapering 48 increasing the surface area of the joint and the smooth tapering reduces the tension on the parts.

The beam core 36 and the extension blade beam core 44 are joined and stay perfectly aligned completing the structural integrity of the joint. The extension blade trailing edge bonding strip 45 and the extension blade leading edge bonding strip 46 are bonded to their counterparts on a subsequent phase of the process.

FIG. 28 shows the last step of the bonding process of the originally installed cut blade 108 bonded with the extension blade 37.

Detail FIG. 28A shows a sparcap cover bonding 150 that is applied on the still exposed surfaces of the lower camber sparcap and the upper camber sparcap for the installation of a lower camber cover 151 that is bonded to the lower camber sparcap and an upper camber cover 152 that is bonded to the upper camber sparcap.

The joint sector trailing edge bonding strip 51 and the joint sector leading edge bonding strip 52 also provide bonding to join the lower camber cover 151 with the upper camber cover 152 as well as adjacent structures such as the extension blade trailing edge bonding strip 45 and complete the structural integrity of the assembly.

Operation—First Embodiment

FIG. 7 shows the wind turbine under upgrade 53.

The work is performed in one blade under work 54 at a time using the work platform 55 that is attached to the structure using steel cables 56. The blade under work 54 is kept in the vertical position parallel to the tower 21 and the work platform 55 allows the crews full access to all surfaces of the blade under work 54 that need to be altered. Appropriate measures are taken inside the nacelle 22 to lock the hub 23 to prevent any rotation and keep the blades in a fixed position until the completion of the current upgrade in the blade under work 54. Once the upgrade of the blade under work 54 is completed, the hub 23 is allowed to turn 120 degrees to reach the next blade until all originally installed blades 24 have been upgraded into extended blades 49.

Detail FIG. 7A shows the point of the blade under work 54 being altered in greater magnification to allow a better view of the work platform 55 that encircles the blade under work 54 to allow full access to the working crews standing on the platform floor 57. The safety rail 58 with multiple anchoring points to attach safety lines offers additional protection for the working crews. The work platform 55 is attached to appropriate load points in the structure by steel cables 56.

FIG. 9 shows the lower camber rail-guided milling tool 59 that is used to alter the structures in the lower camber portion of the originally installed blade. The lower camber rail-guided milling tool 59 is composed of the lower frame 60 that has the matching shape of the lower camber of the originally installed blade at the point it is installed to ensure a perfect fitting and best results. The lower frame 60 encircles the lower working area 61 where the milling is performed and provides the support for the rails 63a, 63b.

The lower camber rail-guided milling tool 59 is fixated to the originally installed blade cut portion by the fixation holes 62. This produces no damage as the originally installed blade cut portion is later on in the upgrade process removed and no holes are left in the remaining surface.

The rail heads 64a, 64b located at the top of each rail 63a, 63b are wider than the rails 63a, 63b allowing the sliding table 65 with the matching sliding table rail grooves 66a, 66b to run along the rails 63a, 63b. As the sliding table rail grooves 66a, 66b encompass the rail heads 64a, 64b, the sliding table 65 is allowed to move only in the linear direction of the rails 63a, 63b.

The working arm 67 is connected to the sliding table 65 through the pivoting rod 68. The lower camber cutting wheel 69a spins on the revolving rod 70 that is powered by the power source 71a that can be pneumatic or electric.

The handles 72 are configured to rotate the working arm 67 towards the surface or away from the surface around the pivoting rod 68 as indicated by the curved double arrow and along the direction of the rails 63a, 63b. Once the lower camber rail-guided milling tool 59 is installed, the handles 72 are used to rotate the working arm 67 and apply force to press the lower camber cutting wheel 69a against the surface of the originally installed blade to produce the intended alterations.

As the working arm 67 is pressed and the lower camber cutting wheel 69a spins and removes material from the surface, the stop pin 73a eventually strikes the top of the lower cutting guide rail 74a limiting the pivoting movement of the working arm 67 so that the lower camber cutting wheel 69a can only cut material to a certain depth at each position along the lower cutting guide rail 74a, 74b.

An overlaid version of the sliding table 65b and its associated components at the end of the excursion along the rails 63a, 63b is drawn in dashed dot lines to better show the progression of the maximum depth achieved by the lower camber cutting wheel 69a as the sliding table 65a, 65b moves from top 65a to bottom 65b.

As the lower cutting guide rail 74a, 74b gets progressively closer to the lower frame 60 and as the sliding table 65a moves from the top to the bottom, the lower camber cutting wheel 69*a* is allowed to cut increasingly deeper into the outer skin and internal structures of the originally installed blade according to a precise and defined tapering pattern given by the lower cutting guide rail 74*a*, 74*b* as indicated by the drill depth 75*a*, 75*b* based on the angle of the lower cutting guide rail 74*a*, 74*b* with respect to the lower frame 60 that increases from top 75*a* to bottom 75*b*.

The operator maneuvers the working arm 67 to remove the material in steps using multiple passes to reduce heating and mechanical stress. As the operator continues removing material, eventually the stop pin 73*a* hits the lower cutting guide rail 74*a*, 74*b* preventing the cutting action to continue beyond the intended tapering profile. Eventually, the stop pin 73*a* stays in contact with the lower cutting guide rail 74*a*, 74*b* at all positions and the operator senses that no further milling has happened in the last pass and the process is complete.

FIG. 10 shows the upper camber rail-guided milling tool 76 that is used to alter the structures in the upper camber portion of the originally installed blade 24. The upper camber rail-guided milling tool 76 is composed of the upper frame 77 that has the matching shape of the upper camber of the originally installed blade 24 at the point it is installed to ensure a perfect fitting and best results. The upper frame 77 encircles the upper working area 78 where the milling is performed and provides the support for the rails 63*a*, 63*b*.

The sliding table 65 that has sliding table rail grooves 66*a*, 66*b* that encompass the rail heads 64*a*, 64*b* can move only in the linear direction of the rails 63*a*, 63*b*.

The working arm 67 is connected to the sliding table 65 through the pivoting rod 68. The upper camber cutting wheel 79 spins on the revolving rod 70 that is powered by the power source 71 that can be pneumatic or electric.

The handles 72*a*, 72*b* allow the operator to move the working arm 67 up or down pivoting around the pivoting rod 68 as indicated by the curved double arrow and along the direction of the rails 63*a*, 63*b*. Once the upper camber rail-guided milling tool 76 is installed, the handles 72*a*, 72*b* allow the operator to apply force to press the upper camber cutting wheel 79 against the surface of the originally installed blade 24 to produce the intended alterations.

The stop pin 73*a* sliding on top of the upper cutting guide rail 80*a* limits the pivoting movement of the working arm 67 so that the upper camber cutting wheel 79 can only get to a certain depth at each position along the upper cutting guide rails 80*a*, 80*b* preventing milling of the surface below that depth.

As the upper cutting guide rails 80*a*, 80*b* get progressively lower as the sliding table 65 moves from the top to the bottom, the upper camber cutting wheel 79 is allowed to cut increasingly deeper into the outer skin and internal structures of the originally installed blade 24 according to a precise and defined tapering pattern given by the upper cutting guide rails 80*a*, 80*b* based on the angle of the upper cutting guide rails 80*a*, 80*b* with respect to the axis of the upper frame 77.

The operator maneuvers the working arm 67 to remove the material in steps using multiple passes to reduce heating and mechanical stress. As the operator continues removing material, eventually the stop pin 73*a* hits the upper cutting guide rail 80*a* preventing the cutting action to continue beyond the intended tapering profile. Eventually, the stop pin 73*a* stays in contact with the upper cutting guide rail 80*a* at all positions and the operator senses that no further milling has happened in the last pass and the process is complete.

FIG. 13 shows the tool positioning fixture 90 installed at the tip of the originally installed blade 24. The tool positioning fixture 90 is used to precisely determine the location that needs to be milled as the first step of the upgrade process of the originally installed blade 24. Once the milling is complete, the tool positioning fixture 90 is used as reference to assist the working crews to cut the outer skin of the originally installed blade 24 along the originally installed blade section point 29.

Detail FIG. 13A shows the tool positioning fixture 90 installed at the tip of the originally installed blade in the originally installed blade cut portion 30 in greater magnification. The tool positioning fixture 90 allows the precise determination of the milling position by means of the determination of distances to fixed references in the originally installed blade cut portion 30. The tip distancing bars 91*a*, 91*b* located at both sides of the originally installed blade cut portion 30 and the tip reference plate 92 provide a reference to the originally installed blade tip 31. The trailing edge reference 93 (including a first trailing edge reference to which the first base alignment bar extends, and including a second trailing edge reference to which the second base alignment bar extends) provides a reference to the trailing edge of the originally installed blade cut portion 30 and the leading edge reference 94 (including a first leading edge reference to which the first base alignment bar extends and including a second leading edge reference to which the second base alignment bar extends) provides a reference to the leading edge of the originally installed blade cut portion 30. This arrangement guarantees the precise positioning of the tool positioning fixture 90 and as a result the precise positioning of the base alignment bar 95*a*, 95*b*, the trailing edge alignment bar 96*a*, 96*b*, and the leading edge alignment bar 97*a*, 97*b*, that serve as a frame for the positioning of appropriate tools on both sides of the originally installed blade cut portion 30.

Several fixation holes 62 are used to secure the tool positioning fixture 90 to the originally installed blade cut portion 30. This produces no damage as the originally installed blade cut portion 30 is later on in the upgrade process removed and no holes are left in the remaining surface. To that effect, the tool positioning fixture 90 is used as reference to assist the working crews to cut the outer skin of the originally installed blade along the originally installed blade section point 29.

FIG. 14 shows the originally installed blade 24 with the tool positioning fixture 90 installed at the originally installed blade tip 31 providing the precise positioning for the lower camber rail-guided milling tool 59.

Detail FIG. 14A shows the upper camber rail-guided milling tool 76 and the lower camber rail-guided milling tool 59 on their installation positions provided by the tool positioning fixture 90 in greater magnification. The lower camber rail-guided milling tool 59 fits perfectly in the frame provided by the base alignment bars 95*a* and 95*b*, the trailing edge alignment bar 96, and the leading edge alignment bar 97 on the lower camber of the originally installed blade 24.

The tool positioning fixture 90 is kept firmly in place with the use of the fixation holes 62 that are all placed in the originally installed blade cut portion 30. Once the alterations are completed, the lower camber rail-guided milling tool 59 is removed and the originally installed blade cut portion 30 is removed by cutting along the originally installed blade section point 29 using the tool positioning fixture 90 as reference to assist the working crews to cut the outer skin of the originally installed blade 24 see FIG. 13 and detail FIG. 13A.

Detail FIG. 14A also shows the lower camber alteration 98 produced by the lower camber cutting wheel 69 inside the lower working area 61 consisting of the lower camber outer skin cut 99 that removes the outer skin of the originally installed blade 24 and the lower camber sparcap cut 100 that produces a progressive tapering in the lower camber sparcap that are the results of the milling action on the lower camber surface of the originally installed blade 24.

FIG. 15 shows the originally installed blade 24 with the tool positioning fixture 90 installed at the originally installed blade tip 31 providing the precise positioning for the upper camber rail-guided milling tool 76.

Detail FIG. 15A shows the upper camber rail-guided milling tool 76 and the lower camber rail-guided milling tool 59 on their installation positions provided by the tool positioning fixture 90 in greater magnification. The upper camber rail-guided milling tool 76 fits perfectly in the frame provided by the base alignment bars 95a and 95b, the trailing edge alignment bar 96, and the leading edge alignment bar 97 on the upper camber of the originally installed blade 24.

The tool positioning fixture 90 is kept firmly in place with the use of the fixation holes 62 that are all placed in the originally installed blade cut portion 30. Once the alterations are completed, the upper camber rail-guided milling tool 76 is removed and the originally installed blade cut portion 30 is removed by cutting along the originally installed blade section point 29 using the tool positioning fixture 90 as reference to assist the working crews to cut the outer skin of the originally installed blade 24 see FIG. 13 and detail FIG. 13A.

Detail FIG. 15A also shows the upper camber alteration 101 produced by the upper camber cutting wheel 79 inside the upper working area 78 consisting of the upper camber outer skin cut 102 that removes the outer skin of the originally installed blade 24 and the upper camber sparcap cut 103 that produces a progressive tapering in the upper camber sparcap that are the results of the milling action on the upper camber surface of the originally installed blade 24.

FIG. 16 shows the upper camber sparcap 34 and the lower camber sparcap 35 inside the originally installed blade 24 to better illustrate the end result of the alterations described in FIG. 15, detail FIG. 15A, FIG. 14, and detail FIG. 14A.

Detail FIG. 16A shows the upper camber sparcap 34 and the lower camber sparcap 35 inside the originally installed blade 24 as well as the upper camber rail-guided milling tool 76 and the lower camber rail-guided milling tool 59 in greater magnification.

As a result of the milling, the tapered upper camber sparcap 104 is produced on the upper camber sparcap 34 terminating at the upper camber sparcap milling end point 106 where the upper camber sparcap 34 is cut. The tapered lower camber sparcap 105 is produced on the lower camber sparcap 35 terminating at the lower camber sparcap milling end point 107 where the lower camber sparcap 35 is cut.

FIG. 17 shows the originally installed cut blade 108 resulting from the process of milling and cutting of the originally installed blade that removes the discarded sparcap 109 and the discarded tip 110.

Detail FIG. 17A shows the area of the originally installed cut blade 108 that was altered in greater magnification to better illustrate the alterations produced.

The outer skin of the originally installed blade as well as the trailing edge bonding strip 32 and the leading edge bonding strip 33 are cut at the originally installed blade section point 29. The upper camber sparcap 34, the lower camber sparcap 35 and the beam core 36 are cut at the end point of the milling of the upper camber sparcap 34 and the lower camber sparcap 35 leaving the tapered upper camber sparcap 104 and the tapered lower camber sparcap 105 as seen on detail FIG. 16A.

FIG. 18 shows the alignment fixture 111 that is used to join the originally installed cut blade 108 with the extension blade 37.

Detail FIG. 18A shows the alignment fixture 111 composed of the upper camber alignment fixture 112 and the lower camber alignment fixture 113. The joining rings 114a, 114b, etc. fitted to the upper camber alignment fixture 112 and the lower camber alignment fixture 113 are locked using the front joining pins 115a, 115b in the portion of the alignment fixture 111 that are designed to fit to the originally installed cut blade 108 and the rear joining pins 116a, 116b that are designed to fit to the extension blade 37.

The alignment fixture 111 provides a stable and precise reference to align and hold the originally installed cut blade 108 and the extension blade 37 in place while the bonding resin is applied and hardens.

The upper camber sparcap 34 is bonded to the extension blade upper camber sparcap 42 and the lower camber sparcap 35 is bonded to the extension blade lower camber sparcap 43. The bonding is made stronger because the tapered upper camber sparcap 104 matches the extension blade upper camber sparcap tapering 47 and the tapered lower camber sparcap 105 matches the extension blade lower camber sparcap tapering 48 increasing the surface area of the joint and the smooth tapering reduces the tension on the parts.

The beam core 36 and the extension blade beam core 44 are joined and stay perfectly aligned completing the structural integrity of the joint. The extension blade trailing edge bonding strip 45 and the extension blade leading edge bonding strip 46 are bonded to their counterparts on a subsequent phase of the process.

FIG. 19 shows the alignment fixture being taken apart to remove it once the bonding of the originally installed cut blade 108 with the extension blade 37 is complete.

Detail FIG. 19A shows the front joining pins 115a, 115b and the rear joining pins 116a, 116b removed from the joining rings 114a, 114b and the upper camber alignment fixture 112 and the lower camber alignment fixture 113 taken apart revealing the originally installed cut blade 108 bonded with the extension blade 37.

The upper camber sparcap 34 is bonded to the extension blade upper camber sparcap 42 and the lower camber sparcap 35 is bonded to the extension blade lower camber sparcap 43. The bonding is made stronger because the tapered upper camber sparcap 104 matches the extension blade upper camber sparcap tapering 47 and the tapered lower camber sparcap 105 matches the extension blade lower camber sparcap tapering 48 increasing the surface area of the joint and the smooth tapering reduces the tension on the parts.

The beam core 36 and the extension blade beam core 44 are joined and stay perfectly aligned completing the structural integrity of the joint. The extension blade trailing edge bonding strip 45 and the extension blade leading edge bonding strip 46 are bonded to their counterparts on a subsequent phase of the process.

FIG. 27 shows the originally installed cut blade 108 bonded with the extension blade 37.

Detail FIG. 27A shows the originally installed cut blade 108 bonded with the extension blade 37 in greater magnification to better display the bonded structures without any obstruction caused by the alignment fixture.

The upper camber sparcap 34 is bonded to the extension blade upper camber sparcap 42 and the lower camber sparcap 35 is bonded to the extension blade lower camber sparcap 43. The bonding is made stronger because the tapered upper camber sparcap 104 matches the extension blade upper camber sparcap tapering 47 and the tapered lower camber sparcap 105 matches the extension blade lower camber sparcap tapering 48 increasing the surface area of the joint and the smooth tapering reduces the tension on the parts.

The beam core 36 and the extension blade beam core 44 are joined and stay perfectly aligned completing the structural integrity of the joint. The extension blade trailing edge bonding strip 45 and the extension blade leading edge bonding strip 46 are bonded to their counterparts on a subsequent phase of the process.

FIG. 28 shows the last step of the bonding process of the originally installed cut blade 108 bonded with the extension blade 37.

Detail FIG. 28A shows the sparcap cover bonding 150 that is applied on the still exposed surfaces of the lower camber sparcap and the upper camber sparcap for the installation of the lower camber cover 151 that is bonded to the lower camber sparcap and the upper camber cover 152 that is bonded to the upper camber sparcap.

The joint sector trailing edge bonding strip 51 and the joint sector leading edge bonding strip 52 also provide bonding to join the lower camber cover 151 with the upper camber cover 152 as well as adjacent structures such as the extension blade trailing edge bonding strip 45 and complete the structural integrity of the assembly.

Second Embodiment

FIG. 11 shows an alternative embodiment of the lower camber rail-guided milling tool 81 that is a second embodiment of the lower camber rail-guided milling tool used to alter the structures in the lower camber portion of the originally installed blade. The alternative embodiment of the lower camber rail-guided milling tool 81 is composed of the lower frame 60 that has the matching shape of the lower camber of the originally installed blade at the point it is installed, identical to the first embodiment of the lower camber rail-guided milling tool to ensure a perfect fitting and best results.

The lower frame 60 encircles the lower working area 61 where the milling is performed and provides the support for a pair of guide lower rails 82a, 82b. Each guide lower rail 82a, 82b has a guide lower slot 83a, 83b that limits the movement of a guided reference rod 84 and a guided revolving rod 85 that are forced to move linearly along the guide lower slots 83a, 83b.

The lower camber cutting wheel 69a spins on the guided revolving rod 85 powered by the power source 71 that can be pneumatic or electric. A push handle 86a allows an operator to apply force to press the lower camber cutting wheel 69a against the surface of the originally installed blade to produce the intended alterations. That happens because as the guide lower slots 83a, 83b get progressively closer to the lower frame 60 from the top to the bottom of the drawing, the guided revolving rod 85 is forced to move closer to the lower frame 60 and the spinning lower camber cutting wheel 69a, 69b is forced to bite increasingly more into the originally installed blade skin and internal structures as the operator pushes the push handle 86 from the top to the bottom of the drawing.

An overlaid version of the push handle 86b and its associated components at the end of the excursion along the guide lower slots 83a, 83b is drawn in dashed dot lines to better show the progression of the maximum depth achieved by the lower camber cutting wheel 69a, 69b as the push handle 86a, 86b moves from top 86a to bottom 86b.

Because the guide lower slots 83a, 83b get progressively lower as the push handle 86a, 86b moves from the top to the bottom, the lower camber cutting wheel 69a, 69b is allowed to cut increasingly deeper into the outer skin and internal structures of the originally installed blade according to a precise and defined tapering pattern given by the angle of the guide lower slots 83a, 83b with respect to the axis lower frame 60 as indicated by the drill depth 75a, 75b that increases from top 75a to bottom 75b.

FIG. 12 shows an alternative embodiment of the upper camber rail-guided milling tool 87 that is a second embodiment of the upper camber rail-guided milling tool used to alter the structures in the upper camber portion of the originally installed blade. The alternative embodiment of the upper camber rail-guided milling tool 87 is composed of the upper frame 77 that has the matching shape of the upper camber of the originally installed blade at the point it is installed, identical to the first embodiment of the upper camber rail-guided milling tool to ensure a perfect fitting and best results.

The upper frame 77 encircles the upper working area 78 where the milling is performed and provides the support for a pair of guide upper rails 88a, 88b. Each guide upper rail 88a, 88b has a guide upper slot 89a, 89b that limits the movement of the guided reference rod 84 and the guided revolving rod 85 that are forced to move linearly along the guide upper slots 89a, 89b.

The upper camber cutting wheel 79 spins on the guided revolving rod 85 powered by the power source 71 that can be pneumatic or electric. The push handle 86 allows an operator to apply force to press the upper camber cutting wheel 79 against the surface of the originally installed blade to produce the intended alterations. That happens because as the guide upper slot 89a, 89b is at an angle with respect to the axis of the upper frame 77 and that gets progressively closer to the upper frame 77 from the top to the bottom of the drawing as the guided revolving rod 85 is forced to move closer to the upper frame 77 and the spinning upper camber cutting wheel 79 is forced to bite increasingly more into the originally installed blade skin and internal structures as the operator pushes the push handle 86 from the top to the bottom of the drawing.

In a further embodiment of the alignment fixture, FIG. 20 shows an embodiment of an airfoil trailing edge brace 117 that is composed of a brace body 118 that has a brace fixation hole 119 that has a square profile or another polygonal profile to allow the airfoil trailing edge brace 117 to be fixated at a fixed orientation to a substrate.

The airfoil trailing edge brace 117 has a set of two adjustment screws 120a, 120b that are equipped with a butterfly head 121a, 121b to allow manual operation of the adjustment screws 120a, 120b without tools. The adjustment screws 120a, 120b are connected to a set of pivoting supports 122a, 122b.

FIG. 21 shows an embodiment of a fixture clamp 123 that is composed of a fixture clamp base 124 that has the shape and function of a vice. The fixture clamp base 124 is perforated in one side by a fixture screw 125 that has a fixture screw butterfly head 126 to allow manual operation of the fixture screw 125 without tools. The fixture screw 125 is connected to a fixture clamp brace 127 at a fixture clamp brace joint 128 that absorb the rotational movement of the fixture screw 125 and allows the fixture clamp brace 127 to perform linear movement.

FIG. 22 shows an exploded view of an alternative embodiment of the align fixture 129 that is composed of an upper blade align fixture 130 and a lower blade align fixture 131.

The upper blade align fixture 130 is designed to hold the originally installed cut blade 108 and is composed of a pair of upper blade airfoil braces 132a, and 132b that are parallel and placed at a distance to each other, the distance must be at least one third of the total length of the upper blade align fixture 130 but can be longer if a higher level of precision for the alignment is required.

The upper blade airfoil braces 132a, and 132b are joined at the edges by a set of four upper blade longitudinal beams 133a, 133b, 133c, and 133d, that create a frame. The upper blade longitudinal beams 133a, 133b, 133c, and 133d are joined at one extremity by an upper blade horizontal outer beam 134 and a set of two upper blade vertical outer beams 135a, and 135b and at the middle, at a short distance to the upper blade airfoil braces 132b by an upper blade horizontal inner beam 136 and a set of two upper blade vertical inner beam 137a, and 137b to reinforce the rigidity of the structure.

The upper blade horizontal outer beam 134 and the upper blade horizontal inner beam 136 are constructed in a raised position such that all the upper blade longitudinal beams 133a, 133b, 133c, and 133d form a frame without obstructions in the inside of the frame in such a way that a similar, smaller frame, with the fitting size is able to slide freely.

The upper blade airfoil braces 132a, and 132b have profiles that fit perfectly the shape of the originally installed cut blade 108 at the point they are placed. To accommodate minor variations in the shape of different originally installed cut blades 108 that may have been manufactured using different molds, each upper blade airfoil brace 132a, and 132b is designed with a set of two airfoil leading edge markers 138a, and 138b and 138c, and 138d respectively to touch the leading edge of the originally installed cut blade 108 at only one point located in each airfoil leading edge marker 138a, 138b, 138c, and 138d.

A set of airfoil trailing edge brace supports 139a, 139b provides precise locations to install the airfoil trailing edge braces 117a, 117b that hold the trailing edge of the originally installed cut blade 108 at those precise points.

A set of airfoil trailing edge reference bolts 140a, 140b are used to mark the position the vertex of the trailing edge of the originally installed cut blade 108 must be at those particular points for the proper alignment.

A set of three alignment targets 141a, 141b, and 141c placed at the upper blade airfoil brace 132b is used to verify the precise alignment of the originally installed cut blade 108 hold in place at the upper blade align fixture 130 and the extension blade 37 hold in place at the lower blade align fixture 131 (see FIG. 24).

The lower blade align fixture 131 is designed to hold the extension blade 37 and is composed of a pair of lower blade airfoil braces 142a, and 142b that are parallel and placed at a distance to each other, the distance must be at least one third of the total length of the lower blade align fixture 131 but can be longer if a higher level of precision for the alignment is required.

The lower blade airfoil braces 142a, and 142b are joined at the edges by a set of four lower blade longitudinal beams 143a, 143b, 143c, and 143d, that create a frame. The lower blade longitudinal beams 143a, 143b, 143c, and 143d are joined at one extremity by a lower blade horizontal outer beam 146 and a set of two lower blade vertical outer beams 147a, and 147b and at the middle, at a short distance to the lower blade airfoil brace 142a by an lower blade horizontal inner beam 144 and a set of two lower blade vertical inner beams 145a, and 145b to reinforce the rigidity of the structure.

The lower blade airfoil braces 142a, and 142b have profiles that fit perfectly the shape of the extension blade 37 at the point they are placed. To accommodate minor variations in the shape of different extension blades 37 that may have been manufactured using different molds, each lower blade airfoil brace 142a, and 142b is designed with two airfoil leading edge markers 138e, and 138f and 138g, and 138h respectively to touch the leading edge of the extension blade 37 at only one point located in each airfoil leading edge marker 138e, 138f, 138g, and 138h.

Two airfoil trailing edge brace supports 139c, and 139d provide precise locations to install the airfoil trailing edge braces 117c, and 117d that hold the trailing edge of the extension blade 37 at those precise points.

Two airfoil trailing edge reference bolts 140c, 140d are used to mark the position the vertex of the trailing edge of the extension blade 37 must be at those particular points for the proper alignment.

A set of three alignment needles 148a, 148b, and 148c is placed at the lower blade airfoil brace 142a. Each alignment needle 148a, 148b, and 148c terminates in an alignment needle tip 149a, 149b, and 149c respectively. When the alternative embodiment of the align fixture 129 is in the closed position (see FIG. 23), the alignment needle tips 149a, 149b, and 149c must match the respective alignment targets 141a, 141b, and 141c. This facilitates the detection of possible misalignment caused by warping in the structures and allows corrective actions to be taken to achieve best results in the alignment of the originally installed cut blade 108 hold in place at the upper blade align fixture 130 and the extension blade 37 hold in place at the lower blade align fixture 131 (see FIG. 24).

FIG. 23 shows the alternative embodiment of the align fixture 129 that is composed of the upper blade align fixture 130 and the lower blade align fixture 131 in the closed position, secured with eight fixture clamps 123a, 123b, 123c, 123d, 123e, 123f, 123g, and 123h (see FIG. 26 for a different viewing angle and more information).

The upper blade align fixture 130 is designed to hold the originally installed cut blade 108 and is composed two upper blade airfoil braces 132a, and 132b that are parallel and placed at a distance to each other, the distance must be at least one third of the total length of the upper blade align fixture 130 but can be longer if a higher level of precision for the alignment is required.

The upper blade airfoil braces 132a, and 132b are joined at the edges by four upper blade longitudinal beams 133a, 133b, 133c, and 133d, that create a frame. The upper blade longitudinal beams 133a, 133b, 133c, and 133d are joined at one extremity by the upper blade horizontal outer beam 134 and two upper blade vertical outer beams 135a, and 135b and at the middle, at a short distance to the upper blade airfoil braces 132b by the upper blade horizontal inner beam 136 and two upper blade vertical inner beam 137a, and 137b to reinforce the rigidity of the structure.

The upper blade airfoil braces 132a, and 132b have profiles that fit perfectly the shape of the originally installed cut blade 108 at the point they are placed. To accommodate minor variations in the shape of different originally installed cut blades 108 that may have been manufactured using different molds, each upper blade airfoil brace 132a, and 132b is designed with two airfoil leading edge markers 138a, and 138b and 138c, and 138d respectively to touch the leading edge of the originally installed cut blade 108 at only one point located in each airfoil leading edge marker 138a, 138b, 138c, and 138d.

The airfoil trailing edge braces 117a, 117b are seen on their installed positions next to the respective airfoil trailing edge reference bolts 140a, 140b that mark the position the vertex of the trailing edge of the originally installed cut blade 108 must be at those particular points for the proper alignment.

The lower blade align fixture 131 is designed to hold the extension blade 37 and is composed two lower blade airfoil braces 142a, and 142b that are parallel and placed at a distance to each other, the distance must be at least one third of the total length of the lower blade align fixture 131 but can be longer if a higher level of precision for the alignment is required.

The lower blade airfoil braces 142a, and 142b are joined at the edges by four lower blade longitudinal beams 143a, 143b, 143c, and 143d, that create a frame. The lower blade longitudinal beams 143a, 143b, 143c, and 143d are joined at one extremity by the lower blade horizontal outer beam 146 and two lower blade vertical outer beams 147a, and 147b and at the middle, at a short distance to the lower blade airfoil brace 142a by the lower blade horizontal inner beam 144 and two lower blade vertical inner beams 145a, and 145b to reinforce the rigidity of the structure.

The lower blade airfoil braces 142a, and 142b have profiles that fit perfectly the shape of the extension blade 37 at the point they are placed. To accommodate minor variations in the shape of different extension blades 37 that may have been manufactured using different molds, each lower blade airfoil brace 142a, and 142b is designed with two airfoil leading edge markers 138e, and 138f and 138g, and 138h respectively to touch the leading edge of the extension blade 37 at only one point located in each airfoil leading edge marker 138e, 138f, 138g, and 138h.

The airfoil trailing edge braces 117c, and 117d are held in place by the respective airfoil trailing edge brace supports 139c, and 139d. The airfoil trailing edge braces 117c, and 117d are seen on their installation position next to the respective airfoil trailing edge reference bolts 140c, 140d that mark the position the vertex of the trailing edge of the extension blade 37 must be at those particular points for the proper alignment.

Three alignment needles 148a, 148b, and 148c are placed at the lower blade airfoil brace 142a. Each alignment needle 148a, 148b, and 148c terminates in the respective alignment needle tip 149a, 149b, and 149c.

The alignment needle tips 149a, 149b, and 149c are seen matching the respective alignment targets 141a, 141b, and 141c on the upper blade airfoil brace 132b indicting a perfect alignment. This made possible by the perfect alignment of the upper blade align fixture 130 and the lower blade align fixture 131 that are hold in place by the eight fixture clamps 123a, 123b, 123c, 123d, 123e, 123f, 123g, and 123h.

FIG. 24 shows the upper blade align fixture 130 in its installed position attached to the originally installed cut blade 108 and the lower blade align fixture 131 in its installed position attached to the extension blade 37.

Detail FIG. 24A shows the upper blade align fixture 130 in its installed position attached to the originally installed cut blade 108 and the lower blade align fixture 131 in its installed position attached to the extension blade 37 in greater magnification to allow the visualization of the smaller components and features.

The upper blade align fixture 130 is locked in the desired position on the originally installed cut blade 108 by the airfoil trailing edge braces 117a, and 117b by means of adjusting the adjustment screws 120b, 120d using the respective butterfly heads 121b, 121d to allow the trailing edge of the originally installed cut blade 108 to coincide with the position indicated by the airfoil trailing edge reference bolts 140a, 140b. As the adjustment screws 120b, 120d move, the pivoting supports 122b, 122d keep the trailing edge in place and push the leading edge of the originally installed cut blade 108 forward until it rests against the airfoil leading edge marker 138a, 138b, 138c, and 138d locking the position of the upper blade align fixture 130.

Similarly, the lower blade align fixture 131 is locked in the desired position on the extension blade 37 by the airfoil trailing edge braces 117c, and 117d (only partially visible) by means of adjusting the adjustment screws 120f, 120h (not visible) using the respective butterfly heads 121f, 121h (not visible) to allow the trailing edge of the extension blade 37 to coincide with the position indicated by the airfoil trailing edge reference bolts 140c, 140d. As the adjustment screws 120f, 120h (not visible) move, the pivoting supports 122f, 122h keep the trailing edge in place and push the leading edge of the extension blade 37 forward until it rests against the airfoil leading edge marker 138e, 138f, 138g, and 138h locking the position of the lower blade align fixture 131. For a better visualization of the fixation and alignment process see FIG. 25.

The alignment needle tips 149a, 149b, and 149c are not affected by any structures that can cause them to deviate even if parts of the structure warp and are therefore precise indicators to help verify the proper alignment when the upper blade align fixture 130 and the lower blade align fixture 131 reach the closed position for the bonding process.

The upper camber sparcap 34 is bonded to the extension blade upper camber sparcap 42 and the lower camber sparcap 35 is bonded to the extension blade lower camber sparcap 43. The bonding is made stronger because the tapered upper camber sparcap 104 matches the extension blade upper camber sparcap tapering 47 and the tapered lower camber sparcap 105 matches the extension blade lower camber sparcap tapering 48 increasing the surface area of the joint and the smooth tapering reduces the tension on the parts.

The beam core 36 and the extension blade beam core 44 are joined and stay perfectly aligned completing the structural integrity of the joint. The extension blade trailing edge bonding strip 45 and the extension blade leading edge bonding strip 46 are bonded to their counterparts on a subsequent phase of the process.

FIG. 25 is an overlaid view of the upper blade align fixture 130 in its installed position attached to the originally installed cut blade 108 and the lower blade align fixture 131 in its installed position attached to the extension blade 37. To improve the visualization of the components that contribute for the alignment and fixation of the upper blade align fixture 130 and the lower blade align fixture 131, the originally installed cut blade 108 and the extension blade 37 have been drawn in dash doted lines as an overlay.

The upper blade align fixture 130 is locked in the desired position on the originally installed cut blade 108 by the airfoil trailing edge braces 117a, and 117b by means of adjusting the adjustment screws 120a, 120b, 120c, and 120d using the respective butterfly heads 121a, 121b, 121c, and 121*d* to allow the trailing edge of the originally installed cut blade 108 to coincide with the position indicated by the airfoil trailing edge reference bolts 140*a*, 140*b*. As the adjustment screws 120*a*, 120*b*, 120*c*, and 120*d* move, the pivoting supports 122*a*, 122*b*, 122*c*, and 122*d* keep the trailing edge in place and push the leading edge of the originally installed cut blade 108 forward until it rests against the airfoil leading edge marker 138*a*, 138*b*, 138*c*, and 138*d* locking the position of the upper blade align fixture 130.

Similarly, the lower blade align fixture 131 is locked in the desired position on the extension blade 37 by the airfoil trailing edge braces 117*c*, and 117*d* by means of adjusting the adjustment screws 120*e*, 120*f*, 120*g*, and 120*h* using the respective butterfly heads 121*e*, 121*f*, 121*g*, and 121*h* to allow the trailing edge of the extension blade 37 to coincide with the position indicated by the airfoil trailing edge reference bolts 140*c*, 140*d*. As the adjustment screws 120*e*, 120*f*, 120*g*, and 120*h* move, the pivoting supports 122*e*, 122*f*, 122*g*, and 122*h* keep the trailing edge in place and push the leading edge of the extension blade 37 forward until it rests against the airfoil leading edge marker 138*e*, 138*f*, 138*g*, and 138*h* locking the position of the lower blade align fixture 131.

The alignment needle tips 149*a*, 149*b*, and 149*c* are not affected by any structures that can cause them to deviate even if parts of the structure warp and are therefore precise indicators to help verify the proper alignment when the upper blade align fixture 130 and the lower blade align fixture 131 reach the closed position for the bonding process. A perfect alignment is achieved when the alignment needle tips 149*a*, 149*b*, and 149*c* match the respective alignment targets 141*a*, 141*b*, and 141*c*.

The upper camber sparcap 34 is bonded to the extension blade upper camber sparcap 42 and the lower camber sparcap 35 is bonded to the extension blade lower camber sparcap 43. The bonding is made stronger because the tapered upper camber sparcap 104 matches the extension blade upper camber sparcap tapering 47 and the tapered lower camber sparcap 105 matches the extension blade lower camber sparcap tapering 48 increasing the surface area of the joint and the smooth tapering reduces the tension on the parts.

The beam core 36 and the extension blade beam core 44 are joined and stay perfectly aligned completing the structural integrity of the joint. The extension blade trailing edge bonding strip 45 and the extension blade leading edge bonding strip 46 are bonded to their counterparts on a subsequent phase of the process.

FIG. 26 shows the alternative embodiment of the align fixture 129 in the closed position, secured with eight fixture clamps 123*a*, 123*b*, 123*c*, 123*d*, 123*e*, 123*f*, 123*g*, and 123*h*. The upper blade align fixture 130 is in its installed position attached to the originally installed cut blade 108 and the lower blade align fixture 131 is in its installed position attached to the extension blade 37.

The upper blade align fixture 130 is designed to hold the originally installed cut blade 108 and is composed two upper blade airfoil braces 132*a*, and 132*b* that are parallel and placed at a distance to each other, the distance must be at least one third of the total length of the upper blade align fixture 130 but can be longer if a higher level of precision for the alignment is required.

The upper blade airfoil braces 132*a*, and 132*b* are joined at the edges by four upper blade longitudinal beams 133*a*, 133*b*, 133*c*, and 133*d*, that create a frame. The upper blade longitudinal beams 133*a*, 133*b*, 133*c*, and 133*d* are joined at one extremity by the upper blade horizontal outer beam 134 and two upper blade vertical outer beams 135*a*, and 135*b* and at the middle, at a short distance to the upper blade airfoil braces 132*b* by the upper blade horizontal inner beam 136 and two upper blade vertical inner beam 137*a*, and 137*b* to reinforce the rigidity of the structure.

The upper blade airfoil braces 132*a*, and 132*b* have profiles that fit perfectly the shape of the originally installed cut blade 108 at the point they are placed. To accommodate minor variations in the shape of different originally installed cut blades 108 that may have been manufactured using different molds, each upper blade airfoil brace 132*a*, and 132*b* is designed with two airfoil leading edge markers 138*a*, 138*b*, and 138*c*, 138*d* respectively to touch the leading edge of the originally installed cut blade 108 at only one point located in each airfoil leading edge marker 138*a*, 138*b*, 138*c*, and 138*d*.

The airfoil trailing edge braces 117*a*, and 117*b* are hold in place by the respective airfoil trailing edge brace supports 139*a*, and 139*b*. The airfoil trailing edge braces 117*a*, 117*b* are seen on their installed positions next to the respective airfoil trailing edge reference bolts 140*a*, 140*b* that are seen from the side of the butterfly head that allows the hand adjustment of the depth of the airfoil trailing edge reference bolts 140*a*, 140*b* to approach the tip to the vertex of the trailing edge of the originally installed cut blade 108 to facilitate the alignment.

For the alignment, the adjustment screws 120*a*, 120*b*, 120*c*, and 120*d* can be moved using the respective butterfly heads 121*a*, 121*b*, 121*c*, and 121*d* to allow the trailing edge of the originally installed cut blade 108 to coincide with the position indicated by the tip of the airfoil trailing edge reference bolts 140*a*, 140*b*. As the adjustment screws 120*a*, 120*b*, 120*c*, and 120*d* move, the pivoting supports 122*a*, 122*b*, 122*c*, and 122*d* keep the trailing edge in place and push the leading edge of the originally installed cut blade 108 forward until it rests against the airfoil leading edge marker 138*a*, 138*b*, 138*c*, and 138*d* locking the position of the upper blade align fixture 130.

The lower blade align fixture 131 is designed to hold the extension blade 37 and is composed two lower blade airfoil braces 142*a*, and 142*b* that are parallel and placed at a distance to each other, the distance must be at least one third of the total length of the lower blade align fixture 131 but can be longer if a higher level of precision for the alignment is required.

The lower blade airfoil braces 142*a*, and 142*b* are joined at the edges by four lower blade longitudinal beams 143*a*, 143*b*, 143*c*, and 143*d*, that create a frame. The lower blade longitudinal beams 143*a*, 143*b*, 143*c*, and 143*d* are joined at one extremity by the lower blade horizontal outer beam 146 and two lower blade vertical outer beams 147*a*, and 147*b* and at the middle, at a short distance to the lower blade airfoil brace 142*a* by the lower blade horizontal inner beam 144 and two lower blade vertical inner beams 145*a*, and 145*b* to reinforce the rigidity of the structure.

The lower blade airfoil braces 142*a*, and 142*b* have profiles that fit perfectly the shape of the extension blade 37 at the point they are placed. To accommodate minor variations in the shape of different extension blades 37 that may have been manufactured using different molds, each lower blade airfoil brace 142*a*, and 142*b* is designed with two airfoil leading edge markers 138*e*, 138*f* and 138*g*, 138*h* respectively to touch the leading edge of the extension blade 37 at only one point located in each airfoil leading edge marker 138*e*, 138*f*, 138*g*, and 138*h*.

The airfoil trailing edge braces 117c, 117d are seen on their installed positions next to the respective airfoil trailing edge reference bolts 140c, 140d that are seen from the side of the butterfly head that allows the hand adjustment of the depth of the airfoil trailing edge reference bolts 140c, 140d to approach the tip to the vertex of the trailing edge of the extension blade 37 to facilitate the alignment.

For the alignment, the adjustment screws 120e, 120f, 120g, and 120h can be moved using the respective butterfly heads 121e, 121f, 121g, and 121h to allow the trailing edge of the extension blade 37 to coincide with the position indicated by the tip of the airfoil trailing edge reference bolts 140c, 140d. As the adjustment screws 120e, 120f, 120g, and 120h move, the pivoting supports 122e, 122f, 122g, and 122h keep the trailing edge in place and push the leading edge of the extension blade 37 forward until it rests against the airfoil leading edge marker 138e, 138f, 138g, and 138h locking the position of the lower blade align fixture 131.

The alignment process is done before the upper blade align fixture 130 and the lower blade align fixture 131 are brought together and hold in place by the eight fixture clamps 123a, 123b, 123c, 123d, 123e, 123f, 123g, and 123h. The adjustment screws 120a, 120b, 120c, 120d, 120e, 120f, 120g, and 120h are not moved anymore before the curing of the applied adhesive is complete.

The upper camber sparcap 34 is bonded to the extension blade upper camber sparcap 42 and the lower camber sparcap 35 is bonded to the extension blade lower camber sparcap 43. The bonding is made stronger because the tapered upper camber sparcap 104 matches the extension blade upper camber sparcap tapering 47 and the tapered lower camber sparcap 105 matches the extension blade lower camber sparcap tapering 48 increasing the surface area of the joint and the smooth tapering reduces the tension on the parts.

The beam core 36 and the extension blade beam core 44 are joined and stay perfectly aligned completing the structural integrity of the joint. The extension blade trailing edge bonding strip 45 and the extension blade leading edge bonding strip 46 are bonded to their counterparts on a subsequent phase of the process.

Operation—Second Embodiment

The operation of the second embodiment is basically the same of the operation of the first embodiment, the only difference being the differences in the design and therefore operation of the tooling that is used to alter the upper and lower camber portions of the originally installed blade and the tooling using to align and glue the originally installed cut blade with the extension blade. The other steps remain the same only replacing the upper camber rail-guided milling tool by the alternative embodiment of the upper camber rail-guided milling tool and the lower camber rail-guided milling tool by the alternative embodiment of the lower camber rail-guided milling tool accordingly for the milling process and/or replacing the alignment fixture by the alternative embodiment of the align fixture for the alignment and gluing processes.

FIG. 11 shows the alternative embodiment of the lower camber rail-guided milling tool 81 that is used to alter the structures in the lower camber portion of the originally installed blade. The alternative embodiment of the lower camber rail-guided milling tool 81 is composed of the lower frame 60 that has the matching shape of the lower camber of the originally installed blade at the point it is installed to ensure a perfect fitting and best results.

The lower frame 60 encircles the lower working area 61 where the milling is performed and provides the support for the guide lower rails 82a, 82b. The guide lower rails 82a, 82b have guide lower slots 83a, 83b that limit the movement of the guided reference rod 84 and the guided revolving rod 85 that are forced to move linearly along the guide lower slots 83a, 83b.

The lower camber cutting wheel 69a spins on the guided revolving rod 85 that is powered by the power source 71 that can be pneumatic or electric. The push handle 86a allows the operator to apply force to press the lower camber cutting wheel 69a against the surface of the originally installed blade to produce the intended alterations. That happens because as the guide lower slots 83a, 83b gets progressively closer to the lower frame 60 from the top to the bottom of the drawing due to the angle of the guide lower slots 83a, 83b with respect to the axis of the lower frame 60, the guided revolving rod 85 is forced to move closer to the lower frame 60 and the spinning lower camber cutting wheel 69a, 69b is forced to bite increasingly more into the originally installed blade skin and internal structures as the operator pushes the push handle 86 from the top to the bottom of the drawing.

An overlaid version of the push handle 86b and its associated components at the end of the excursion along the guide lower slots 83a, 83b is drawn in dashed dot lines to better show the progression of the maximum depth achieved by the lower camber cutting wheel 69a, 69b as the push handle 86a, 86b moves from top 86a to bottom 86b.

Because the guide lower slots 83a, 83b get progressively lower as the push handle 86a, 86b moves from the top to the bottom, the lower camber cutting wheel 69a, 69b is allowed to cut increasingly deeper into the outer skin and internal structures of the originally installed blade according to a precise and defined tapering pattern given by the guide lower slots 83a, 83b as indicated by the drill depth 75a, 75b that increases from top 75a to bottom 75b based on the angle of guide lower slots 83a, 83b with respect to the axis of the lower frame 60.

FIG. 12 shows the alternative embodiment of the upper camber rail-guided milling tool 87 that is used to alter the structures in the upper camber portion of the originally installed blade. The alternative embodiment of the upper camber rail-guided milling tool 87 is composed of the upper frame 77 that has the matching shape of the upper camber of the originally installed blade at the point it is installed to ensure a perfect fitting and best results.

The upper frame 77 encircles the upper working area 78 where the milling is performed and provides the support for the guide upper rails 88a, 88b. The guide upper rail 88a, 88b have guide upper slots 89a, 89b that limit the movement of the guided reference rod 84 and the guided revolving rod 85 that are forced to move linearly along the guide upper slots 89a, 89b.

The upper camber cutting wheel 79 spins on the guided revolving rod 85 that is powered by the power source 71 that can be pneumatic or electric. The push handle 86 allows the operator to apply force to press the upper camber cutting wheel 79 against the surface of the originally installed blade to produce the intended alterations. That happens because as the guide upper slot 89a, 89b get progressively closer to the upper frame 77 from the top to the bottom of the drawing due to the angle of the guide upper slots 89a, 89b with respect to the axis of the upper frame 77, the guided revolving rod 85 is forced to move closer to the upper frame 77 and the spinning upper camber cutting wheel 79 is forced to bite increasingly more into the originally installed blade skin and internal structures as the operator pushes the push handle 86 from the top to the bottom of the drawing.

FIG. 20 shows an embodiment of the airfoil trailing edge brace 117 that is composed of the brace body 118 that is perforated by the brace fixation hole 119 that has a square profile or another polygonal profile to allow the airfoil trailing edge brace 117 to be fixated at a fixed orientation to a substrate.

The airfoil trailing edge brace 117 has two adjustment screws 120*a*, 120*b* that are equipped with butterfly heads 121*a*, 121*b* to allow manual operation of the adjustment screws 120*a*, 120*b* without tools. The adjustment screws 120*a*, 120*b* are connected to pivoting supports 122*a*, 122*b*.

The adjustment screws 120*a*, 120*b* are moved turning the respective butterfly heads 121*a*, 121*b* producing linear movement of the pivoting supports 122*a*, 122*b* that can pivot and adjust their position to fit the orientation of the surface of the object that they come into contact.

FIG. 21 shows an embodiment of the fixture clamp 123 that is composed of the fixture clamp base 124 that has the shape and function of a vice. The fixture clamp base 124 is perforated in one side by the fixture screw 125 fitted with the fixture screw butterfly head 126 to allow manual operation of the fixture screw 125 without tools. The fixture screw 125 is connected to the fixture clamp brace 127 at the fixture clamp brace joint 128 that absorb the rotational movement of the fixture screw 125 and allows the fixture clamp brace 127 to perform linear movement.

Turning the fixture screw butterfly head 126 moves the fixture screw 125 and cause the fixture clamp brace 127 to move opening or closing the gap between the fixture clamp brace 127 and the fixture clamp base 124.

FIG. 23 shows the alternative embodiment of the align fixture 129 that is composed of the upper blade align fixture 130 and the lower blade align fixture 131 in the closed position, secured with eight fixture clamps 123*a*, 123*b*, 123*c*, 123*d*, 123*e*, 123*f*, 123*g*, and 123*h*.

The upper blade align fixture 130 is designed to hold the originally installed cut blade 108 and is composed two upper blade airfoil braces 132*a*, and 132*b* that are parallel and placed at a distance to each other, the distance must be at least one third of the total length of the upper blade align fixture 130 but can be longer if a higher level of precision for the alignment is required.

The upper blade airfoil braces 132*a*, and 132*b* are joined at the edges by four upper blade longitudinal beams 133*a*, 133*b*, 133*c*, and 133*d*, that create a frame. The upper blade longitudinal beams 133*a*, 133*b*, 133*c*, and 133*d* are joined at one extremity by the upper blade horizontal outer beam 134 and two upper blade vertical outer beams 135*a*, and 135*b* and at the middle, at a short distance to the upper blade airfoil braces 132*b* by the upper blade horizontal inner beam 136 and two upper blade vertical inner beam 137*a*, and 137*b* to reinforce the rigidity of the structure.

The upper blade airfoil braces 132*a*, and 132*b* have profiles that fit perfectly the shape of the originally installed cut blade 108 at the point they are placed. To accommodate minor variations in the shape of different originally installed cut blades 108 that may have been manufactured using different molds, each upper blade airfoil brace 132*a*, and 132*b* is designed with two airfoil leading edge markers 138*a*, and 138*b* and 138*c*, and 138*d* respectively to touch the leading edge of the originally installed cut blade 108 at only one point located in each airfoil leading edge marker 138*a*, 138*b*, 138*c*, and 138*d*.

The airfoil trailing edge braces 117*a*, 117*b* are seen on their installed positions next to the respective airfoil trailing edge reference bolts 140*a*, 140*b* that mark the position the vertex of the trailing edge of the originally installed cut blade 108 must be at those particular points for the proper alignment.

The lower blade align fixture 131 is designed to hold the extension blade 37 and is composed of two lower blade airfoil braces 142*a*, and 142*b* that are parallel and placed at a distance to each other, the distance must be at least one third of the total length of the lower blade align fixture 131 but can be longer if a higher level of precision for the alignment is required.

The lower blade airfoil braces 142*a*, and 142*b* are joined at the edges by four lower blade longitudinal beams 143*a*, 143*b*, 143*c*, and 143*d*, that create a frame. The lower blade longitudinal beams 143*a*, 143*b*, 143*c*, and 143*d* are joined at one extremity by the lower blade horizontal outer beam 146 and two lower blade vertical outer beams 147*a*, and 147*b* and at the middle, at a short distance to the lower blade airfoil brace 142*a* by the lower blade horizontal inner beam 144 and two lower blade vertical inner beams 145*a*, and 145*b* to reinforce the rigidity of the structure.

The lower blade airfoil braces 142*a*, and 142*b* have profiles that fit perfectly the shape of the extension blade 37 at the point they are placed. To accommodate minor variations in the shape of different extension blades 37 that may have been manufactured using different molds, each lower blade airfoil brace 142*a*, and 142*b* is designed with two airfoil leading edge markers 138*e*, and 138*f* and 138*g*, and 138*h* respectively to touch the leading edge of the extension blade 37 at only one point located in each airfoil leading edge marker 138*e*, 138*f*, 138*g*, and 138*h*.

The airfoil trailing edge braces 117*c*, and 117*d* are hold in place by the respective airfoil trailing edge brace supports 139*c*, and 139*d*. The airfoil trailing edge braces 117*c*, and 117*d* are seen on their installation position next to the respective airfoil trailing edge reference bolts 140*c*, 140*d* that mark the position of the vertex of the trailing edge of the extension blade 37 that must be at those particular points of the respective airfoil trailing edge reference bolts 140*c*, 140*d* for the proper alignment.

Three alignment needles 148*a*, 148*b*, and 148*c* are placed at the lower blade airfoil brace 142*a*. Each alignment needle 148*a*, 148*b*, and 148*c* terminates in the respective alignment needle tip 149*a*, 149*b*, and 149*c*.

The alignment needle tips 149*a*, 149*b*, and 149*c* are seen matching the respective alignment targets 141*a*, 141*b*, and 141*c* on the upper blade airfoil brace 132*b* indicting a perfect alignment. This made possible by the perfect alignment of the upper blade align fixture 130 and the lower blade align fixture 131 that are held in place by the eight fixture clamps 123*a*, 123*b*, 123*c*, 123*d*, 123*e*, 123*f*, 123*g*, and 123*h*.

FIG. 24 shows the upper blade align fixture 130 in its installed position attached to the originally installed cut blade 108 and the lower blade align fixture 131 in its installed position attached to the extension blade 37.

Detail FIG. 24A shows the upper blade align fixture 130 in its installed position attached to the originally installed cut blade 108 and the lower blade align fixture 131 in its installed position attached to the extension blade 37 in greater magnification to allow the visualization of the smaller components and features.

The upper blade align fixture 130 is locked in the desired position on the originally installed cut blade 108 by the airfoil trailing edge braces 117*a*, and 117*b* by means of adjusting the adjustment screws 120*b*, 120*d* using the respective butterfly heads 121*b*, 121*d* to allow the trailing edge of the originally installed cut blade 108 to coincide with the position indicated by the airfoil trailing edge reference bolts 140*a*, 140*b*. As the adjustment screws 120*b*, 120*d* move, the pivoting supports 122*b*, 122*d* to keep the trailing edge in place and push the leading edge of the originally installed cut blade 108 forward until it rests against the airfoil leading edge marker 138*a*, 138*b*, 138*c*, and 138*d* locking the position of the upper blade align fixture 130.

Similarly, the lower blade align fixture 131 is locked in the desired position on the extension blade 37 by the airfoil trailing edge braces 117*c*, and 117*d* (only partially visible) by means of adjusting the adjustment screws 120*f*, 120*h* (not visible) using the respective butterfly heads 121*f*, 121*h* (not visible) to allow the trailing edge of the extension blade 37 to coincide with the position indicated by the airfoil trailing edge reference bolts 140*c*, 140*d*. As the adjustment screws 120*f*, 120*h* (not visible) move, the pivoting supports 122*f*, 122*h* keep the trailing edge in place and push the leading edge of the extension blade 37 forward until it rests against the airfoil leading edge marker 138*e*, 138*f*, 138*g*, and 138*h* locking the position of the lower blade align fixture 131. For a better visualization of the fixation and alignment process see FIG. 25.

The alignment needle tips 149*a*, 149*b*, and 149*c* are not affected by any structures that can cause them to deviate even if parts of the structure warp and are therefore precise indicators to help verify the proper alignment when the upper blade align fixture 130 and the lower blade align fixture 131 reach the closed position for the bonding process.

The upper camber sparcap 34 is bonded to the extension blade upper camber sparcap 42 and the lower camber sparcap 35 is bonded to the extension blade lower camber sparcap 43. The bonding is made stronger because the tapered upper camber sparcap 104 matches the extension blade upper camber sparcap tapering 47 and the tapered lower camber sparcap 105 matches the extension blade lower camber sparcap tapering 48 increasing the surface area of the joint and the smooth tapering reduces the tension on the parts.

The beam core 36 and the extension blade beam core 44 are joined and stay perfectly aligned completing the structural integrity of the joint. The extension blade trailing edge bonding strip 45 and the extension blade leading edge bonding strip 46 are bonded to their counterparts on a subsequent phase of the process.

FIG. 25 is an overlaid view of the upper blade align fixture 130 in its installed position attached to the originally installed cut blade 108 and the lower blade align fixture 131 in its installed position attached to the extension blade 37. To improve the visualization of the components that contribute for the alignment and fixation of the upper blade align fixture 130 and the lower blade align fixture 131, the originally installed cut blade 108 and the extension blade 37 have been drawn in dash doted lines as an overlay.

The upper blade align fixture 130 is locked in the desired position on the originally installed cut blade 108 by the airfoil trailing edge braces 117*a*, and 117*b* by means of adjusting the adjustment screws 120*a*, 120*b*, 120*c*, and 120*d* using the respective butterfly heads 121*a*, 121*b*, 121*c*, and 121*d* to allow the trailing edge of the originally installed cut blade 108 to coincide with the position indicated by the airfoil trailing edge reference bolts 140*a*, 140*b*. As the adjustment screws 120*a*, 120*b*, 120*c*, and 120*d* move, the pivoting supports 122*a*, 122*b*, 122*c*, and 122*d* keep the trailing edge in place and push the leading edge of the originally installed cut blade 108 forward until it rests against the airfoil leading edge marker 138*a*, 138*b*, 138*c*, and 138*d* locking the position of the upper blade align fixture 130.

Similarly, the lower blade align fixture 131 is locked in the desired position on the extension blade 37 by the airfoil trailing edge braces 117*c*, and 117*d* by means of adjusting the adjustment screws 120*e*, 120*f*, 120*g*, and 120*h* using the respective butterfly heads 121*e*, 121*f*, 121*g*, and 121*h* to allow the trailing edge of the extension blade 37 to coincide with the position indicated by the airfoil trailing edge reference bolts 140*c*, 140*d*. As the adjustment screws 120*e*, 120*f*, 120*g*, and 120*h* move, the pivoting supports 122*e*, 122*f*, 122*g*, and 122*h* keep the trailing edge in place and push the leading edge of the extension blade 37 forward until it rests against the airfoil leading edge marker 138*e*, 138*f*, 138*g*, and 138*h* locking the position of the lower blade align fixture 131.

The alignment needle tips 149*a*, 149*b*, and 149*c* are not affected by any structures that can cause them to deviate even if parts of the structure warp and are therefore precise indicators to help verify the proper alignment when the upper blade align fixture 130 and the lower blade align fixture 131 reach the closed position for the bonding process. A perfect alignment is achieved when the alignment needle tips 149*a*, 149*b*, and 149*c* match the respective alignment targets 141*a*, 141*b*, and 141*c*.

The upper camber sparcap 34 is bonded to the extension blade upper camber sparcap 42 and the lower camber sparcap 35 is bonded to the extension blade lower camber sparcap 43. The bonding is made stronger because the tapered upper camber sparcap 104 matches the extension blade upper camber sparcap tapering 47 and the tapered lower camber sparcap 105 matches the extension blade lower camber sparcap tapering 48 increasing the surface area of the joint and the smooth tapering reduces the tension on the parts.

The beam core 36 and the extension blade beam core 44 are joined and stay perfectly aligned completing the structural integrity of the joint. The extension blade trailing edge bonding strip 45 and the extension blade leading edge bonding strip 46 are bonded to their counterparts on a subsequent phase of the process.

FIG. 26 shows the alternative embodiment of the align fixture 129 in the closed position, secured with eight fixture clamps 123*a*, 123*b*, 123*c*, 123*d*, 123*e*, 123*f*, 123*g*, and 123*h*. The upper blade align fixture 130 is in its installed position attached to the originally installed cut blade 108 and the lower blade align fixture 131 is in its installed position attached to the extension blade 37.

The upper blade align fixture 130 is designed to hold the originally installed cut blade 108 and is composed two upper blade airfoil braces 132*a*, and 132*b* that are parallel and placed at a distance to each other, the distance must be at least one third of the total length of the upper blade align fixture 130 but can be longer if a higher level of precision for the alignment is required.

The upper blade airfoil braces 132*a*, and 132*b* are joined at the edges by four upper blade longitudinal beams 133*a*, 133*b*, 133*c*, and 133*d*, that create a frame. The upper blade longitudinal beams 133*a*, 133*b*, 133*c*, and 133*d* are joined at one extremity by the upper blade horizontal outer beam 134 and two upper blade vertical outer beams 135*a*, and 135*b* and at the middle, at a short distance to the upper blade airfoil braces 132*b* by the upper blade horizontal inner beam 136 and two upper blade vertical inner beam 137*a*, and 137*b* to reinforce the rigidity of the structure.

The upper blade airfoil braces 132a, and 132b have profiles that fit perfectly the shape of the originally installed cut blade 108 at the point they are placed. To accommodate minor variations in the shape of different originally installed cut blades 108 that may have been manufactured using different molds, each upper blade airfoil brace 132a, and 132b is designed with two airfoil leading edge markers 138a, 138b, and 138c, 138d respectively to touch the leading edge of the originally installed cut blade 108 at only one point located in each airfoil leading edge marker 138a, 138b, 138c, and 138d.

The airfoil trailing edge braces 117a, and 117b are held in place by the respective airfoil trailing edge brace supports 139a, and 139b. The airfoil trailing edge braces 117a, 117b are seen on their installed positions next to the respective airfoil trailing edge reference bolts 140a, 140b that are seen from the side of the butterfly head that allows the hand adjustment of the depth of the airfoil trailing edge reference bolts 140a, 140b to approach the tip to the vertex of the trailing edge of the originally installed cut blade 108 to facilitate the alignment.

For the alignment, the adjustment screws 120a, 120b, 120c, and 120d can be moved using the respective butterfly heads 121a, 121b, 121c, and 121d to allow the trailing edge of the originally installed cut blade 108 to coincide with the position indicated by the tip of the airfoil trailing edge reference bolts 140a, 140b. As the adjustment screws 120a, 120b, 120c, and 120d move, the pivoting supports 122a, 122b, 122c, and 122d keep the trailing edge in place and push the leading edge of the originally installed cut blade 108 forward until it rests against the airfoil leading edge marker 138a, 138b, 138c, and 138d locking the position of the upper blade align fixture 130.

The lower blade align fixture 131 is designed to hold the extension blade 37 and is composed two lower blade airfoil braces 142a, and 142b that are parallel and placed at a distance to each other, the distance must be at least one third of the total length of the lower blade align fixture 131 but can be longer if a higher level of precision for the alignment is required.

The lower blade airfoil braces 142a, and 142b are joined at the edges by four lower blade longitudinal beams 143a, 143b, 143c, and 143d, that create a frame. The lower blade longitudinal beams 143a, 143b, 143c, and 143d are joined at one extremity by the lower blade horizontal outer beam 146 and two lower blade vertical outer beams 147a, and 147b and at the middle, at a short distance to the lower blade airfoil brace 142a by the lower blade horizontal inner beam 144 and two lower blade vertical inner beams 145a, and 145b to reinforce the rigidity of the structure.

The lower blade airfoil braces 142a, and 142b have profiles that fit perfectly the shape of the extension blade 37 at the point they are placed. To accommodate minor variations in the shape of different extension blades 37 that may have been manufactured using different molds, each lower blade airfoil brace 142a, and 142b is designed with two airfoil leading edge markers 138e, 138f and 138g, 138h respectively to touch the leading edge of the extension blade 37 at only one point located in each airfoil leading edge marker 138e, 138f, 138g, and 138h.

The airfoil trailing edge braces 117c, 117d are seen on their installed positions next to the respective airfoil trailing edge reference bolts 140c, 140d that are seen from the side of the butterfly head that allows the hand adjustment of the depth of the airfoil trailing edge reference bolts 140c, 140d to approach the tip to the vertex of the trailing edge of the extension blade 37 to facilitate the alignment.

For the alignment, the adjustment screws 120e, 120f, 120g, and 120h can be moved using the respective butterfly heads 121e, 121f, 121g, and 121h to allow the trailing edge of the extension blade 37 to coincide with the position indicated by the tip of the airfoil trailing edge reference bolts 140c, 140d. As the adjustment screws 120e, 120f, 120g, and 120h move, the pivoting supports 122e, 122f, 122g, and 122h keep the trailing edge in place and push the leading edge of the extension blade 37 forward until it rests against the airfoil leading edge marker 138e, 138f, 138g, and 138h locking the position of the lower blade align fixture 131.

The alignment process is done before the upper blade align fixture 130 and the lower blade align fixture 131 are brought together and hold in place by the eight blade clamps 123a, 123b, 123c, 123d, 123e, 123f, 123g, and 123h. The adjustment screws 120a, 120b, 120c, 120d, 120e, 120f, 120g, and 120h are not moved anymore before the curing of the applied adhesive is complete.

The upper camber sparcap 34 is bonded to the extension blade upper camber sparcap 42 and the lower camber sparcap 35 is bonded to the extension blade lower camber sparcap 43. The bonding is made stronger because the tapered upper camber sparcap 104 matches the extension blade upper camber sparcap tapering 47 and the tapered lower camber sparcap 105 matches the extension blade lower camber sparcap tapering 48 increasing the surface area of the joint and the smooth tapering reduces the tension on the parts.

The beam core 36 and the extension blade beam core 44 are joined and stay perfectly aligned completing the structural integrity of the joint. The extension blade trailing edge bonding strip 45 and the extension blade leading edge bonding strip 46 are bonded to their counterparts on a subsequent phase of the process.

CONCLUSION

A new method to upgrade Wind Turbines without removing the blades is presented that offers the advantages of being cheaper to implement, require less time to complete and does not require the use of heavy lifting equipment significantly reducing costs and resulting in better financial results for the turbine owner.

The various materials and methods employed ensure a robust and durable set of upgraded blades that can operate without any restrictions and require no maintenance beyond the ordinary normal blades.

DRAWINGS—REFERENCE NUMERALS

| N | Item Name | Shown in FIGS. |
|---|---|---|
| 20 | wind turbine | 1 |
| 21 | tower | 1 7 8 |
| 22 | nacelle | 1 7 8 |
| 23 | hub | 1 7 8 |
| 24 | originally installed blade | 1 2 4 7 8 13 14 14A 15 15A 16 16A |

-continued

| N | Item Name | Shown in FIGS. |
|---|---|---|
| 25 | root cylinder | 2 4 5 6 |
| 26 | studs | 2 4 5 6 |
| 27 | transition sector | 2 4 5 6 |
| 28 | originally installed blade body | 2 4 5 6 |
| 29 | originally installed blade section point | 2 4 6 13 13A 14A 15A 17A |
| 30 | originally installed blade cut portion | 2 4 13A 14 14A 15 15A |
| 31 | originally installed blade tip | 2 4 13A 14 15 |
| 32 | trailing edge bonding strip | 2 17A |
| 33 | leading edge bonding strip | 2 17A |
| 34 | upper camber sparcap | 2 6 16 16A 17A 18A 19A 24A 25 26 27A |
| 35 | lower camber sparcap | 2 6 16 16A 17A 18A 19A 24A 25 26 27A |
| 36 | beam core | 2 6 17A 18A 19A 24A 25 26 27A |
| 37 | extension blade | 3 5 18 18A 19 19A 24 24A 25 26 27 27A 28 28A |
| 38 | extension blade straight sector | 3 5 |
| 39 | extension blade turn sector | 3 5 6 |
| 40 | extension blade main sector | 3 5 6 |
| 41 | extension blade tip | 3 5 6 |
| 42 | extension blade upper camber sparcap | 3 6 18A 19A 24A 25 26 27A |
| 43 | extension blade lower camber sparcap | 3 6 18A 19A 24A 25 26 27A |
| 44 | extension blade beam core | 3 6 18A 19A 24A 25 26 27A |
| 45 | extension blade trailing edge bonding strip | 3 6 18A 19A 24A 25 26 27A 28A |
| 46 | extension blade leading edge bonding strip | 3 6 18A 19A 24A 25 26 27A |
| 47 | extension blade upper camber sparcap tapering | 3 18A 19A 24A 25 26 27A |
| 48 | extension blade lower camber sparcap tapering | 3 18A 19A 24A 25 26 27A |
| 49 | extended blade | 5 6 7 8 |
| 50 | extension blade joint sector | 5 6 |
| 51 | joint sector trailing edge bonding strip | 6 28A |
| 52 | joint sector leading edge bonding strip | 6 28A |
| 53 | wind turbine under upgrade | 7 |
| 54 | blade under work | 7 7A |
| 55 | work platform | 7 7A |
| 56 | steel cable | 7 7A |
| 57 | platform floor | 7A |
| 58 | safety rail | 7A |
| 59 | lower camber rail-guided milling tool | 9 14 14A 15A 16A |
| 60 | lower frame | 9 11 |
| 61 | lower working area | 9 11 14A |
| 62 | fixation hole | 9 11 12 13A 14A 15A |
| 63 | rail | 9 10 |
| 64 | rail head | 9 10 |
| 65 | sliding table | 9 10 |
| 66 | sliding table rail groove | 9 10 |
| 67 | working arm | 9 10 |
| 68 | pivoting rod | 9 10 |
| 69 | lower camber cutting wheel | 9 11 14A |
| 70 | revolving rod | 9 10 |
| 71 | power source | 9 10 11 12 |
| 72 | handle | 9 10 |
| 73 | stop pin | 9 10 |
| 74 | lower cutting guide rail | 9 |
| 75 | drill depth | 9 11 |
| 76 | upper camber rail-guided milling tool | 10 14A 15 15A 16A |
| 77 | upper frame | 10 12 |
| 78 | upper working area | 10 12 15A |
| 79 | upper camber cutting wheel | 10 12 15A |
| 80 | upper cutting guide rail | 10 |
| 81 | alternative embodiment of the lower camber rail-guided milling tool | 11 |
| 82 | guide lower rail | 11 |
| 83 | guide lower slot | 11 |
| 84 | guided reference rod | 11 12 |
| 85 | guided revolving rod | 11 12 |
| 86 | push handle | 11 12 |
| 87 | alternative embodiment of the upper camber rail-guided milling tool | 12 |
| 88 | guide upper rail | 12 |
| 89 | guide upper slot | 12 |
| 90 | tool positioning fixture | 13 13A 14 14A 15 15A |
| 91 | tip distancing bar | 13A |
| 92 | tip reference plate | 13A |
| 93 | trailing edge reference | 13A |
| 94 | leading edge reference | 13A |
| 95 | base alignment bar | 13A 14A 15A |
| 96 | trailing edge alignment bar | 13A 14A 15A |
| 97 | leading edge alignment bar | 13A 14A 15A |
| 98 | lower camber alteration | 14A |

| N | Item Name | Shown in FIGS. |
|---|---|---|
| 99 | lower camber outer skin cut | 14A |
| 100 | lower camber sparcap cut | 14A |
| 101 | upper camber alteration | 15A |
| 102 | upper camber outer skin cut | 15A |
| 103 | upper camber sparcap cut | 15A |
| 104 | tapered upper camber sparcap | 16A 17A 18A 19A 24A 25 26 |
| 105 | tapered lower camber sparcap | 16A 17A 18A 19A 24A 25 26 |
| 106 | upper camber sparcap milling end point | 16A |
| 107 | lower camber sparcap milling end point | 16A |
| 108 | originally installed cut blade | 17 17A 18 19 19A 24 24A 25 26 27 27A 28 28A |
| 109 | discarded sparcap | 17 |
| 110 | discarded tip | 17 |
| 111 | alignment fixture | 18 18A |
| 112 | upper camber alignment fixture | 18A 19A |
| 113 | lower camber alignment fixture | 18A 19A |
| 114 | joining ring | 18A 19A |
| 115 | front joining pin | 18A 19A |
| 116 | rear joining pin | 18A 19A |
| 117 | airfoil trailing edge brace | 20 22 23 24A 25 26 |
| 118 | brace body | 20 |
| 119 | brace fixation hole | 20 22 |
| 120 | adjustment screw | 20 24A 25 26 |
| 121 | butterfly head | 20 24A 25 26 |
| 122 | pivoting support | 20 24A 25 26 |
| 123 | fixture clamp | 21 23 26 |
| 124 | fixture clamp base | 21 |
| 125 | fixture screw | 21 |
| 126 | fixture screw butterfly head | 21 |
| 127 | fixture clamp brace | 21 |
| 128 | fixture clamp brace joint | 21 |
| 129 | alternative embodiment of the align fixture | 22 23 26 |
| 130 | upper blade align fixture | 22 23 24 24A 25 26 |
| 131 | lower blade align fixture | 22 23 24 24A 25 26 |
| 132 | upper blade airfoil brace | 22 23 26 |
| 133 | upper blade longitudinal beam | 22 23 26 |
| 134 | upper blade horizontal outer beam | 22 23 25 26 |
| 135 | upper blade vertical outer beam | 22 23 24A 25 26 |
| 136 | upper blade horizontal inner beam | 22 23 24A 25 26 |
| 137 | upper blade vertical inner beam | 22 23 25 26 |
| 138 | airfoil leading edge marker | 22 23 24A 25 26 |
| 139 | airfoil trailing edge brace support | 22 23 24A 25 26 |
| 140 | airfoil trailing edge reference bolt | 22 23 24A 25 26 |
| 141 | alignment target | 22 23 25 |
| 142 | lower blade airfoil brace | 22 23 26 |
| 143 | lower blade longitudinal beam | 22 23 26 |
| 144 | lower blade horizontal inner beam | 22 23 26 |
| 145 | lower blade vertical inner beam | 22 23 26 |
| 146 | lower blade horizontal outer beam | 22 23 26 |
| 147 | lower blade vertical outer beam | 22 23 26 |
| 148 | alignment needle | 22 23 26 |
| 149 | alignment needle tip | 22 23 24A 25 26 |
| 150 | sparcap cover bonding | 28A |
| 151 | lower camber cover | 28A |
| 152 | upper camber cover | 28A |

What is claimed is:

1. A combination of a rail-guided milling tool and a tool positioning fixture, the combination comprising:
the rail-guided milling tool, which rail-guided milling tool comprises:
at least one cutting wheel comprising a camber, the at least one cutting wheel being configured to remove material from a surface of an installed blade of a wind turbine to form the surface in the shape of the camber;
a working arm configured to press the at least one cutting wheel towards the surface of the blade of the wind turbine;
a pivoting rod pivotably connected to the working arm;
a frame having at least one frame rail;
a table supporting the pivoting rod, the table configured to slide along the at least one frame rail of the frame;

the combination further comprising:
the tool positioning fixture, which tool positioning fixture is configured to support the frame and position the rail-guided milling tool along the blade of the wind turbine at a precise position for facilitating removal of a respective identical portion of a respective tip of each blade of a plurality of blades of the wind turbine, the tool positioning fixture comprising:
a tip reference plate configured to provide a reference for positioning the tool positioning fixture relative to the originally installed blade tip;
at least one tip distancing bar affixed to and extending from the tip reference plate;
a first base alignment bar attached to the at least one tip distancing bar;

at least one trailing edge alignment bar affixed to the first base alignment bar and extending in parallel to the at least one tip distancing bar;

at least one leading edge alignment bar affixed to the first base alignment bar and extending in parallel to the at least one tip distancing bar;

a second base alignment bar attached to the at least one trailing edge alignment bar and positioned in parallel to the first base alignment bar; and wherein the tool positioning fixture provides for precise positioning of the rail-guided milling tool at the same location on each blade of the plurality of blades of the wind turbine; and wherein the working arm is configured to press the at least one cutting wheel towards the surface and move the sliding table and the at least one cutting wheel along the at least one frame rail of the frame to remove material from the surface of the blade of the wind turbine being machined, in order to form the surface in the shape of the camber of the at least one cutting wheel.

2. The combination of claim 1, wherein the camber of the at least one cutting wheel has a matching shape to the shape of the camber of the installed blade of the wind turbine.

3. The combination of claim 1, further comprising:
at least one guide rail;
wherein the at least one guide rail is configured at an angle from a surface of the frame to configure a tapering pattern to thereby enable the at least one cutting wheel to cut the surface of the installed blade of the wind turbine at an increasing depth, as the table slides along the at least one frame rail, based on an angle of the at least one guide rail.

4. The combination of claim 3, comprising:
a stop pin affixed to the working arm, the stop pin configured to strike the at least one guide rail and stop the rotation of the working arm.

5. The combination of claim 1, wherein the frame has a camber matching the camber of the at least one cutting wheel.

6. The combination of claim 1,
wherein the rail-guided milling tool comprises a revolving rod, wherein the at least one cutting wheel is configured to spin on the revolving rod; and
wherein the rail-guided milling tool comprises an electric power source configured to spin the revolving rod to have the at least one cutting wheel remove material from the surface of the installed blade of the wind turbine; and
wherein the revolving rod and the at least one cutting wheel are supported by the working arm.

7. The combination of claim 1,
wherein the rail-guided milling tool comprises a revolving rod, wherein the at least one cutting wheel is configured to spin on the revolving rod; and
wherein the rail-guided milling tool comprises a pneumatic power source configured to rotate the revolving rod to have of the at least one cutting wheel remove material from the surface of the installed blade of the wind turbine.

8. The combination of claim 1, wherein the first base alignment bar of the tool positioning fixture extends to a first trailing edge reference and to a first leading edge reference; and
wherein the second base alignment bar of the tool positioning fixture extends to a second trailing edge reference and to a second leading edge reference.

9. The combination of claim 1,
wherein the rail-guided milling tool is one of: (i) a first rail-guided milling tool configured to be affixed to a lower surface of the installed blade of the wind turbine, and (ii) a second rail-guided milling tool configured to be attached to an upper surface of the installed blade of the wind turbine; and
wherein the tool positioning fixture is configured to affix the first rail-guided milling tool to the lower surface of the installed blade of the wind turbine and is also configured to affix the second rail-guided milling tool to the upper surface of the installed blade of the wind turbine.

10. The combination of claim 1,
wherein the tool positioning fixture is configured to align the camber of the at least one cutting wheel of the rail-guided milling tool to enable the at least one cutting tool to remove the material from the surface of the installed blade of the wind turbine in the shape of the camber of the at least one cutting wheel.

11. A system comprising the combination of claim 1, the system further comprising:
a work platform configured for attachment to the wind turbine.

12. A system comprising the combination of claim 1, the system further comprising:
a blade alignment fixture comprising:
an upper camber alignment fixture;
a lower camber alignment fixture;
a plurality of joining rings;
a plurality of front joining pins;
a plurality of rear pins; and
wherein the plurality of front joining pins are configured to secure the upper camber alignment fixture to the lower camber alignment fixture along a leading edge of the installed blade of the wind turbine; and
the plurality of rear joining pins are configured to secure the upper camber alignment fixture to the lower camber alignment fixture along a trailing edge of the installed blade of the wind turbine; and
wherein the blade alignment fixture is configured to reference and align the installed blade of the wind turbine with an extension blade to be attached to the installed blade of the wind turbine.

13. A system comprising the combination of claim 1, the system further comprising:
an align fixture comprising:
a plurality of trailing edge braces
an upper blade alignment fixture comprising airfoil braces configured to match the shape of the installed blade of the wind turbine, the upper blade alignment fixture configured for attachment thereto of at least one trailing edge brace of the plurality of trailing edge braces;
a lower blade alignment fixture comprising airfoil braces configured to match the shape of an extension blade configured to increase power output of the wind turbine, the lower blade alignment fixture configured for attachment thereto of at least one trailing edge brace of the plurality of trailing edge braces;
a plurality of fixture clamps configured to align the upper blade alignment fixture relative to the lower blade alignment fixture, the plurality of fixture clamps also configured for attaching the upper blade alignment fixture to the lower blade alignment fixture; and wherein the align fixture is configured to reference and align the installed blade of the wind turbine with an extension blade to be attached to the installed blade of the wind turbine.

14. The system of claim 13, wherein the upper blade alignment fixture comprises a plurality of alignment targets, and wherein the lower blade alignment fixture comprises a plurality of alignment needles; and wherein the plurality of alignment needles and the plurality of alignment targets are configured to align the upper blade alignment fixture with the lower blade alignment fixture.

15. The system of claim 13, wherein the upper blade alignment fixture comprises a plurality of reference bolts.

16. The system of claim 13, wherein each trailing edge brace of the plurality of trailing edge braces of the alignment fixture comprises:

a plurality of adjustment screws; and
a plurality of pivoting supports.

17. A system comprising the combination of claim 1, the system further comprising:

an extension blade configured to increase power to the wind turbine.

18. A system comprising the combination of claim 1, the system further comprising:

an extension blade of carbon fiber configured to increase power to a wind turbine.

19. A system comprising the combination of claim 1, the system further comprising:

a lower sparcap cover; and
an upper sparcap cover.

20. A method, comprising:

providing the combination of claim 1;
affixing the tool positioning fixture to the installed blade of the wind turbine;
aligning the rail-guided milling tool to the surface of the installed blade, wherein the rail-guided milling tool is supported by the tool positioning fixture;
using the at least one cutting wheel to remove the material from the surface of the installed blade so as to form the surface in the shape of the camber of the at least one cutting wheel of the rail-guided milling tool;
pivoting in one direction the working arm of the rail-guided milling tool until a stop pin provided on the working arm contacts a guide rail to prevent cutting of the installed blade below a certain depth;
moving the at least one cutting wheel along at the least one frame rail to progressively remove material from the installed blade;
cutting the tip off of the installed blade;
aligning an extension blade to the installed blade;
bonding the extension blade to the installed blade to thereby increase power of the wind turbine.

* * * * *